(12) United States Patent
Hong et al.

(10) Patent No.: US 12,163,724 B2
(45) Date of Patent: Dec. 10, 2024

(54) REFRIGERATOR

(71) Applicant: LG Electronics Inc., Seoul (KR)

(72) Inventors: Euddeum Hong, Seoul (KR); Daekil Kang, Seoul (KR); Ohchul Kwon, Seoul (KR); Youl Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 179 days.

(21) Appl. No.: 17/802,633

(22) PCT Filed: Feb. 26, 2021

(86) PCT No.: PCT/KR2021/002479
§ 371 (c)(1),
(2) Date: Aug. 26, 2022

(87) PCT Pub. No.: WO2021/172947
PCT Pub. Date: Sep. 2, 2021

(65) Prior Publication Data
US 2023/0012438 A1 Jan. 12, 2023

(30) Foreign Application Priority Data

Feb. 26, 2020 (KR) .................. 10-2020-0023351
Jun. 17, 2020 (KR) .................. 10-2020-0073941

(51) Int. Cl.
*F25D 23/02* (2006.01)
*F25D 23/10* (2006.01)

(52) U.S. Cl.
CPC .......... *F25D 23/028* (2013.01); *F25D 23/10* (2013.01)

(58) Field of Classification Search
CPC ... A47B 2096/208; A47B 96/20; F25D 23/02; F25D 23/028; F25D 2323/02; F25D 2400/18; F25D 23/10
See application file for complete search history.

(56) References Cited

U.S. PATENT DOCUMENTS 7,770,985 B2    8/2010    Davis et al.
7,954,345 B2    6/2011    Park
(Continued)

FOREIGN PATENT DOCUMENTS

CN    101676635    3/2010
CN    105546930    5/2016
(Continued)

OTHER PUBLICATIONS

Office Action in Chinese Appln. No. 202180016561.9, mailed on Sep. 28, 2023, 8 pages (with English machine translation).
(Continued)

*Primary Examiner* — Andrew Roersma
(74) *Attorney, Agent, or Firm* — Fish & Richardson P.C.

(57) ABSTRACT

A refrigerator according to an embodiment of the present invention may comprise: a cabinet which forms a storage space; and a door which opens/closes the storage space, wherein the door comprises: a frame assembly in which a heat-insulating material is filled; and a panel assembly which is mounted to the front surface of the frame assembly and forms the front exterior of the door. The panel assembly may comprise: a front panel; a panel fixing member which is provided at the rear surface of the front panel; and a bracket for coupling to the frame assembly, the bracket being spaced apart from the panel fixing member in the vertical direction, wherein the panel fixing member passes through the frame assembly and is locked and coupled to one surface of the frame assembly inside the frame assembly.

19 Claims, 49 Drawing Sheets

(56) References Cited

U.S. PATENT DOCUMENTS

| | | | |
|---|---|---|---|
| 8,789,900 B2 | 7/2014 | Laible et al. | |
| 11,774,164 B2* | 10/2023 | Moon | F25D 23/063 312/116 |
| 2007/0188059 A1 | 8/2007 | Davis et al. | |
| 2008/0042537 A1 | 2/2008 | Kim et al. | |
| 2010/0026155 A1 | 2/2010 | Yun | |
| 2011/0025173 A1 | 2/2011 | Ciyanoglu et al. | |
| 2013/0026900 A1* | 1/2013 | Oh | F25D 23/028 312/401 |
| 2016/0341468 A1 | 11/2016 | Joo et al. | |
| 2017/0370631 A1 | 12/2017 | Kim et al. | |
| 2018/0172337 A1 | 6/2018 | Choi et al. | |
| 2020/0326119 A1* | 10/2020 | Lee | F25D 23/028 |
| 2021/0055038 A1* | 2/2021 | Lee | F25D 23/126 |
| 2021/0318056 A1* | 10/2021 | Park | F25D 23/02 |
| 2023/0012438 A1* | 1/2023 | Hong | F25D 23/028 |
| 2023/0408170 A1* | 12/2023 | Moon | F25D 23/02 |

FOREIGN PATENT DOCUMENTS

| | | | |
|---|---|---|---|
| CN | 110382981 | 10/2019 | |
| CN | 110542267 | 12/2019 | |
| EP | 0647821 A1 * | 4/1995 | F25D 23/02 |
| EP | 1650512 | 4/2006 | |
| EP | 3378359 | 9/2018 | |
| EP | 3505853 | 7/2019 | |
| EP | 3809072 | 4/2021 | |
| EP | 3809076 | 4/2021 | |
| GB | 2050814 | 1/1981 | |
| JP | S4424857 | 10/1969 | |
| JP | H0791816 | 4/1995 | |
| JP | H08-35761 | 2/1996 | |
| JP | 6139274 | 5/2017 | |
| JP | 6460832 | 1/2019 | |
| KR | 20000019775 | 4/2000 | |
| KR | 10200690134520 A * | 12/2006 | F25D 23/02 |
| KR | 10-2010-0057246 | 5/2010 | |
| KR | 10-2018-0022232 | 3/2018 | |
| KR | 20180106734 | 10/2018 | |
| WO | WO 2006/120082 | 11/2006 | |
| WO | WO 2011/026817 | 3/2011 | |
| WO | WO2014024429 | 2/2014 | |
| WO | WO 2020/213861 | 10/2020 | |
| WO | WO 2021/112658 | 6/2021 | |
| WO | WO-2021112658 A1 * | 6/2021 | F25D 23/02 |

OTHER PUBLICATIONS

Office Action in U.S. Appl. No. 17/350,440, dated Feb. 7, 2023, 13 pages.

Office Action in Australian Appln. No. 2021204021, mailed on Mar. 29, 2023, 4 pages.

Office Action in Chinese Appln. No. 202180016561.9, mailed on Apr. 29, 2023, 20 pages (with English machine translation).

Extended European Search Report in European Appln. No. 21760390.1, mailed on Mar. 19, 2024, 13 pages.

Extended European Search Report in European Appln. No. 21761471.8, mailed on Mar. 5, 2024, 7 pages.

Office Action in U.S. Appl. No. 18/238,354, mailed on Mar. 4, 2024, 15 pages.

* cited by examiner

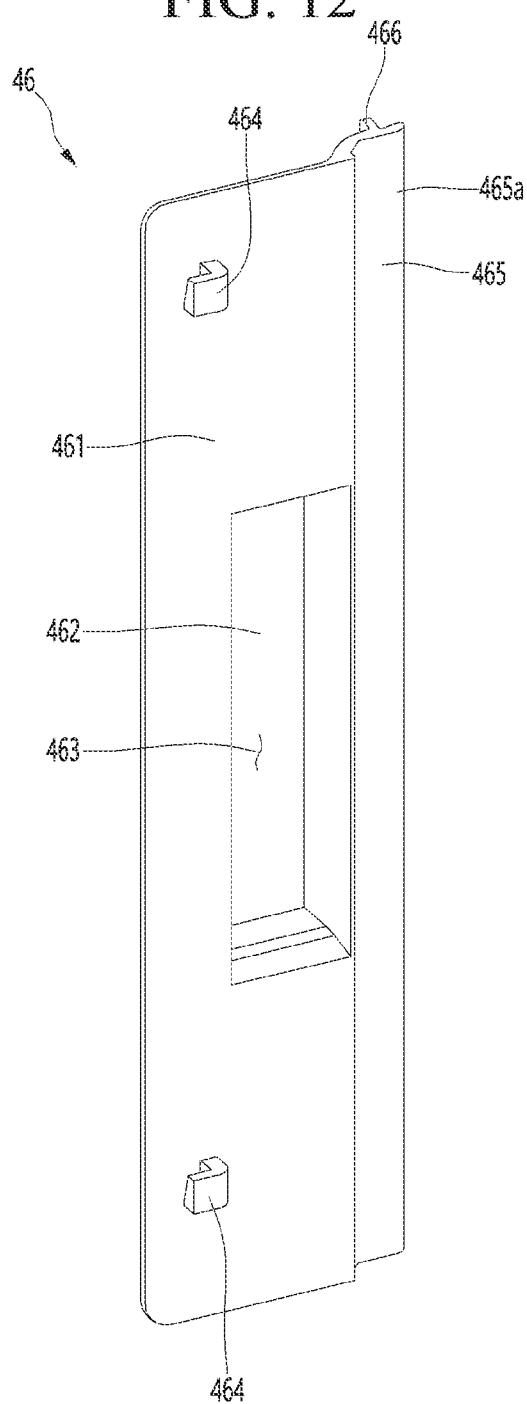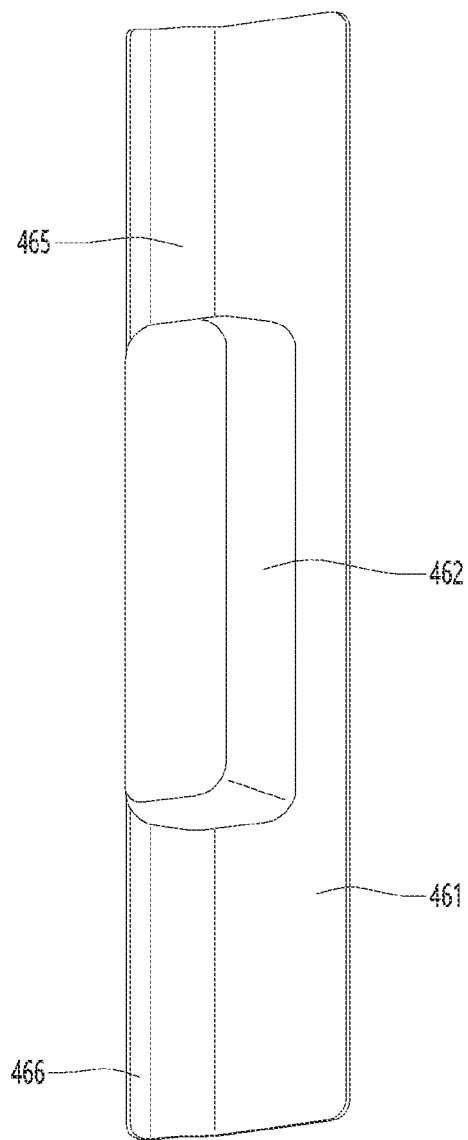

REFRIGERATOR

CROSS-REFERENCE TO RELATED APPLICATIONS

This application is a National Stage application under 35 U.S.C. § 371 of International Application No. PCT/KR2021/002479, filed on Feb. 26, 2021, which claims the benefit of Korean Patent Application No. 10-2020-0023351, filed on Feb. 26, 2020, and Korean Patent Application No. 10-2020-0073941, filed on Jun. 17, 2020. The disclosures of the prior applications are incorporated by reference in their entirety.

TECHNICAL FIELD

The present invention relates to a refrigerator.

BACKGROUND ART

In general, refrigerators are home appliances for storing foods at low temperature in an inner storage space covered by a refrigerator door. Here, the inside of the storage space is cooled using cool air that is generated by being heat-exchanged with a refrigerant circulated in a refrigeration cycle to store the foods in an optimal state.

Such refrigerators tend to increase more and more in size and provide multi-functions due to the trends of change of dietary life and high quality, and accordingly, refrigerators provided with various structures and convenience devices in consideration of user convenience are brought to the market.

Structures that vary in outer appearance of a front surface of a door of the refrigerator are proposed to harmonize with an environment, in which the refrigerator is disposed, or surrounding furniture or home appliances.

A structure in which a decoration panel defining the outer appearance of the front surface of the door of the refrigerator is mounted is disclosed in U.S. Pat. No. 8,789,900. Also, a structure, in which a plurality of bridges for restriction are disposed at both sides of a rear surface of a decoration panel, and brackets inserted into both ends of the door are coupled to the bridge so that the decoration panel is mounted, is disclosed.

However, in the above-described technology according to the related art, since the plurality of brackets have to be mounted on the outside so as to mount the panel, productivity may be deteriorated, and an accurate mounting position may not be maintained according to workability of a worker. Particularly, there is a problem of deteriorating the outer appearance of the structure in which the brackets for the coupling are exposed to both the sides of the door.

A structure in which a glass panel defining the outer appearance of the front surface of the door of the refrigerator is mounted is disclosed in Japanese Patent No. 6460832. A plurality of recessed grooves are defined in a front surface portion of a door body, and an installation portion bent in multiple stages is disposed on a rear surface of the glass panel, and the installation portion is inserted into each of the recessed grooves to mount the glass panel.

However, in such a typical technique, it is difficult to realize firm coupling in a coupling structure between an installation portion and a groove, and thus, a gap may occur. A refrigerator door has a structure in which an impact is repeatedly generated during opening and closing, and such a typical coupling structure has a problem of noise generation and damage due to the impact. Particularly, when a panel is elongated in a vertical direction, this problem may become more serious.

In addition, when the panel defining an outer appearance is made of a heavy material such as glass or a metal, it is difficult to support a load through only a simple groove structure disposed on a front surface of the door, and thus, there is a problem that the panel is detached, or the door itself is damaged. Particularly, when an impact is applied due to the opening and closing of the door, the detachment of the panel or the damage of the groove portion may inevitably occur.

In addition, when a groove structure into which a protrusion is inserted is provided in the door, an insulation thickness of the door may be reduced, and thus, insulation performance may be deteriorated, and dew condensation may be generated on the front surface of the door.

DISCLOSURE OF THE INVENTION

Technical Problem

An embodiment of the present invention provides a refrigerator having a panel mounting structure in which a coupling portion is prevented from being exposed to the outside to improve an outer appearance.

Alternatively or additionally, an embodiment of the present invention provides a refrigerator in which a panel is mounted and maintained at an accurate position to more improve an outer appearance.

Alternatively or additionally, an embodiment of the present invention provides a refrigerator in which a panel and a door are prevented from being damaged.

Alternatively or additionally, an embodiment of the present invention provides a refrigerator in which a panel is more firmly and stably supported.

Alternatively or additionally, an embodiment of the present invention provides a refrigerator in which a panel is easily mounted and detached.

Alternatively or additionally, an embodiment of the present invention provides a refrigerator in which insulation performance is prevented from being deteriorated due to mounting of a panel.

Alternatively or additionally, this embodiment provides a door of a refrigerator in which a front panel is replaceable without a space restriction.

Technical Solution

A refrigerator according to one aspect includes: a cabinet configured to define a storage space; and a door configured to open and close the storage space.

The door may include: a frame assembly in which an insulator is filled; and a panel assembly mounted on a front surface of the frame assembly and configured to define an outer appearance of a front surface of the door.

The panel assembly may include: a front panel; and a panel fixing member provided on a rear surface of the front panel.

The panel fixing member may pass through the frame assembly so as to be coupled to the frame assembly inside the frame assembly.

The panel assembly may further include a bracket disposed to be spaced vertically from the panel fixing member, the bracket being coupled to the frame assembly.

The frame assembly may include: a frame opening through which the panel fixing member passes; and an accommodation member that is in contact with a surface, in which the frame opening is defined, and has a space in which the panel fixing member passing through the frame opening is accommodated.

A plurality of panel fixing members may be arranged vertically on both left and right sides of a rear surface of the front panel.

The frame assembly may include: a front frame; and a plurality of side frames coupled to both sides of the front frame, respectively.

The frame opening may be defined in each of the plurality of side frames.

The side frames may include: a frame side surface configured to define a side surface of the frame assembly; and a frame front surface protruding from the frame side surface to support a front surface of the frame assembly. The frame opening may be defined in the frame front surface. The accommodation member may be mounted on the frame front surface.

An opening that communicates with the frame opening may be defined in the front frame, and the panel fixing member may pass through both the opening of the front surface frame and the frame opening.

A side rib spaced backward from the frame front surface may be disposed on the frame side surface. One end of the accommodation member may be inserted between the frame front surface and the side rib.

The accommodation member may include: an accommodation member mounting surface fixed to the frame front surface; and an accommodation portion recessed backward from the accommodation member mounting surface to define an accommodation space in which the panel fixing member is accommodated. The accommodation portion may be larger than the frame opening.

A gasket groove in which a gasket that is in contact with a front surface of the cabinet to seal the storage space is mounted may be defined in a rear surface of the frame assembly. Each of the panel fixing member and the accommodation member may protrude from a position thereof facing the gasket groove.

The panel fixing member may include: a fixing member mounting portion mounted on a rear surface of the front panel; a hook portion protruding from one side of the fixing member mounting portion to extend downward after passing through the frame opening of the frame assembly; and an elastic portion provided on the hook portion so as to be elastically supported on the side frame.

The elastic portion may extend upward from a lower end of the hook portion and may be farther from the hook portion as the elastic portion extends upward.

The hook portion may be disposed to be eccentric to an outside with respect to a center of the fixing member mounting portion.

The front frame may be made of a metal material, and a magnet attached to the front frame by magnetic force may be mounted on a rear surface of the front panel.

The frame assembly may further include: an upper frame coupled to an upper side of the front frame; a lower frame coupled to a lower side of the front frame.

The bracket may include: an upper bracket coupled to the upper frame; and a lower bracket coupled to the lower frame.

The frame assembly may include: a front frame; and a plurality of side frames coupled to both sides of the front frame, respectively, wherein the frame opening may be defined in the front frame.

The accommodation member may include: a recess comprising a plurality of side surfaces recessed from a front surface of the front frame; and an inclined protrusion protruding with an inclination from each of both the side surfaces of the recess.

The panel fixing member may include a hook extending from a rear surface of the front panel and restricted with the inclined protrusion by passing through the frame opening.

The inclined protrusion may be provided in a pair, and the pair of inclined protrusions may be closer to each other toward the inside from the frame opening.

The hook may include: a plate attached to the rear surface of the front panel; and a plurality of hook members extending from the plate and spaced apart from each other in a horizontal direction.

Each of the hook member may include: an extension portion extending from the plate; and a hook portion bent from the extension portion to extend in directions that are away from each other.

A top surface of the inclined protrusion may be disposed lower than an upper end of the recess.

The frame assembly may further include: an upper frame coupled to an upper portion of the front frame; and a lower frame coupled to a lower portion of the front frame, wherein the bracket may include: an upper bracket coupled to the upper frame; and a lower bracket coupled to the lower frame.

In a state in which a portion of the lower bracket is accommodated in the recess of the lower frame, the upper bracket and the upper frame may be screw-coupled to each other.

A refrigerator according to another aspect may include: a door body; and a panel assembly mounted on a front surface of the door body, wherein the panel assembly may be coupled to: a panel configured to define an outer appearance thereof; and a side frame passing through a front surface of the door body and configured to define a side surface of the door body inside the door body.

A refrigerator according to an embodiment of the present invention may include a panel assembly mounted on a front surface of a door body including a front plate, a door liner, an upper cap decoration, a lower cap decoration, and a side panel, wherein the panel assembly may include: a panel configured to define an outer appearance thereof; an upper bracket provided on an upper end of a rear surface of the panel and coupled to the upper cap decoration; a lower bracket provided on a lower end of the rear surface of the panel and coupled to the lower cap decoration; and a panel fixing member provided along each of both ends of the rear surface of the panel and coupled to a side frame by passing through the panel assembly.

A refrigerator according to an embodiment of the present invention may include a door body and a panel assembly mounted on a front surface of the door body, wherein the panel assembly may include a panel fixing member protruding to pass through the front surface of the door body and provided in a hook shape so as to be hooked and restricted on the door body, wherein an elastic portion configured to elastically support a front surface of the door body may be disposed on the panel fixing member.

A refrigerator may include a door body and a panel assembly mounted on a front surface of the door body, wherein the panel assembly may be accommodated inside the door body, and upper and lower ends of the panel assembly may be coupled to upper and lower ends of the door body, respectively, and both ends of the panel assembly may be hooked and restricted on the front surface of the door body.

A refrigerator according to an embodiment of the present invention may include a panel assembly mounted on a front surface of a door body including a front plate, a door liner, an upper cap decoration, a lower cap decoration, and a side panel, wherein a lower end of the panel assembly may be inserted into a restriction rib disposed on the lower cap decoration while the panel assembly moves downward, wherein a panel fixing member protruding from a rear surface of the panel assembly may be restricted on the front surface of the door body, and an upper end of the panel assembly may be in contact with the upper cap decoration so as to be screw-coupled to the upper cap decoration.

A refrigerator according to an embodiment of the present invention may include: a door body filled with an insulator; a gasket provided on a rear surface of the door body; and a panel assembly mounted on a front surface of the door body, wherein the panel assembly may be provided in plurality along both ends of the panel assembly and be restricted and coupled by passing through the front surface of the door body, and the panel fixing member may be disposed outside the gasket.

A refrigerator according to an embodiment of the present invention may include: a cabinet configured to define a storage space; and a door configured to open and close the storage space, wherein the door may include a door body filled with an insulator, a side frame disposed on each of both left and right surfaces of the door body; a panel assembly mounted on a front surface of the door body and configured to define an outer appearance of the front surface of the door; and a plurality of panel fixing members protruding along both left and right ends of a rear surface of the panel assembly, wherein the panel fixing member may pass through the front surface of the door body so as to be restricted and coupled to the side frame inside the door body.

The panel fixing member may be disposed along both the left and right ends of the panel assembly.

The side frame may include: a frame side surface configured to define a side surface of the door body; and a frame front surface protruding from the frame side surface to support the front surface of the door body, wherein a frame opening, into which the panel fixing member is inserted, may be defined in the frame front surface.

The door body may include a front plate configured to define an outer appearance of a front surface thereof, and a plate opening communicating with the frame opening may be defined in the front plate, wherein the panel fixing member may pass through both the frame opening and the plate opening.

A space in which the panel fixing member is accommodated may be defined in the frame front surface, and an accommodation member configured to prevent the insulator from being permeated may be mounted on the frame front surface.

The accommodation member may include: an accommodation member mounting surface fixed to the frame front surface; and an accommodation portion recessed backward from the accommodation member mounting surface to define an accommodation space in which the panel fixing member is accommodated, wherein the accommodation portion may be larger than the frame opening.

A side rib may be disposed on the frame side surface, and the side rib may be spaced backward from the frame front surface, and one end of the accommodation member may be inserted between the frame front surface and the side rib.

An accommodation member, which has an opened front surface and is in close contact with the front surface of the door to define a space into which the panel fixing member is inserted and fixed, thereby preventing the insulator from being introduced, may be provided inside the door.

An accommodation member configured to define an accommodation space, into which the panel fixing member is inserted, may be provided in the side frame, and a gasket groove in which a gasket that is in contact with the front surface of the cabinet to seal the storage space is mounted, may be defined in the rear surface of the door body, wherein the panel fixing member and the accommodation member may protrude from a position facing the gasket groove.

The panel fixing member may include: a fixing member mounting portion mounted on a rear surface of the panel assembly; a hook portion protruding from one side of the fixing member mounting portion to extend downward after passing through the front surface of the door body; and an elastic portion provided on the hook portion so as to be elastically supported on the side frame.

The elastic portion may extend upward from a lower end of the hook portion and may be farther from the hook portion as the elastic portion extends upward.

The hook portion may be disposed to be eccentric to an outside with respect to a center of the fixing member mounting portion.

The door body may include: a front plate configured to define the front surface of the door body; a door liner provided behind the front plate and configured to define the rear surface of the door; an upper cap decoration connected to the front plate, the door liner, and the upper end of the side frame and configured to define a top surface of the door; and a lower cap decoration connected to the front plate, the door liner, and a lower end of the side frame and configured to define a bottom surface of the door, wherein the side frame may be coupled to both left and right ends of the front plate, and the panel fixing member may be mounted by passing through the front panel and the side frame.

An accommodation member configured to provide an accommodation space into which the panel fixing portion is inserted and restricted may be mounted on the side frame, wherein the accommodation member may prevent the insulator from being permeated into the accommodation space.

The panel assembly may include a panel made of a tempered glass material and having a circumference that is in contact with the upper cap decoration, the lower cap decoration, and the side frame, wherein the panel fixing member may be attached to a rear surface of the panel.

The panel assembly may include a panel made of a metal material and having a circumference that is bent to be in contact with the upper cap decoration, the lower cap decoration, and the side frame, wherein the panel fixing member may be attached to a rear surface of the panel.

The front plate may be made of a metal material, and a magnet attached to the front plate by magnetic force may be mounted on a rear surface of the panel assembly.

The panel assembly may include: a panel provided in a plate shape to define an outer appearance of the front surface of the door; an upper bracket extending along an upper end of a rear surface of the panel and coupled to the upper cap decoration; and a lower bracket extending along a lower end of the rear surface of the panel and coupled to the lower cap decoration, wherein the panel fixing member may be attached to the rear surface of the panel and provided in plurality along both left and right ends of the panel between the upper bracket and the lower bracket.

A lower support end extending to support a lower end of the panel may protrude from the lower cap decoration, and a restriction rib inserted into the lower end of the lower bracket may be disposed on the lower support end to restrict the lower end of the panel assembly.

A screw passing through the upper cap decoration may be coupled to the upper bracket to restrict the upper end of the panel assembly.

A refrigerator according to another aspect may include at least one or more fixing portions fixed to a plurality of frames to easily couple/separate a front panel.

In addition, when the front panel is coupled, the front panel may be hook-coupled through pressing, and when the front panel is separated, the hook coupling may be easily released through slidable movement.

A refrigerator according to further another aspect may include: a front frame; a front panel detachably provided in front of the front frame; a hook provided on the front panel and disposed between a front surface of the front frame and a rear surface of the front panel; and a hook coupling portion recessed in the front frame, wherein the hook coupling portion may include: a recessed portion including a plurality of side surfaces, which is recessed from a front surface of the front frame; and an inclined protrusion protruding at an inclination from both side surfaces of the recessed portion.

The inclined protrusion may be provided in pair that are contact with a bottom surface of the recessed portion and are closer to each other backward from a front side.

The hook may include: a plate attached to a rear surface of the front panel; and a hook member provided to be biased to the plate.

The hook member may include: an extension portion extending from the plate; and a hook portion bent from the extension portion to extend in directions that are away from each other.

The hook portion may move along the inclination of the inclined protrusion and be locked by pressing.

The locking between the hook portion and the inclined protrusion may be released by the slidable movement of the front panel.

The front frame may further include a front plate including a plurality of holes, and the hook coupling portion may further include an adhesion portion configured to surround the hole and attached to a rear surface of the front plate.

The refrigerator may further include an upper frame coupled to an upper portion of the front frame and a lower frame coupled to a lower portion of the front frame, wherein a fixing portion coupled to at least one of the upper frame or the lower frame may be provided on the front panel.

The upper frame may include a panel support portion on which the fixing portion is seated, wherein the panel support portion may include a first surface recessed from a top surface of the upper frame and a second surface recessed from a front surface of the upper frame.

The fixing portion may include an upper fixing portion extending from the rear surface of the front panel so as to be seated on the first surface.

The panel support portion and the upper fixing portion may be screw-coupled to each other.

The lower frame may include a lower recessed portion recessed from the front surface, and the fixing portion may include a lower fixing portion inserted into the lower recessed portion.

The lower fixing portion may extend to left and right sides of the front panel.

The lower fixing portion may include a first extension portion extending backward from the rear surface of the front panel and a second extension portion bent from the first extension portion to extend downward.

The lower recessed portion may include a first recessed portion extending backward from the front surface of the lower frame and a second recessed portion bent from the first recessed portion to extend downward, wherein the first extension portion may be disposed in the first recessed portion, and the second extension portion may be disposed in the second recessed portion.

Advantageous Effects

The following effects may be expected in the refrigerator according to the proposed embodiments of the present invention.

In the refrigerator according to the embodiment of the present invention, the lower bracket disposed on the lower end of the panel assembly may be coupled to the lower support end of the lower cap decoration by the restriction rib, and the upper bracket disposed on the upper end of the panel assembly may be fixed by the screw coupled to the lower cap decoration. In addition, the panel fixing member protruding from the rear surface of the panel assembly may pass through the front surface of the door body and be hooked and restricted.

Thus, when the refrigerator is viewed from the front side of the refrigerator, all the components configured to couple the panel assembly may be disposed behind the panel so as not to be exposed to the outside. That is, when the user looks at the refrigerator, the outer appearance of the front surface may be exposed, and thus, the coupling structure may not be exposed at all to improve the outer appearance of the refrigerator.

When the panel fixing member is mounted to be inserted into the plurality of openings defined at both the sides of the door body, the lower end and upper end of the panel assembly may be in contact with the upper end and the lower end of the lower cap decoration, respectively, and both the left and right ends of the panel assembly may be in contact with the side frame, and thus, when the panel is mounted, the panel may be naturally disposed at the accurate position.

In addition, since the entire circumference of the panel is fixed by the plurality of panel fixing members and the upper and lower brackets, after the panel is mounted, the accurately mounted position of the panel may be maintained without being changed in mounted position to prevent the gap from occurring in the circumference of the panel, thereby being maintained in outer appearance when the panel is initially mounted.

In addition, the upper and lower ends of the panel may be restricted by the upper cap decoration and the lower cap decoration, and the left and right ends of the panel may be restricted by the panel fixing member, and thus, the entire circumference of the panel may be fixed to more firmly and stably support the panel.

Particularly, the panel fixing member may have the structure that passes through the front plate and the side frame so as to be hooked and restricted by the side frame inside the door body. Thus, the entire weight of the panel assembly may be firmly supported by the side frame extending vertically from each of both the sides. The side frame may be extruded with the metal material, and thus, even if the panel assembly is made of the heavy tempered glass or metal material, there is the advantage in that the side frame is ensured in strong and stable mounting and maintenance.

The panel fixing member may include the hook-shaped hook portion, and the elastic portion configured to elastically support the front surface of the door body may be disposed on the end of the hook portion. Thus, the panel fixing member may be only inserted into and mounted inside the accommodation member to provide the elastic force by naturally deforming the elastic portion, and the panel assembly may be fixed and disposed in front of the door boy while the tension is applied.

Thus, there is an advantage in that the impact generated while the door is opened and closed is transmitted to the panel assembly to prevent the panel from being damaged. In addition, even if the components of the door are slightly deformed due to the temperature difference during the operation of the refrigerator, the deformation of the panel assembly itself or the load applied to the panel assembly may be offset by the tension applied to the panel assembly.

When the lower end of the panel assembly is slid to be inserted into the restriction protrusion of the lower cap decoration, the panel fixing member may be naturally inserted into the opening of the front surface of the door body so as to be hooked and restricted, and simultaneously, the upper cap decoration and the upper end of the panel assembly may be in close contact with each other. Thus, if the panel assembly is slid downward while approaching the front surface of the door body without performing the complicated processes when the panel assembly is mounted, the panel assembly may be easily mounted.

In the state in which the panel assembly is mounted, the upper coupling protrusion disposed on the upper bracket of the panel and the upper coupling portion of the upper cap decoration may be in close contact with each other to facilitate the screw coupling operation of the operator.

Particularly, the surface on which the upper coupling protrusion and the upper coupling portion are in contact with each other may be provided to be inclined so that the panel assembly is easily mounted without interfering with the upper cap decoration when the upper panel assembly is slide-in mounted.

In addition, the screw may be coupled in the inclined direction through the recessed space recessed into the upper end of the upper cap decoration and may be coupled in the direction crossing the upper coupling protrusion and the inclined surface of the upper coupling portion. Thus, there is an advantage in that the coupling operation of the screw is easy even in the state in which the door body is laid down.

In addition, in the state in which the screw is coupled, the recessed space may be shielded by the decoration cover to prevent the screw from being exposed.

All the panel fixing member and the accommodation member configured to restrict the panel assembly may be disposed outside the gasket on the rear side of the door. That is, although the panel fixing member is inserted, and the space for accommodating the panel fixing member is recessed from the door body, the recessed space may be disposed outside the gasket.

Therefore, the panel fixing member and the accommodation member may be disposed outside the area inside the gasket, i.e., the heat insulation area, and although occupying the space recessed inside the door, the thickness of the area corresponding to the heat insulation area may not be substantially affected to prevent the thermal insulation performance of the door from being deteriorated.

In addition, the front panel may be replaced without the space restriction.

BRIEF DESCRIPTION OF THE DRAWINGS

FIG. 12 is a front perspective view illustrating an accommodation member that is one component of the door body.

FIG. 13 is a rear perspective view illustrating the accommodation member.

MODE FOR CARRYING OUT THE INVENTION

Hereinafter, detailed embodiments will be described in detail with reference to the accompanying drawings. However, the present disclosure is limited to the embodiments in which the spirit of the present disclosure is proposed, and other degenerate idea or other embodiments included in the scope of the present disclosure may be easily proposed by addition, changes, deletions, etc. of other elements.

Prior to a description, directions are defined. In an embodiment of the present disclosure, a direction facing a front surface of the door illustrated in FIG. 2 may be defined as a front direction, a direction facing a cabinet with respect to the front surface of the door will be defined as a rear direction, a direction facing a bottom surface on which the refrigerator is installed will be defined as a downward direction, and a direction that is away from the bottom surface will be defined as an upward direction.

Figure 1:
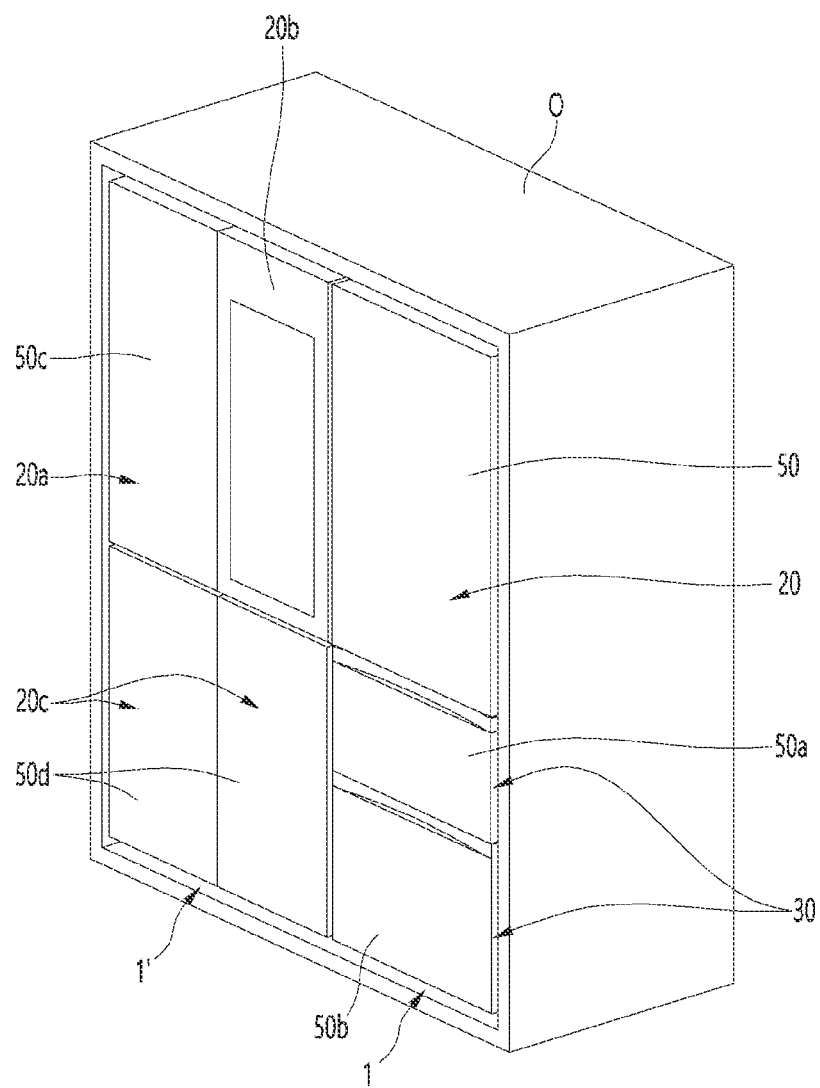
FIG. 1 is a perspective view illustrating a state in which a refrigerator is installed according to a first embodiment of the present invention.

FIG. 1 is a perspective view illustrating a state in which a refrigerator is installed according to a first embodiment of the present invention. Also, FIG. 2 is a perspective view of the refrigerator.

Figure 2:
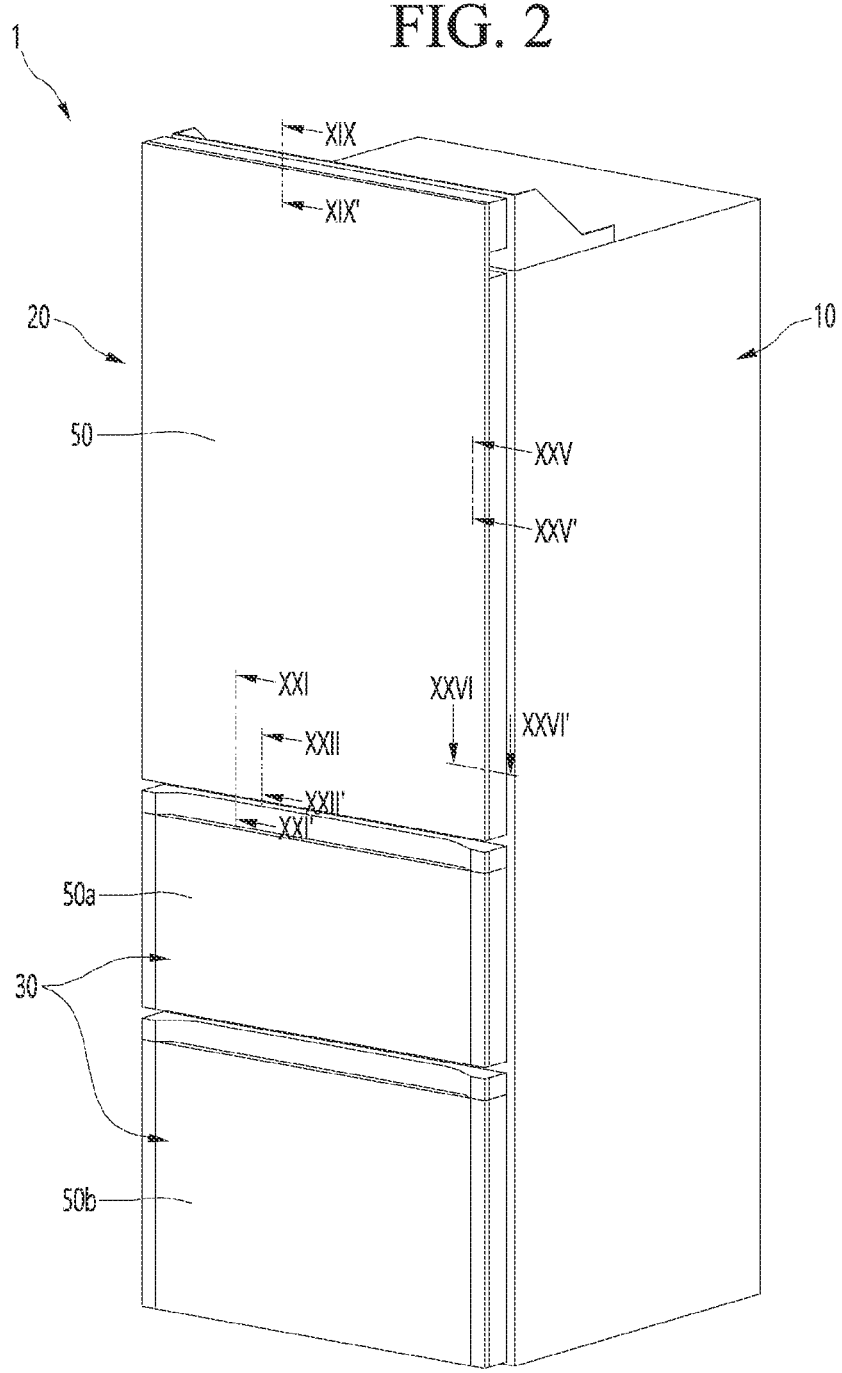
FIG. 2 is a perspective view of the refrigerator.

Referring to FIGS. 1 and 2, a refrigerator 1 according to an embodiment of the present invention includes a cabinet 10 defining a storage space having an opened front surface and doors 20 and 30 opening or closing the storage space.

Here, an outer appearance of the refrigerator 1 may be defined by the cabinet 10 and doors 20 and 30.

The refrigerator 1 may be mounted so as to harmonize with furniture or a wall O of an indoor space. For example, as illustrated in FIG. 1, the refrigerator 1 may be installed in the indoor space such as a kitchen and may be disposed adjacent to the furniture or the wall O to harmonize with each other. That is, a space corresponding to a size of the refrigerator 1 may be provided in the furniture or the wall O, and the refrigerator 1 may be accommodated or disposed in a built-in type.

The other refrigerator 1' may be continuously disposed in parallel at a side of the refrigerator 1. That is, a space in which the plurality of refrigerators 1 and 1' may be disposed may be provided by the furniture or the wall O.

The plurality of refrigerators 1 and 1' may have the same structure, and as necessary, the refrigerators 1 and 1' may have various structures. For example, as illustrated in FIG. 1, in the refrigerator 1 disposed at a right side, the doors 20 and 30 may be disposed vertically. That is, the right refrigerator 1 may be configured so that the door 20 that is opened and closed in a rotating manner is provided at an upper side, and the door 30 that is opened and closed in a sliding manner is provided at a lower side. The refrigerator 1 disposed at a left side may be configured so that an upper storage space is opened and closed by a pair of doors 20a and 20b, and a lower storage space is opened and closed by a pair of doors 20c. The doors 20a, 20b, and 20c may be opened and closed in the rotating manner, and the doors 20a, 20b, and 20c may be referred to as French-type doors.

Panel assemblies 50, 50a, 50b, 50c, and 50d, which are the same as or similar to each other, may be mounted on the doors 20, 30, 20a, and 20c of the left refrigerator 1' and the right refrigerator 1. The panel assemblies 50, 50a, 50b, 50c, and 50d may define front surfaces of the doors 20, 30, 20a, and 20c, and thus, outer appearances of the refrigerators 1 and 1' may be defined when viewed from a front side. Of course, one door 20b among the doors of the left refrigerator 1' may have a different outer appearance and be configured to have an internal see-through function. All of the remaining doors 20, 30, 20a, and 20c except for the door 20b having a specific function may have the same appearance.

That is, the doors 20, 30, 20a, and 20c of the refrigerators 1 and 1' have different sizes, but the panel assemblies 50, 50a, 50b, 50c, and 50d having structures, which are the same as or similar to each other, may be mounted. Thus, even if the plurality of refrigerators 1 and 1' are disposed, the same outer appearance, an outer appearance such as a color and texture may be provided. Of course, the panel assemblies 50, 50a, 50b, 50c, and 50d may have different colors or different textures as necessary.

Since each of the panel assemblies 50, 50a, 50b, 50c, and 50d has a detachable structure, the panel assemblies 50, 50a, 50b, 50c, and 50d having appropriate outer appearances may be selected according to an environment in which the refrigerators 1 and 1' so as to be mounted.

When the refrigerator 1 is mounted on the furniture or wall O, the outer appearance of the refrigerator 1 may be provided to have the same material or materials having the same texture as the furniture or wall O, and thus, the outer appearance of the refrigerator and the adjacent furniture or wall O may have a sense of unity. Of course, even if the outer appearance of the refrigerator 1 and the furniture or wall O do not have a sense of unity, the refrigerator 1 may be made of a material that is capable of harmonized with the furniture or wall O.

The refrigerator 1 may be disposed adjacent to the adjacent refrigerator 1' and the furniture or wall O and also may be disposed close to the adjacent refrigerator 1 and the furniture or wall O in a range that does not interfere when the doors 20 and 30 are opened and closed.

Structures and mounting structures of the panel assemblies 50, 50a, 50b, 50c, and 50d according to an embodiment may be the same in both the left refrigerator 1' and the right refrigerator 1. Therefore, hereinafter, a structure of the right refrigerator 1 of the refrigerators 1 and 1' of FIG. 1 will be described in more detail.

The refrigerator 1 may have an outer appearance defined by the cabinet 10 and the doors 20 and 30. The cabinet 10 may define a storage space that is divided vertically. The doors 20 and 30 that open and close the storage space may be continuously disposed in the vertical direction.

The upper storage space may be opened and closed by the upper door 20, and the lower storage space may be opened and closed by the lower door 30. The upper door 20 may open and close the upper storage space by rotation thereof. Thus, the upper door 20 may be referred to as a rotation type door. The lower door 30 may be withdrawn in a drawer type to open and close the lower storage space, and the lower door 30 may be referred to as a drawer type door 30.

The lower door 30 may be provided with two upper and lower doors, and the lower storage space opened and closed by the lower door 30 may be provided as one space, or a space in which each of the lower doors 30 is accommodated.

Outer appearances of front surfaces of the upper door 20 and the lower door 30 may be defined by the panel assemblies 50, 50a, and 50b, respectively. The panel assemblies 50, 50a, and 50b provided in the upper door 20 and the lower door 30, respectively, may be different in size and have the same appearance.

Hereinafter, for convenience of explanation and understanding, the panel assembly 50 and a mounting structure of the panel assembly 50 will be described with reference to the upper door 20. Hereinafter, the upper door 20 may be referred to as a "door 20".

Figure 3:
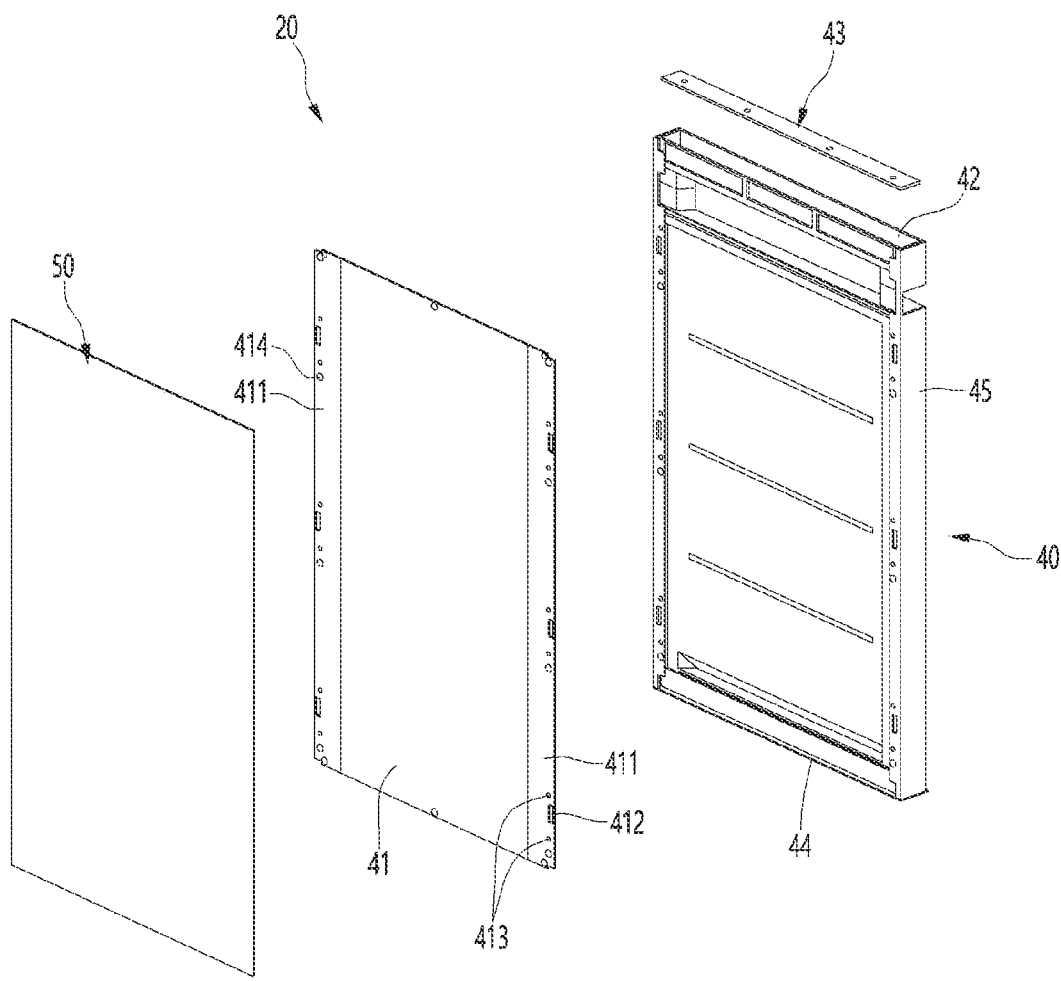
FIG. 3 is an exploded perspective view illustrating a refrigerator door according to an embodiment of the present invention.
Figure 4:
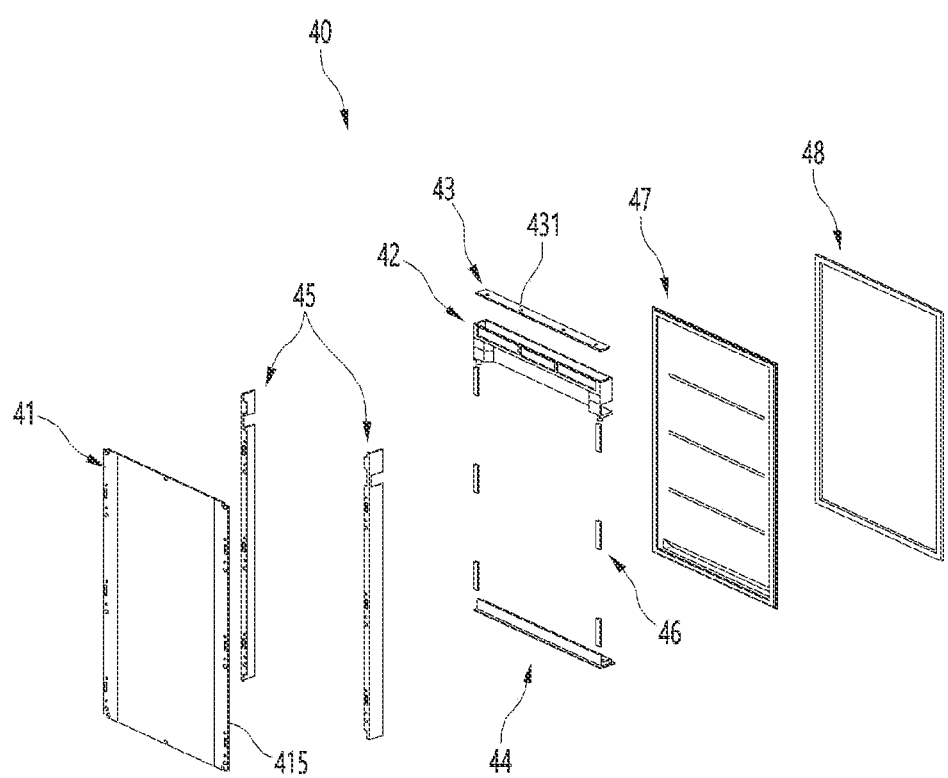
FIG. 4 is an exploded front perspective view illustrating a state in which a door body is disassembled according to an embodiment of the present invention.
Figure 5:
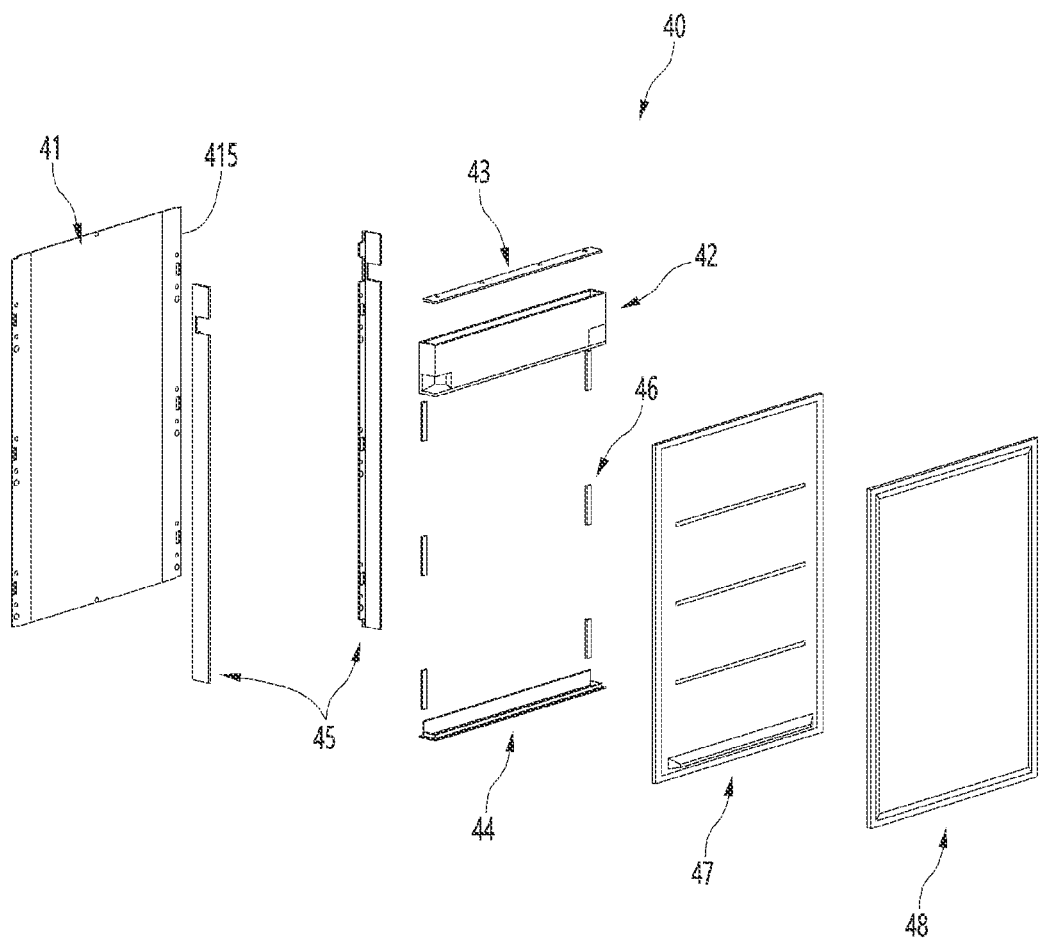
FIG. 5 is an exploded rear perspective view illustrating a state in which the door body is disassembled.

FIG. 3 is an exploded perspective view illustrating a refrigerator door according to an embodiment of the present invention. FIG. 4 is an exploded front perspective view illustrating a state in which a door body is disassembled according to an embodiment of the present invention. FIG. 5 is an exploded rear perspective view illustrating a state in which the door body is disassembled.

As illustrated in the drawings, the door 20 may be filled with an insulator 400 (see FIG. 16) and may include a door body 40 that substantially opens and closes the storage space and a panel assembly 50 mounted on the door body 40.

The door body 40 may have a predetermined thickness, and the insulator 400 may be filled therein to insulate the storage space. The panel assembly 50 may be mounted on a front surface of the door body 40 to define outer appearances of the front surfaces of the door 20 and the refrigerator 1. The panel assembly 50 may be mounted to be easily detachable from the door body 40, and the panel assembly 50 may be easily detachable even when the door 20 is mounted on the cabinet 10.

Thus, the panel assembly 50 may be mounted in consideration of the outer appearance of the furniture or wall O, and the panel assembly 50 may be designed to be desired by the user and be mounted or replaced as necessary.

Referring to the structure of the door body 40, the door body 40 may include portions or all of a front plate 41, a side frame 45, an upper cap decoration 42, a lower cap decoration 44, a door liner 47, and a gasket 48 as a whole. The insulator 400 may be filled inside the door body 40.

The door body 40 may also be referred to as a frame assembly. The upper cap decoration 42 may be referred to as an upper frame, and the lower cap decoration 44 may be referred to as a lower frame.

In detail, the front plate 41 may define a front surface of the door body 40 and be provided in a plate shape. The front plate 41 may be made of a steel material and define a surface facing a rear surface of the panel assembly 50.

One or more plate openings 412 may be defined in both ends of the front plate 41, respectively.

Although is not limited, a plurality of plate openings 412 may be defined in the vertical direction along both side ends of the front plate 41. Each of the plate openings 412 may be defined at a corresponding position so that a panel fixing member 55 to be described below is capable of being inserted. A protrusion hole 413 in which a restriction protrusion 464 of the accommodation member 46 to be described below is disposed may be defined above and below each of the plate openings 412.

A plurality of screw holes 414 may be defined along a circumference of the front plate 41. Screws coupled to the upper cap decoration 42, the lower cap decoration 44, and both the side frames 45 may be coupled to the screw hole 414.

The upper cap decoration 42 and the lower cap decoration 44 may be respectively disposed at upper and lower ends of the front plate 41 to define top and bottom surfaces of the door body 40. The side frames 45 may be coupled to both left and right side ends of the front plate 41, respectively, and upper and lower ends of each of the side frames 45 may be connected to the upper cap decoration 42 and the lower cap decoration 44, respectively.

The accommodation member 46 may be provided along the side frame 45. The accommodation member 46 may be disposed at a position corresponding to each of both side ends of the front plate 41 and may be provided in plurality in the vertical direction. The accommodation member 46 may be disposed to face the front plate 41 in a state of being mounted on the side frame 45, and the plate opening 412 and the frame opening 453 may communicate with the opened front surface of the accommodation member 46 so that the panel fixing member 55 is inserted therein.

The door liner 47 may be coupled to rear surfaces of the upper cap decoration 42, the lower cap decoration 44, and the side frame 45. The door liner 47 may be provided in a plate shape to define the rear surface of the door body 40. The door liner 47 may be made of a plastic material and may be vacuum-molded to define a shape of the rear surface of the door body 40.

A gasket groove 471 may be defined around the rear surface of the door liner 47, and the gasket 48 may be disposed along the gasket groove 471. The gasket 48 may be in contact with a circumference of the cabinet 10 while the door 20 is closed to seal the storage space.

Hereinafter, main components constituting the door body 40 will be described in more detail with reference to the drawings.

Figure 6:
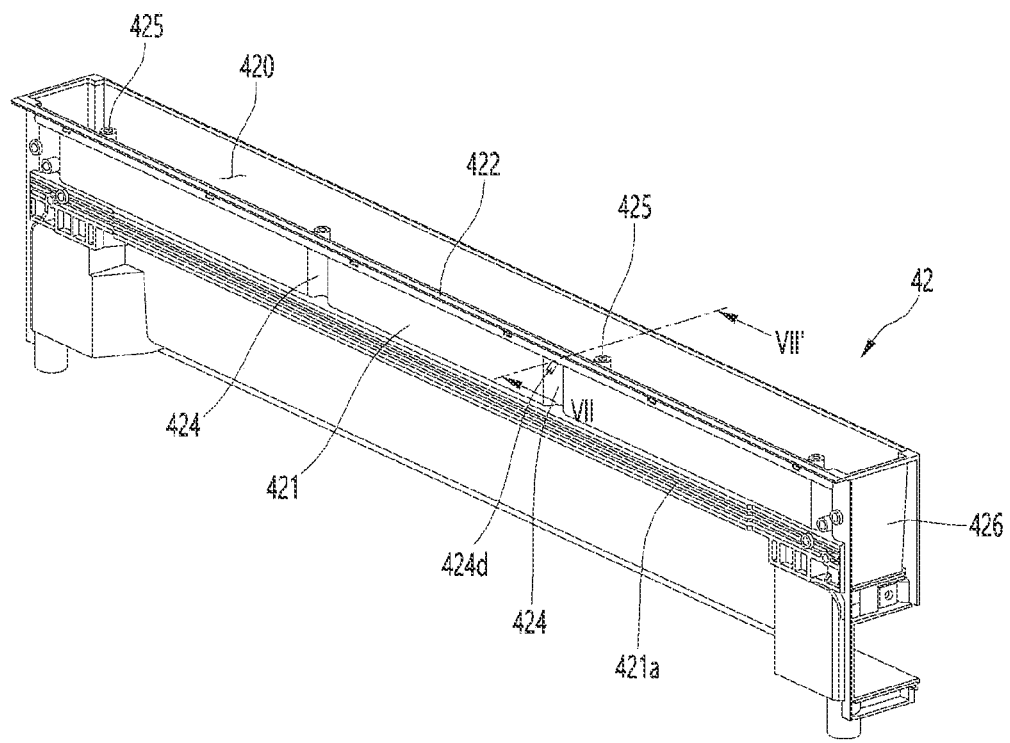
FIG. 6 is a perspective view illustrating an upper cap decoration that is one component of the door body.
Figure 7:
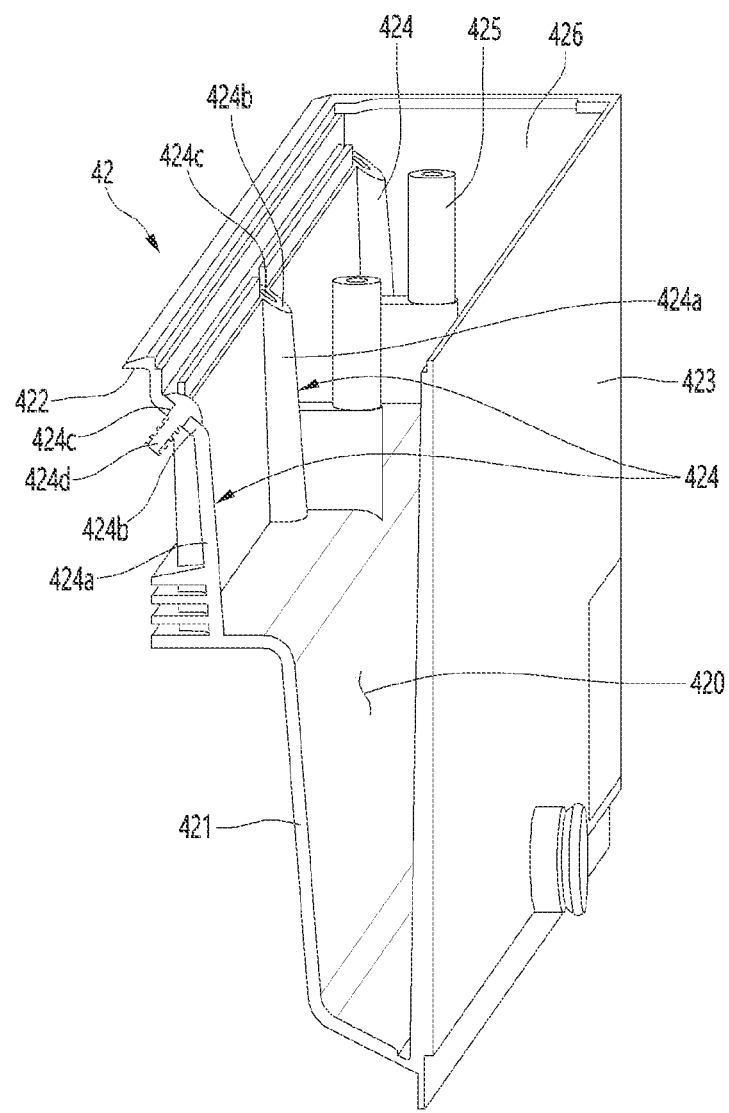
FIG. 7 is a cutaway perspective view taken along line VII-VII' of FIG. 6.

FIG. 6 is a perspective view illustrating an upper cap decoration that is one component of the door body. FIG. 7 is a cutaway perspective view taken along line VII-VII' of FIG. 6.

As illustrated in the drawings, the upper cap decoration 42 may define an upper portion of the door 20 and also may define a top surface of the door 20, which is exposed to the outside in an assembled state. The upper cap decoration 42 may be configured to support the front plate 41, the door liner 47, and the upper end of the side frame 45.

In detail, the upper cap decoration 42 may be made of a plastic material and may include a front surface 421, a rear surface 423, and both side surfaces 426. The front plate 41 may be coupled to the front surface 421, the door liner 47 may be coupled to the rear surface 423, and the side frame 45 may be coupled to each of both left and right side surfaces 426.

A recessed space 420 having an open top surface may be defined in the upper cap decoration 42, and a screw may be coupled to the upper end of the panel assembly 50 through the recessed space 420. A PCB for controlling electronic components provided in the door 20 may be accommodated inside the recessed space 420. The recessed space 420 may extend up to a lower end of the upper cap decoration 42, and during injection molding, the rear surface 423 may be provided in a planar shape. The opened top surface of the recessed space 420 may be shielded by the decoration cover 43. That is, the decoration cover 43 may define most of the outer appearance of the top surface of the door 20.

A plurality of screw holes 431 may be defined along the decoration cover 43. A cover support boss 425 extending vertically may be disposed inside the recessed space 420 corresponding to the screw hole 431. The cover support boss 425 may be disposed at a position corresponding to the screw hole 431 and may extend to support the decoration cover 43 at the lower side when the decoration cover 43 is mounted. The screw passing through the screw hole 431 may be coupled to a top surface of the cover support boss 425 so that the decoration cover 43 is fixed.

An upper coupling portion 424 to which a screw 424d coupled to an upper bracket 53 to be described in detail below is coupled may be disposed inside the recessed space 420. The upper coupling portion 424 may be disposed at a position corresponding to the upper coupling protrusion 533 protruding from the upper bracket 53. For example, four upper coupling portions 424 may be disposed at a pair of positions spaced apart from each other at left and right sides with respect to a center of the upper cap decoration 42. That is, the upper coupling portion 424 may be disposed at each of both the side ends of the upper cap decoration 42 and may be further disposed at each of inner sides spaced apart from both the side ends.

The upper coupling portion 424 may include an upper extension portion 424a extending along a front surface of the recessed space 420, an upper inclined surface 424b disposed at an upper end of the upper extension portion 424a, and an upper screw hole 424c defined in the upper inclined surface 424b.

The upper extension portion 424a may be provided so that a portion of the front surface 421 is recessed to accommodate the upper coupling protrusion 533 and may protrude from the inside of the recessed space 420. The upper extension portion 424a may extend upward, i.e., may extend to a position lower than that of the decoration cover 43. For example, the upper extension portion 424a may have a height equal to or slightly lower than a height of the cover support boss 425. Thus, in a state in which the decoration cover 43 is opened, the screw 424d may be easily coupled to the screw hole 424c defined in a top surface of the upper extension portion 424a.

An upper inclined surface 424b may be disposed on the top surface of the upper extension portion 424a. The upper inclined surface 424b may have a downward inclination at which a rear end thereof is lower than a front end thereof. The upper screw hole 424c to which the screw 424d is coupled may be defined in the upper inclined surface 424b. Thus, when the door 20 is assembled, in a state in which the rear surface of the door 20 faces the bottom, a space for the coupling of the screw 424d may be easily secured through the recessed space 420.

The front surface of the upper cap decoration 42 may be provided in a shape in which a lower portion thereof protrudes more backward than an upper portion thereof. An upper plate coupling portion 421a supporting the front plate 41 at the rear side may be disposed on the front surface of the upper cap decoration 42. The upper plate coupling portion 421a may extend from a left end to a right end of the upper cap decoration 42 and may be disposed so that a plurality of ribs and grooves are continuously disposed vertically at regular intervals. The upper plate coupling portion 421a and the upper cap decoration 42 may be coupled by a screw. When a foaming liquid is injected below the upper cap decoration 42 to mold the insulator 400, the upper cap decoration 42 and a rear surface of the front plate 41 may adhere to each other while being filled in the groove of the upper plate coupling portion 421a. In the upper plate coupling portion 421a may be disposed to pass through a lower end of the upper extension portion 424a.

An upper support end 422 protruding forward may be disposed on an upper end of a front surface of the upper cap decoration 42. The upper support end 422 may protrude forward and may support an upper end of the panel assembly 50. A protruding length of the upper support end 422 may be less than a thickness of the panel assembly 50. Thus, in the state in which the panel assembly 50 is mounted, the upper support end 422 may not protrude forward from the panel assembly 50. Thus, when viewed from a front side, the panel assembly 50 may be completely exposed, and the upper support end 422 may be prevented from being excessively exposed.

Figure 8:
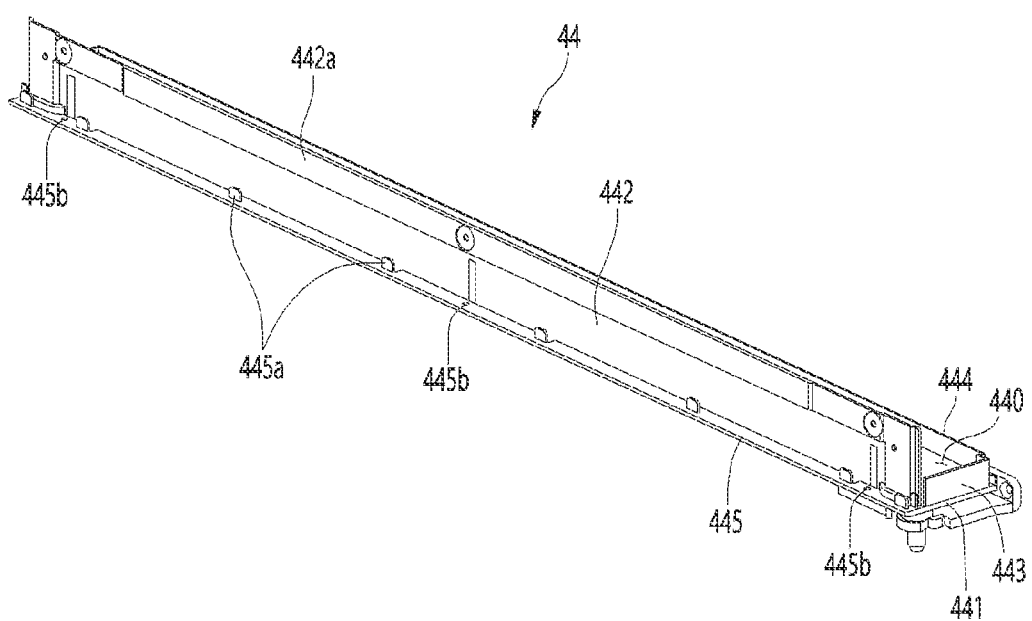
FIG. 8 is a perspective view illustrating a lower cap decoration that is one component of the door body.

FIG. 8 is a perspective view illustrating a lower cap decoration that is one component of the door body.

As illustrated in the drawings, the lower cap decoration 44 may be made of a plastic material may define a lower portion of the door body 40 and also define a bottom surface of the door body 40. The lower cap decoration 44 may generally include a bottom surface 441, a front surface 442, a rear surface 444, and both side surfaces 443. The lower cap decoration 44 may define a space 440 having an opened top surface, and the insulator 400 may be filled in the space 440.

The front surface 442 may support the lower end of the front plate 41 at the rear side. Both the side surfaces 443 may support the lower end of the side frame 45 at the inside. The rear surface 444 may support the lower end of the door liner 47 at a front side.

As described above, the closed space 440 may be defined by the front plate 41, the side frame 45, and the door liner 47, which are coupled to the front surface 442, both the side surfaces 443, and the rear surface 444 of the lower cap decoration 44, and the insulator 400 may be filled in the space 440.

A lower plate coupling portion 442a supporting the front plate 41 at the rear side may be disposed on the front surface of the lower cap decoration 44. The lower plate coupling portion 442a may extend from a left end to a right end of the front surface and may protrude slightly forward to support the front plate 41 at the rear side. A plurality of screws passing through the front plate 41 may be coupled to the lower plate coupling portion 442a.

A lower support end 445 extending forward may be disposed on a lower end of the front surface 442 of the lower cap decoration 44. The lower support end 445 may extend so that the bottom surface 441 of the lower cap decoration 44 passes through a lower end of the front surface 442 of the lower cap decoration 44.

The lower support end 445 may protrude to support the lower end of the panel assembly 50, and a protruding length of the lower support end 445 may be less than the thickness of the panel assembly 50. Thus, exposure of the lower support end 445 when viewed from the front side may be minimized so that the entire front surface of the door 20 is defined by the panel assembly 50.

A restriction rib 445a protruding upward may be disposed on a lower end of the lower support end 445. The restriction rib 445a may be inserted into a lower bracket 54 to be described below to restrict the lower end of the panel assembly 50.

A plurality of the restriction ribs 445a may be disposed at regular intervals along the lower support end 445. The restriction ribs 445a may be spaced apart from the front surface of the lower cap decoration 44. An opening 445c may be defined in the lower support end 445 between the restriction rib 445a and the front surface 442. When the lower cap decoration 44 is injection-molded, the restriction rib 445a may be molded by the opening 445c.

A plurality of lower coupling holes 445b may be defined in the lower support end 445. The lower coupling hole 445b may be defined so that the screw 545b coupled by passing through the lower support end 445 at the lower side passes therethrough. The screw 545b may be coupled to the lower bracket 54 through the lower coupling hole 445b, and a lower end of the panel assembly 50, which is seated on the lower support end 445, may be securely fixed.

Figure 9:
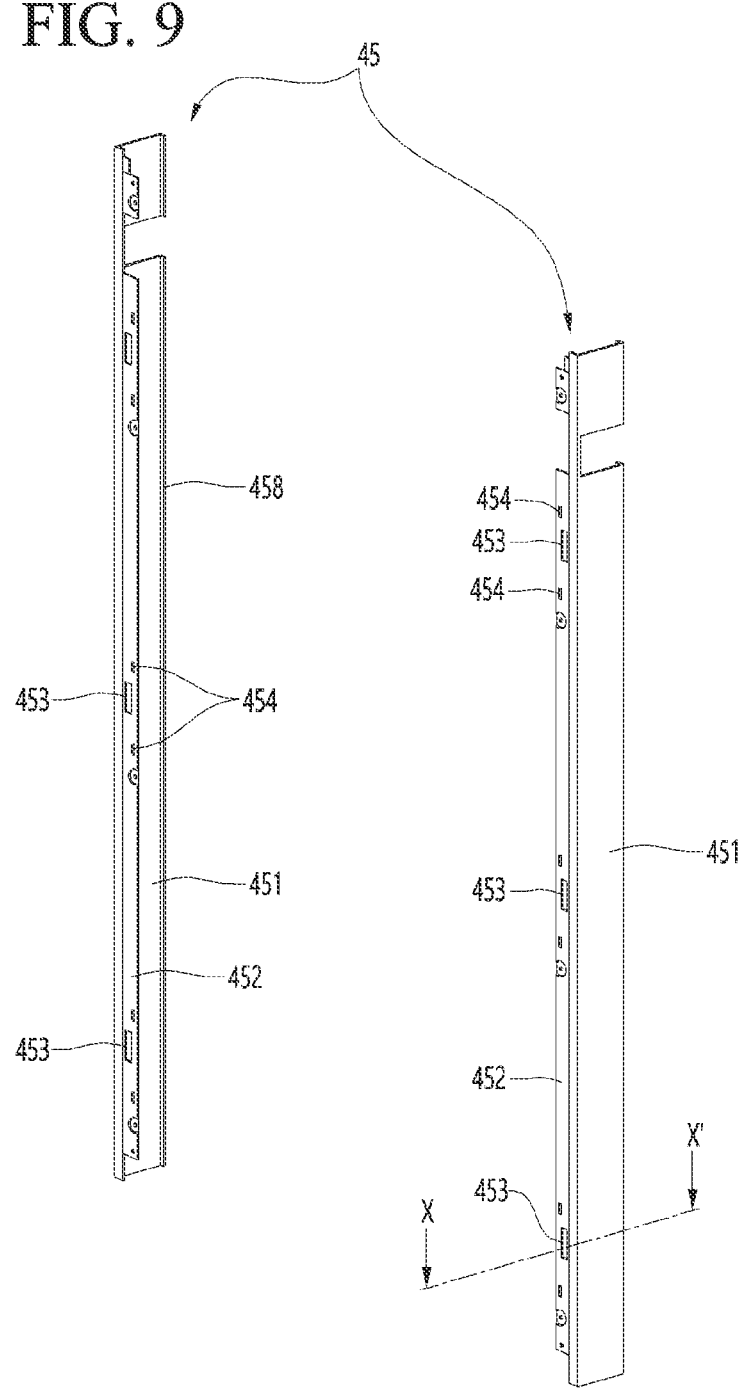
FIG. 9 is a perspective view illustrating a side frame that is one component of the door body.
Figure 10:
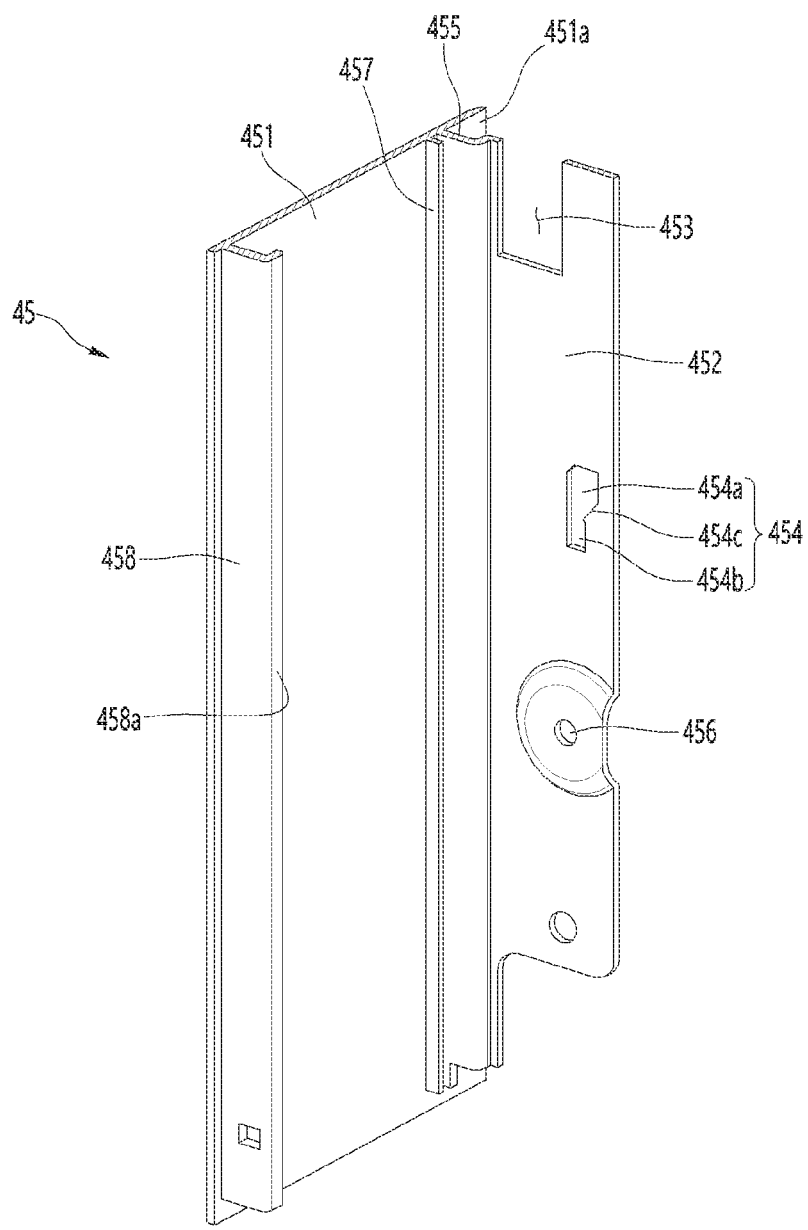
FIG. 10 is a cutaway perspective view taken along line X-X' of FIG. 9.
Figure 11:
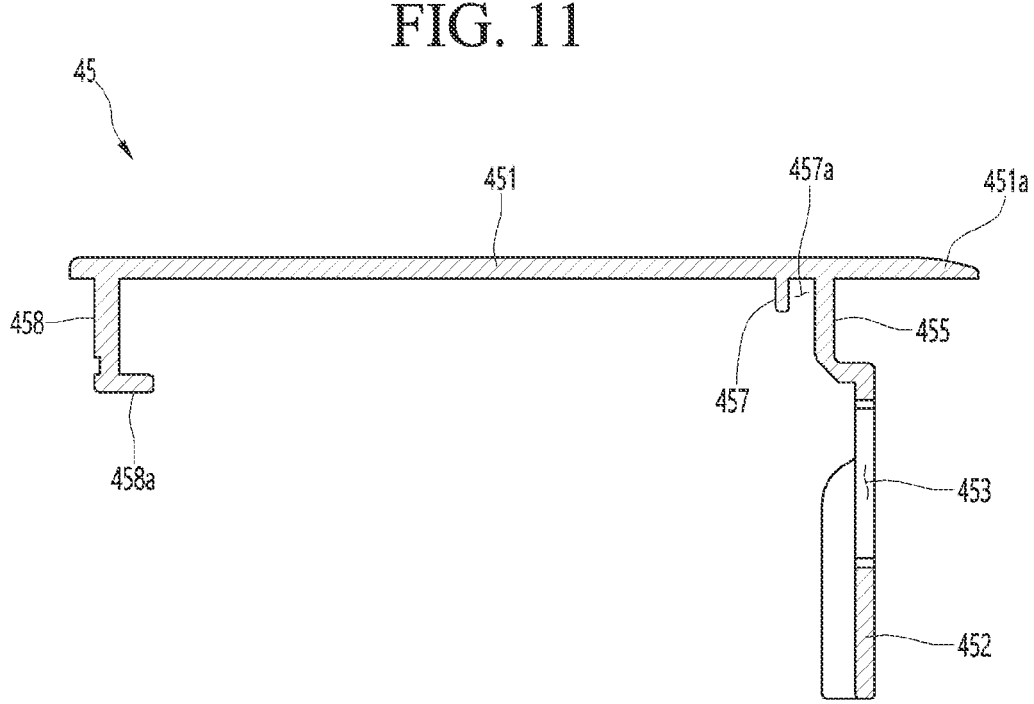
FIG. 11 is a plan view of FIG. 10.

FIG. 9 is a perspective view of the side frame that is one component of the door body. FIG. 10 is a cutaway perspective view taken along line X-X' of FIG. 9. FIG. 11 is a plan view of FIG. 10.

As shown in the drawings, the side frame 45 may connect the upper cap decoration 42 to the lower cap decoration 44. The side frame 45 may connect the front plate 41 to the door liner 47. The side frame 45 may define both side surfaces of the door body 40.

The side frame 45 may extend lengthily in the vertical direction and may be formed through extrusion of a metal material. For example, the side frame 45 may be made of an aluminum material. Thus, the side frame 45 may allow an outer appearance of a side surface of the door 20 to be more luxurious. Also, the side frame 45 may reinforce strength of the door 20 to prevent the door 20 from being deformed. Particularly, the accommodation member 46 coupled to the panel fixing member 55 may be mounted on the side frame 45, and the side frame 45 may firmly support the portion, on which the panel assembly is mounted, to maintain a stably mounted state of the panel assembly 50 and prevent the door body 40 from being deformed.

The side frames 45 at both left and right sides may have the same shape and may be disposed to face each other. That is, the side frames 45 disposed on both sides may be disposed to be symmetrical horizontally with respect to the center of the door body 40. Thus, to avoid overlapping descriptions, the side frame 45 on one of both the left and right sides will be described.

Referring to the detailed structure of the side frame 45, the side frame 45 may include a frame side surface 451, a frame front surface 452, and a front rear surface 458.

In detail, the frame side surface 451 may define a surface exposed to a side of the door body 40 and be provided in a flat shape. An upper end of the frame side surface 451 may be in contact with the upper cap decoration 42, and a lower end of the frame side surface 451 may be in contact with the lower cap decoration 44.

The frame front surface 452 may extend inward from a front end of the frame side surface 451. The frame front surface 452 may support both left and right side ends of the front plate 41. The frame front surface 452 may extend from an upper end to a lower end of the side frame 45 and be disposed perpendicular to the frame side surface 451.

The frame front surface 452 may have a width so that at least the accommodation member 46 is mounted and may support both left and right side ends of the front plate 41. In detail, the accommodation member 46 may be mounted on an area on which the front plate 41 and the frame front surface 452 overlap each other. For example, a width of the frame front surface 452 may be at least greater than that of the accommodation member 46.

A plurality of frame openings 453 may be defined in the frame front surface 452. The frame opening 453 may be defined at a position corresponding to the accommodation member 46. That is, the frame opening 453 may be defined at a position corresponding to a position at which the accommodation member 46 is mounted along the frame front surface 452. In this case, the frame opening 453 may have a size corresponding to each of the plate opening 412 and the opened front surface of the accommodation member 46. The accommodation member 46 may be mounted behind the frame front surface 452.

In detail, a restriction hole 454 into which the restriction protrusion 464 of the accommodation member 46 is inserted may be defined above and below the plate opening 412. When the restriction protrusion 464 is mounted in the restriction hole 454, the accommodation member 46 may be in close contact with the frame front surface 452. Here, the opened front surface of the accommodation member 46 may be aligned to communicate with the frame opening 453 and the plate opening 412.

The restriction hole 454 may be defined in the same shape at each of upper and lower sides of the plate opening 412, and upper and lower portions of the accommodation member 46 may be fixedly mounted to the side frame 45.

The restriction hole 454 may be defined in the shape of a hole passing through the frame front surface 452. The restriction hole 454 may include an upper protrusion insertion portion 454a and a lower protrusion restraining portion 454b. Each of the protrusion insertion portions 454a may be provided to be the same as or slightly larger than the restriction protrusion 464 so that the restriction protrusion 464 is inserted. The protrusion restriction portion 454b may be disposed below the protrusion insertion portion 454a. The protrusion restraining portion 454b may be provided to be slightly less than a size of the restriction protrusion 464, and the ring-shaped restriction protrusion 464 may be inserted.

That is, when the accommodation member 46 is disposed on the frame front surface 452 so that the restriction protrusion 464 is inserted into the protrusion insertion portion 454a, and then the accommodation member 46 moves downward, the restriction protrusion 464 may move to the inside of the protrusion restriction portion 454b, and the restriction protrusion 464 may be restricted inside the protrusion restriction portion 454b so that the accommodation member 46 is firmly fixed to the side frame 45.

The restriction hole 454 may include a guide inclined portion 454c. The guide inclined portion 454c may be provided to connect a lower end of the protrusion insertion portion 454a to an upper end of the protrusion restraining portion 454b, and the restriction protrusion may be inclined, and thus, the restriction protrusion 464 inserted into the protrusion insertion portion 454a may be naturally inserted into the protrusion restriction portion 454b.

A plurality of side coupling portions 456 may be disposed on the frame front surface 452. Both ends of the front plate 41 may be supported on the front surface of the side coupling portion 456. A screw passing through the front plate 41 may be coupled to the side coupling portion 456, and both ends of the front plate 41 may be coupled to the side frame 45.

A side groove 455 that is stepped and connected to the frame side surface 451 may be defined in an outer end of the frame front surface 452. In the side groove 455, a bent plate bent portion 415 may be inserted into each of both left and right ends of the front plate 41. The plate bent portion 415 may be provided in a shape corresponding to an edge portion at which the frame front surface 452 and the side groove 455 are in contact with each other so that the plate bent portion 415 is disposed inside the side groove 455. A stepped portion may be provided between the frame front surface 452 and the side groove 455.

The side support end 451a may be disposed along one end of the side groove 455. The side support end 451a may be provided to extend forward from one end of the side groove 455. In the side support end 451a, the frame side surface 451 may further extend via one end of the side groove 455.

An extending length of the side support end 451a may be greater than a thickness of the panel assembly 50. Thus, when the panel assembly 50 is mounted, the exposure of the side support end 451a may be minimized, and the front surface of the panel assembly may be exposed when viewed from the front to forming most of an outer appearance of the front surface of the door 20.

A side rib 457 may be disposed behind the side groove 455. The side rib 457 may extend from an upper end to a lower end of the frame side surface 451 and may be provided to a predetermined height.

An insertion groove 457a into which an end of the accommodation member 46 is inserted may be further defined between the side rib 457 and the side groove 455. Thus, a thickness of one end of the accommodation member 46 may be provided to correspond to a width of a space defined by the side rib 457 and the side groove 455 so that an outer end of the accommodation member 46 is inserted into a space between the side rib 457 and the side groove 455.

A frame rear surface 458 vertically extending inward may be disposed on a front end of the frame side surface 451. The frame rear surface 458 may be disposed at a position facing the side groove 455. A rear extension portion 458a extending forward may be further disposed on an extending end of the frame rear surface 458. Left and right side ends of the door liner 47 may be hooked and restricted by the frame rear surface 458, particularly, the rear extension portion 458a.

FIG. 12 is a front perspective view of an accommodation member that is one component of the door body. FIG. 13 is a rear perspective view of the accommodation member.

As illustrated in the drawings, the accommodation member 46 may be injection-molded with a plastic material and include an accommodation member mounting surface 461 and an accommodation portion 462 recessed from the accommodation member mounting surface 461. The accommodation member 46 may be mounted inside the door body 40 to prevent the insulator 400 from leaking to the outside, and simultaneously, may provide an accommodation space 463 into which the panel fixing member 55 is inserted to be hooked and restricted.

In detail, the accommodation member mounting surface 461 may be a portion that is in close contact with the frame front surface 452 at a rear side of the frame front surface 452 and may be provided to be greater than the frame opening 453. A vertical length of the accommodation member mounting surface 461 may be greater than a distance between the upper and lower restriction holes 454 of the frame opening 453. A horizontal width of the accommodation member mounting surface 461 may be the same as or slightly less than the width of the frame front surface 452.

The accommodation member mounting surface 461 may be provided with an accommodation portion 462 that is recessed backward. The accommodation portion 462 may define a hook accommodation space 463 that is opened forward. When viewed from the rear, the accommodation portion 462 may protrude backward from a central portion of the accommodation member mounting surface 461. A size of the accommodation space 463 may be defined to be greater than each of a vertical length and a left and right width of the hook portion 556 of the panel fixing member 55, and thus, the hooking and restriction operation between the panel fixing member 55 and the accommodation member 46 may be more easily performed.

The restriction protrusion 464 may be disposed above and below the accommodation portion 462. The restriction protrusion 464 may protrude from a front surface of the accommodation member mounting surface 461 and may be disposed at a position corresponding to the restriction hole 454 to pass through the restriction hole 454. A protruding end of the restriction protrusion 464 may be bent laterally so as to be hooked to be restricted in the state of passing through the restriction hole 454.

Thus, in a state in which the accommodation member 46 is mounted on the side frame 45, the front surface of the accommodation member mounting surface 461 may be fixed in a state of being in close contact with a rear surface of the frame front surface 452. In such a state, even if a foaming liquid is filled to provide the insulator 400 inside the door body 40, the foaming liquid may be prevented from being permeated between the accommodation member mounting surface 461 and the frame front surface 452.

An accommodation member fixing portion 465 extending laterally may be disposed on one end of the accommodation member mounting surface 461. The accommodation member fixing portion 465 may be provided in a shape corresponding to a shape of the side groove 455 so as to be in close contact with the rear surface of the side groove 455. That is, the accommodation member fixing portion 465 may be provided to be stepped or rounded backward from one end of the accommodation member mounting surface 461, and when the accommodation member 46 is mounted on the side frame 45, the accommodation member 46 may be in close contact with the side groove 455.

An extending end 465a of the accommodation member fixing portion 465 may be inserted into the insertion groove 457a between the side rib 457 and the side groove 455. One end 465a of the accommodation member 46 may be inserted into and fixed to the insertion groove 457a of the side frame 45. Also, a fixing end 466 extending backward may be further disposed on the accommodation member fixing portion 465. The fixing end 466 may be in contact with an end of the side rib 457 in the state in which the accommodation member fixing portion 465 is inserted into the insertion groove 457a. Thus, the side rib 457 may support the fixing end 466 and fix the accommodation member 46 so as not to move or be separated in the state of being mounted on the side frame 45.

Hereinafter, a coupling relationship between the accommodation member 46, the side frame 45, and the front plate 41 will be described in more detail with reference to the drawings.

Figure 14:
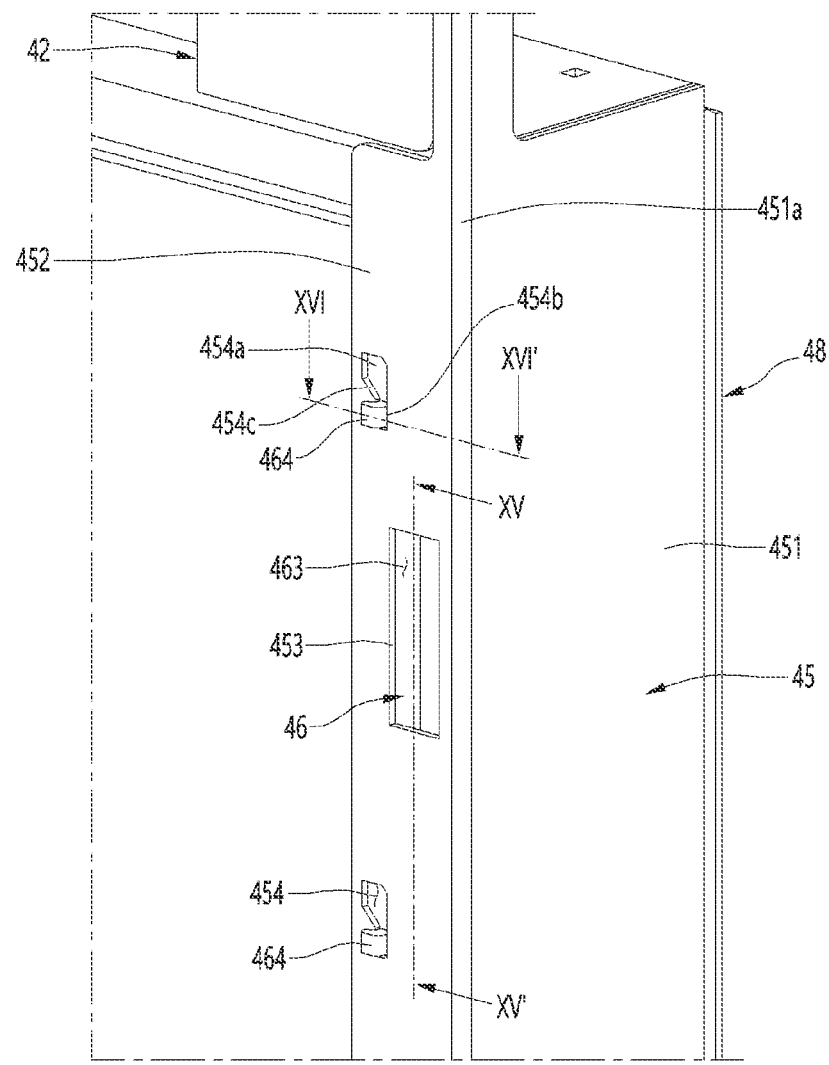
FIG. 14 is a partial perspective view illustrating a state in which the accommodation member is mounted on the side frame.
Figure 15:
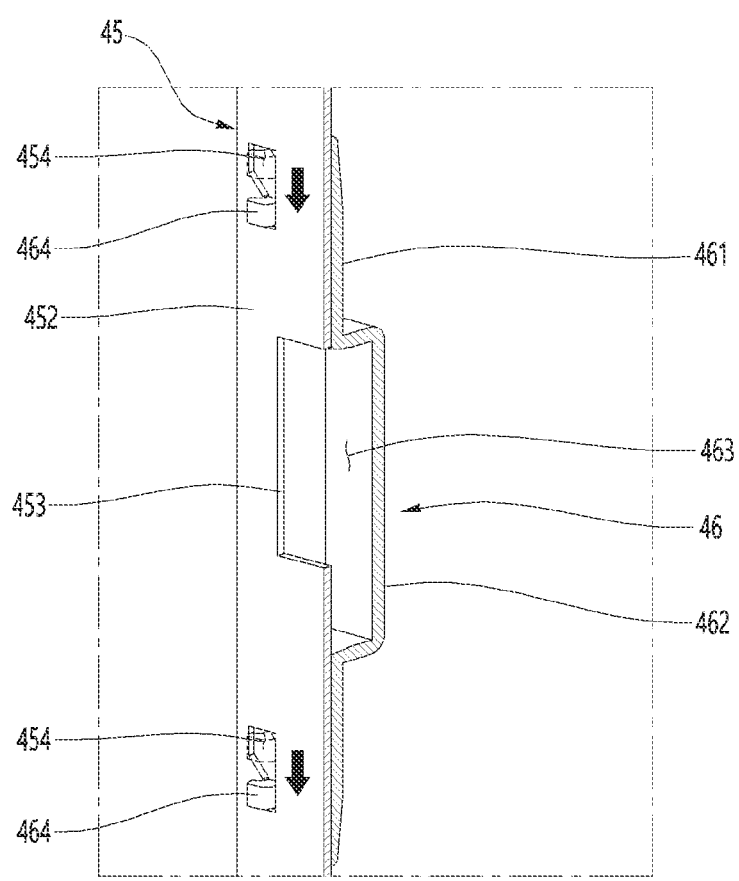
FIG. 15 is a cutaway perspective view taken along line XV-XV of FIG. 14.
Figure 16:
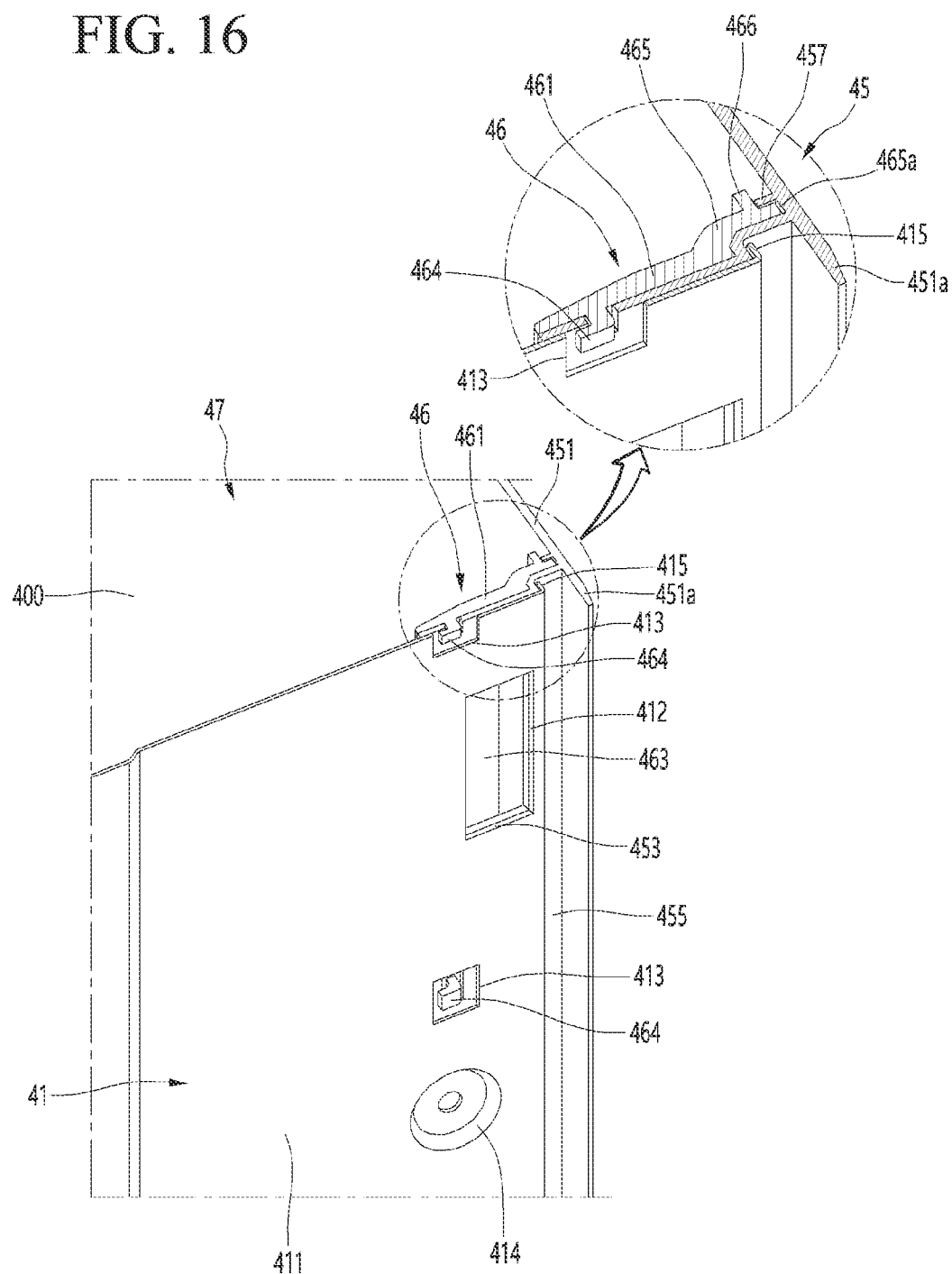
FIG. 16 is a cutaway perspective view illustrating a state, in which a front plate is mounted, taken along line XVI-XVI' in FIG. 14.

FIG. 14 is a partial perspective view illustrating a state in which the accommodation member is mounted on the side frame. FIG. 15 is a cutaway perspective view taken along line XV-XV' of FIG. 14. FIG. 16 is a cutaway perspective view illustrating a state, in which a front plate is mounted, taken along line XVI-XVI' in FIG. 14.

As illustrated in the drawings, the accommodation member 46 may be coupled inside the side frame 45, that is, at the rear side of the frame front surface 452. To mount the accommodation member 46, first, the accommodation member fixing portion 465 may be inserted into the insertion groove 457*a*, so that one end of the accommodation member 46 is fixed to a rear side of the frame front surface 452.

In this state, a pair of restriction protrusions 464 disposed vertically may inserted into the restriction holes 454, respectively. Here, when the restriction protrusion 464 is inserted through the protrusion insertion portion 454*a*, and the accommodation member 46 moves downward in the state in which the restriction protrusion 464 is inserted into the protrusion insertion portion 454*a*, the restriction protrusion 464 may be naturally inserted into the protrusion restraining portion 454*b* along the guide inclined portion 454*c*, and the restriction protrusion 464 may be hooked and restricted with the protrusion restraining portion 454*b*. In this state, the accommodation member mounting surface 461 and the accommodation member fixing portion 465 of the accommodation member 46 may be maintained in close contact with the frame front surface 452 and the side groove 455, respectively.

When the restriction protrusion 464 is mounted at a fixed position so that the restriction protrusion 464 is hooked to be restricted inside the restriction hole 454, and the opened front surface of the accommodation portion 462 may communicate with the frame opening 453. Here, the opened front surface of the accommodation portion 462 may have a size greater than that of the frame opening 453, and thus, the frame opening 453 may be disposed in an inner region of the opened front surface of the accommodation portion 462.

The hook portion 556 of the panel fixing member 55 inserted into the accommodation space 463 may be hooked and restricted below the frame opening 453.

That is, in the state in which the accommodation member 46 is mounted on the side frame 45, an upper end of the frame opening 453 may be disposed on the same line as an upper end of the opened front surface of the accommodating part 462, and a lower end of the frame opening 453 may be disposed higher than a lower end of the opened front surface of the accommodation portion 462. Thus, the hook portion 556 passing through the frame opening 453 and inserted into the accommodation space 463 may be hooked on the frame front surface 452 below the frame opening 453. In this case, a vertical length of the frame opening 453 may be greater than a vertical length of the hook portion 556 to facilitate passing and downward movement of the hook portion 556.

The front plate 41 may be supported by the frame front surface 452 of the side frame 45 at both side surfaces. The bent portion 415 at each of both ends of the front plate 41 may be inserted into the side grooves 455 and be hooked in the stepped portion of the side grooves 455. A screw passing through the screw hole 414 of the front plate 41 may be coupled to the side coupling portion 456 so as to be firmly fixed to the side frame 45.

The front plate 41 may define the outer appearance of the front surface of the door body 40 in the mounted state. Thus, the front plate 41 may shield the front surface 452 of the frame.

In the state in which the front plate 41 is mounted, the plate opening 412 may communicate with the frame opening 453 and the accommodation space 463. The plate opening 412 may have the same shape as the frame opening 453. In addition, the protrusion hole 413 may be disposed at a position corresponding to the restriction hole 454, and the restriction hole 454 and the restriction protrusion 464 that are in a state of being hooked in the restriction hole 454 may be exposed inside the protrusion hole 413.

The frame front side 452 on which the accommodation member 46 is mounted may be disposed on each of the side portions 411 stepped at both ends of the front plate 41. The side portion 411 may be provided in a shape that is stepped backward, and the restriction protrusion 464 exposed to the inside of the protrusion hole 413 may not protrude further than the front surface of the front plate 41. Thus, even though the panel assembly 50 is mounted, the rear surface of the panel assembly 50 may be prevented from interfering with the restriction protrusion 464.

The accommodation member 46 may be mounted on the side frame 45, and in a state in which the front plate 41, the door liner 47, the upper cap decoration 42, and the lower cap decoration 44 are coupled to each other, a foaming solution may be filled in the door body to mold the insulator 400.

When the assembly of the door body 40 is completed, the panel assembly 50 may be mounted on the front surface of the door body 40.

Hereinafter, the panel assembly 50 will be described in more detail with reference to the drawings.

Figure 17:
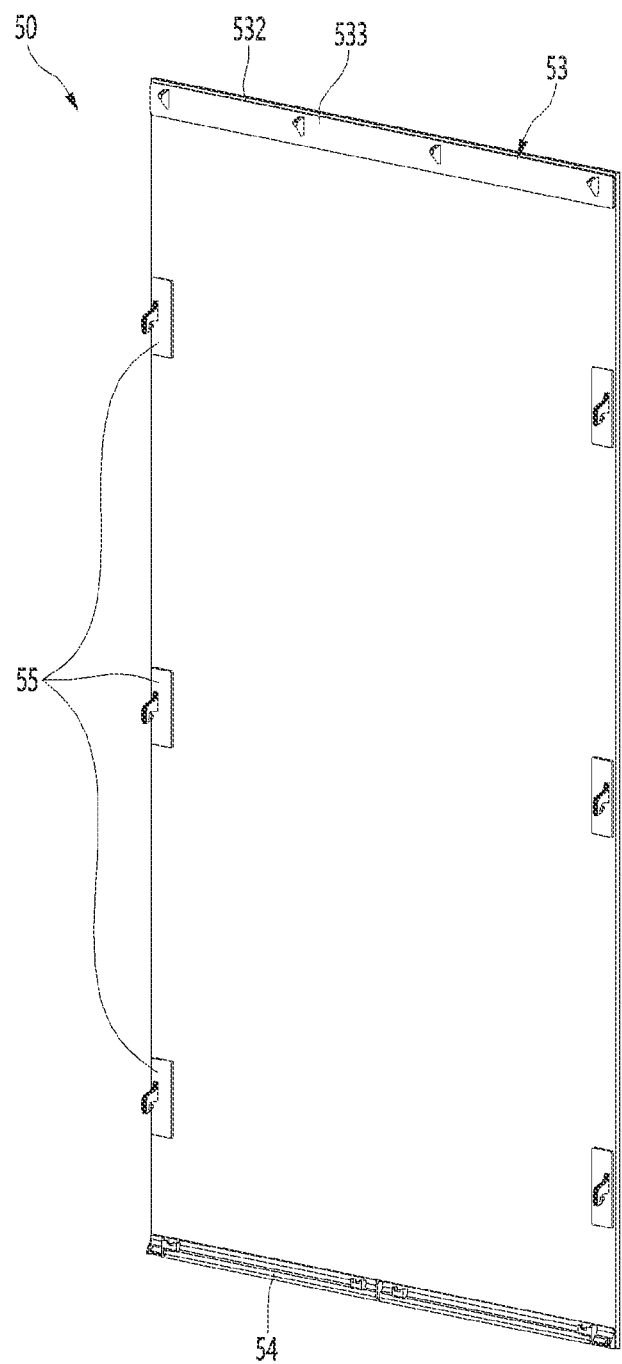
FIG. 17 is a rear perspective view illustrating a panel assembly according to an embodiment of the present invention.

FIG. 17 is a rear perspective view illustrating the panel assembly according to an embodiment of the present invention.

As illustrated in the drawing, the panel assembly 50 may have a size corresponding to that of a front surface of the door body 40 and be configured to define an outer appearance of an entire front surface of the door 20 in a state of being mounted on the door body 40.

The panel assembly 50 may include a plate-shaped panel 51 (or a front panel) defining an outer appearance thereof, an upper bracket 53 and a lower bracket 54 for fixing upper and lower ends of the panel 51, and a panel fixing member 55 connecting a rear surface of the panel 51 to a front surface of the door body 40.

In detail, the panel 51 may be made of a rectangular plate-shaped material having a predetermined thickness and may be made of a material that is capable of being harmonized with the furniture or wall O or the home appliance disposed therearound. For example, the panel 51 may be made of a glass material. For example, the panel 51 may be made of a tempered glass material, and the outer appearance of the door 20 may be defined by printing or attaching a film so as to have a color or pattern.

The panel 51 may have a size so that, in the state in which the panel 51 is mounted on the door body 40, upper end lower ends of the panel 51 are supported by an upper support end 422 and a lower support end 445, respectively, and both side ends of the panel 51 are supported by side support ends 451*a*, respectively.

An upper bracket 53 and a lower bracket 54 may be provided on upper and lower ends of the rear surface of the panel 51, respectively. The upper bracket 53 and the lower bracket 54 may be configured so that the upper and lower ends of the panel assembly 50 are fixedly mounted to the door body 40. The upper bracket 53 and the lower bracket 54 may be referred to as an upper fixing portion and a lower fixing portion, respectively.

The upper bracket 53 and the lower bracket 54 may extend along upper and lower ends of the panel 51, respectively, and each of the upper bracket 153 and the lower bracket 154 may have a length corresponding to a horizontal width of the panel 51. When the panel assembly 50 is mounted, the upper bracket 53 and the lower bracket 54 may be coupled to the upper cap decoration 42 and the lower cap decoration 44, respectively.

A plurality of panel fixing members 55 may be continuously disposed in the vertical direction along the left and right side ends of the rear surface of the panel 51. For example, three panel fixing members 55 may be provided on each of the left and right side surfaces of the panel 51 and may be provided on a central portion of the panel in the vertical direction and vertical portions spaced apart from the central portion, respectively, and also, left and right ends of the panel assembly 50 may be fixed to the door body 40. Of course, the number of panel fixing members 55 may be adjustable according to the total length of the panel assembly 50.

Hereinafter, the structure of the upper bracket 53 will be described in detail with reference to the drawings.

Figure 18:
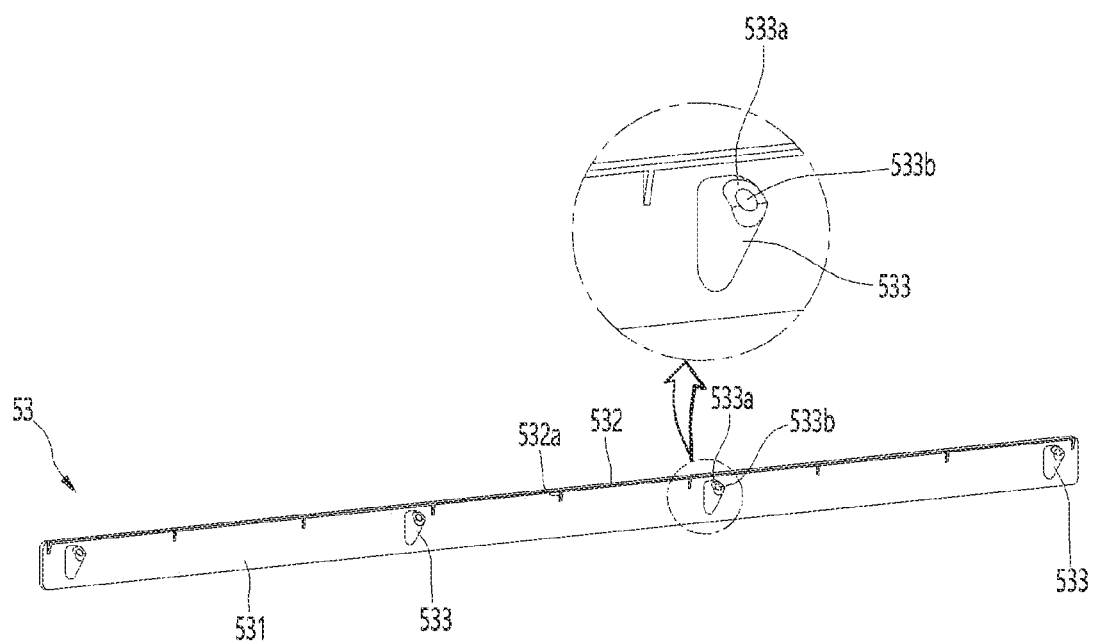
FIG. 18 is a perspective view illustrating an upper bracket that is one component of the panel assembly.
Figure 19:
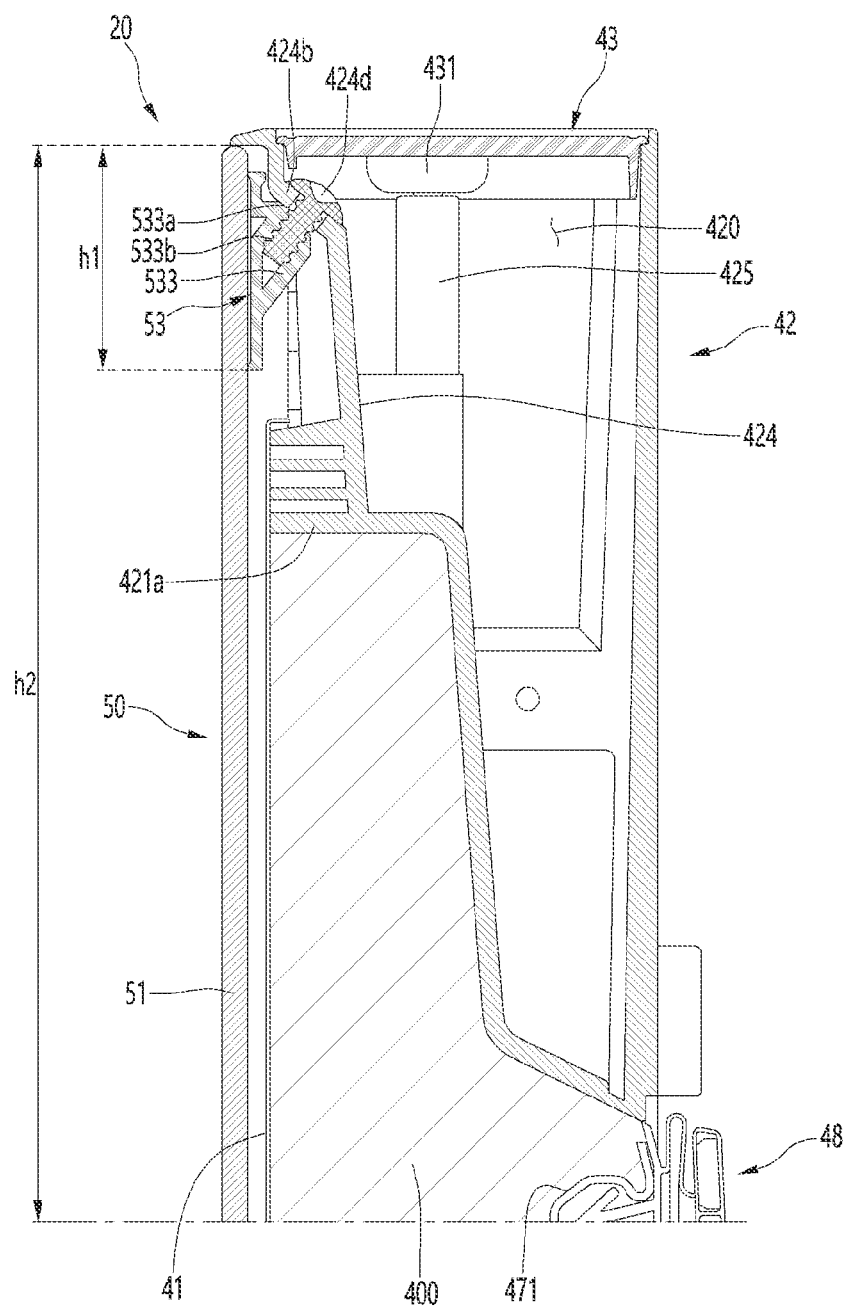
FIG. 19 is a cross-sectional view taken along line XIX-XIX' of FIG. 2.

FIG. 18 is a perspective view illustrating the upper bracket that is one component of the panel assembly. FIG. 19 is a cross-sectional view taken along line XIX-XIX' of FIG. 2.

As illustrated in the drawings, the upper bracket 53 may be mounted on an upper end of the panel 51 and may have a length corresponding to a horizontal width of the panel 51. In the upper bracket 53 may be injection-molded by using, for example, a plastic material and may include an upper adhesion portion 531 having a planar shape, an upper support rib 532 at an upper end of the upper adhesion portion 531, and an upper coupling protrusion 533 provided on the upper adhesion portion 531.

In detail, a front surface of the upper adhesion portion 531 may be provided in a planar shape and may adhere to the upper end of the rear surface of the panel 51. Here, an adhesive may be applied to the front surface of the upper adhesion portion 531, and the upper bracket 53 may be firmly fixed to the panel 51 by the adhesive.

The upper bracket 53 may have a predetermined vertical width, the upper support rib 532 may be disposed on the upper end of the upper adhesion portion 531, and the first bracket 53 may have a width so that the upper coupling protrusion 533 is disposed below the upper support rib 532. The upper end of the upper bracket 53 may be disposed at a position adjacent to the upper end of the panel 51 and may be disposed at a slightly spaced position so as not to interfere with the upper support end 422.

The upper support rib 532 may be disposed along an upper end of the upper bracket 53. The upper support rib 532 may protrude backward and be in contact with the front surface of the upper cap decoration 42. Thus, the upper end of the panel assembly 50 may be supported by the upper cap decoration 42. In addition, in the state in which the upper support rib 532 is in contact with the front surface of the upper cap decoration 42, the upper coupling protrusion 533 may be in contact with the upper coupling portion 424 to facilitate the coupling of the screw 424*d*.

A reinforcing portion 532*a* connecting the upper support rib 532 to the upper adhesion portion 531 may be disposed on a bottom surface of the upper support rib 532. A plurality of reinforcing portions 532*a* may be continuously disposed at predetermined intervals along the upper support rib 532.

The upper coupling protrusion 533 may protrude backward from the rear surface of the upper adhesion portion 531 and may protrude from a position corresponding to the upper coupling portion 424 of the upper cap decoration 42. The upper coupling protrusion 533 may protrude further backward than the upper support rib 532 and may be in contact with the upper coupling portion 424 when the panel assembly 50 is mounted.

In detail, the upper coupling protrusion 533 may protrude from the upper adhesion portion 531 so as to be inclined backward and upward. A cross-sectional area of the upper coupling protrusion 533 may become smaller toward the rear from the upper adhesion portion 531.

The upper coupling protrusion 533 may be inserted into the upper extension portion 424*a* disposed on the front surface of the upper cap decoration 42 when the panel assembly 50 is coupled. That is, the upper coupling protrusion 533 may correspond to a recessed shape of the upper extension portion 424*a*.

A protrusion inclined surface 533*a* disposed to be inclined may be disposed on an top surface of the upper coupling protrusion 533. The protrusion inclined surface 533*a* may have a downward inclination that gradually decreases backward. The protrusion inclined surface 533*a* may have an inclination corresponding to the upper inclined surface 1424*b*. Thus, in a state in which the panel assembly 50 is accurately mounted on the front surface of the door body 40, the protrusion inclined surface 533*a* may be in close contact with the upper inclined surface 424*b*.

The screw hole 533*b* may be defined in the protrusion inclined surface 533*a*. The screw 424*d* passing through the upper coupling portion 424 may be coupled to the screw hole 533*b*. Thus, when the screw 424*d* is coupled to pass through the upper coupling portion 424 in the state in which the upper end of the panel assembly 50 is disposed on the front surface of the door body 40, the screw 424*d* may be coupled to the screw hole 533*b* of the upper coupling protrusion 533 so that the protrusion inclined surface 533*a* and the upper inclined surface 424*b* are in close contact with each other. In this state, the upper end of the panel assembly 50 may be firmly fixed to the door body 40.

The upper bracket 53 may be disposed at an upper end of the panel 51, and a height h1 from the upper end of the panel 51 to the upper bracket 53 may be greater than a height h2 from the upper end of the panel 51 to the gasket 48.

Thus, the upper bracket 53 may be disposed substantially outside the gasket 48, and thus, the thermal insulation performance of the storage space may not be affected. That is, even if the corresponding front surface of the upper cap decoration 42 is inclined and recessed to provide a structure having a relatively thin thickness due to the mounting of the upper bracket 53, the corresponding position may not be affected by cold air within the refrigerator, and thus, dew condensation may not be generated, and also, the thermal insulation performance of the door 20 may not be deteriorated. That is, the upper bracket 53 may be disposed outside the gasket 48 and also be disposed outside a thermal insulation region.

Hereinafter, the structure of the lower bracket 54 will be described in more detail with reference to the drawings.

Figure 20:
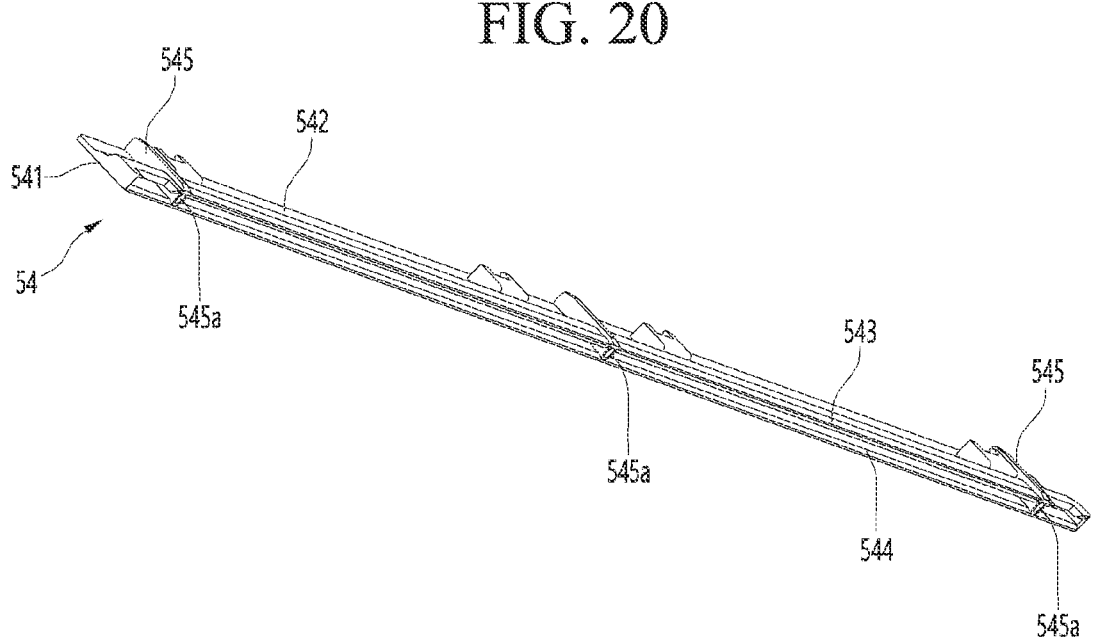
FIG. 20 is a perspective view of the lower bracket that is one component of the panel assembly.
Figure 21:
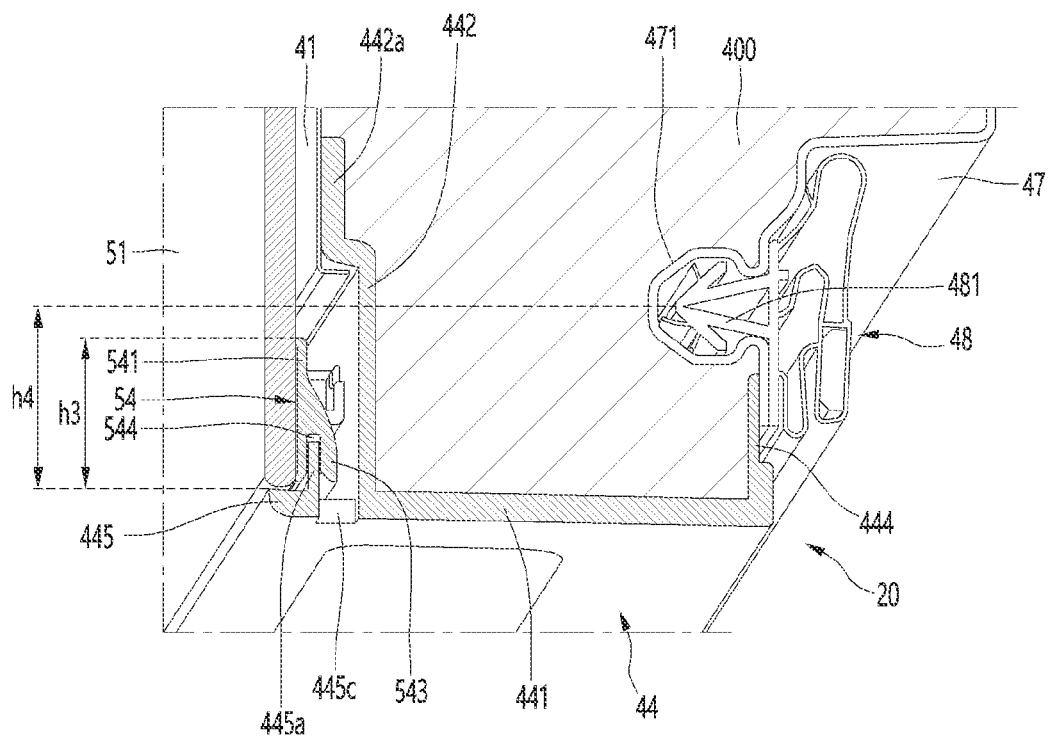
FIG. 21 is a cutaway perspective view taken along line XXI-XXI' of FIG. 2.
Figure 22:
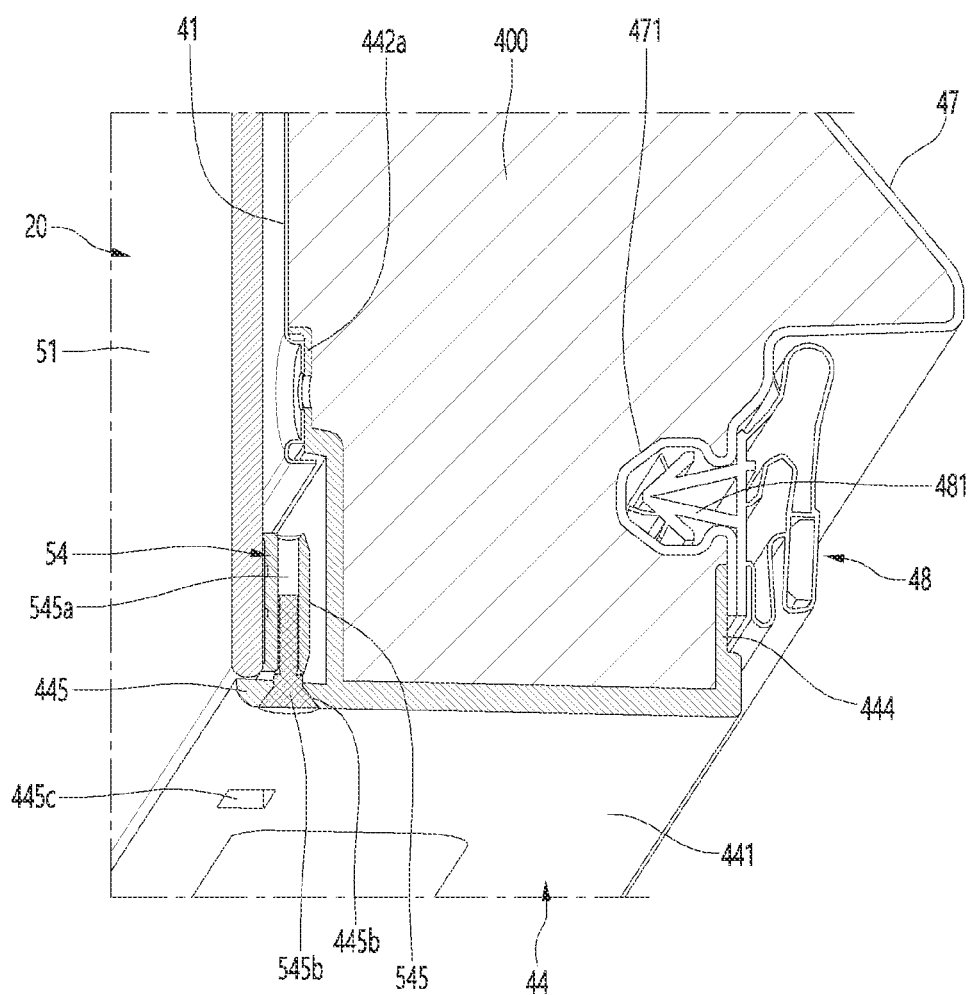
FIG. 22 is a cutaway perspective view taken along line XXII-XXII' of FIG. 2.

FIG. 20 is a perspective view of the lower bracket that is one component of the panel assembly. FIG. 21 is a cutaway perspective view taken along line XXI-XXI' of FIG. 2. FIG. 22 is a cutaway perspective view taken along line XXII-XXII' of FIG. 2.

As illustrated in the drawings, the lower bracket 54 may be injection-molded by using a plastic material and may be provided on the lower end of the panel 51. The lower bracket 54 may extend to a length corresponding to the horizontal width of the panel 51. The lower bracket 54 may to have a vertical width at which at least a lower coupling boss 545 is disposed.

The lower bracket 54 may be hooked to be restricted by the lower cap decoration 44, and a screw 545b passing through the lower cap decoration 44 may be coupled, and thus, the lower end of the panel assembly 50 may be firmly fixed to the door body 40.

In detail, the lower bracket 54 may be provided with a lower adhesion portion 541 mounted on the rear surface of the panel 51. The lower adhesion portion 541 may be provided in a flat shape and may be attached to the rear surface of the panel 51 by an adhesive. The lower bracket 54 may be disposed at a position corresponding to the lower end of the panel 51 in a state in which the lower adhesion portion 541 is attached to the rear surface of the panel 51.

A lower protrusion 543 protruding backward from the lower adhesion portion 541 may be disposed backward from the lower adhesion portion 541. The lower protrusion 543 may extend from one side of the lower adhesion portion 541 to a position corresponding to the lower end of the lower adhesion portion 541.

A lower insertion portion 544 having an opened bottom surface may be disposed on a bottom surface of the lower protrusion 543. That is, the lower insertion portion 544 may be provided in a shape that is recessed downward from the bottom surface of the lower bracket 54 so that the restriction rib 445a of the lower cap decoration 44 is inserted. The lower insertion portion 544 may be disposed over the entire bottom surface of the lower bracket 54.

When the panel assembly 50 is mounted at a fixed position of the door body 40, the restriction rib 445a may be inserted into the lower insertion portion 544, and the lower end of the panel assembly 50 may be fixed. The state in which the restriction rib 445a is inserted into the lower insertion portion 544 may be referred to as a temporarily fixed state because of a re-detachable state when the panel assembly 50 is lifted before the screws 424d and 545b are coupled.

A lower recessed portion 542 may be defined in an upper portion of a rear surface of the lower bracket 54. The lower recessed portion 542 may be provided to be inclined or rounded and may be defined so that a thickness of the lower bracket 54 gradually decreases as it goes upward. The lower recess may extend from the upper end of the lower protrusion 543 to the upper end of the lower bracket 54.

A lower coupling boss 545 may be disposed on the lower adhesion portion 541. The lower coupling boss 545 may protrude from a rear surface of the lower adhesion portion 541 to extend from the lower end to upper end of the lower bracket 54.

A screw hole 545a may be defined in a bottom surface of the lower coupling boss 545. The lower coupling boss 545 may pass through the lower protrusion 543 to extend downward. Thus, the screw hole 545a defined in the top surface of the lower coupling boss 545 may be disposed at a position corresponding to the position of the opened bottom surface of the lower insertion portion 544.

The screw hole 545a may be defined at a position corresponding to the screw hole 445b defined in the lower cap decoration 44. Thus, the lower coupling boss 545 may be disposed at a position corresponding to the screw hole 445b of the lower cap decoration 44 and may be provided as many as a corresponding number. For example, three lower coupling bosses 545 may be provided on a center and both left and right sides of the lower bracket 54, respectively.

When the panel assembly 50 is mounted on the door body 40 so that the restriction rib 445a is inserted into the lower insertion portion 544, the screw hole 443b of the lower cap decoration 44 and the screw hole 545a of the lower bracket 54 may be aligned with each other. In this state, when the screw 535b is coupled to pass through the screw hole 443b of the lower cap decoration 44, the screw 535b may be coupled to the screw hole 545a of the lower bracket 54 so that the lower end of the panel assembly 50 is firmly fixed to the lower cap decoration 44.

The lower bracket 54 may be disposed at the lower end of the panel 51, and a height h3 from the lower end of the panel 51 to the lower bracket 54 may be less than a height h4 of the gasket 48. Here, the height h4 of the gasket 48 may be a height from the lower end of the panel 51 to a center of the gasket mounting portion 481.

Thus, the lower bracket 54 may be disposed substantially outside the gasket 48, and thus, the thermal insulation performance of the storage space may not be affected. That is, even if the corresponding front surface of the lower cap decoration 44 is recessed to provide a structure having a relatively thin thickness due to the mounting of the lower bracket 54, the corresponding position may not be affected by cold air within the refrigerator, and thus, dew condensation may not be generated, and also, the thermal insulation performance of the door 20 may not be deteriorated. That is, the lower bracket 54 may also be disposed outside the thermal insulation region outside the gasket 48 to prevent the thermal insulation performance of the door 20 from being deteriorated.

Hereinafter, the structure of the panel fixing member 55 will be described in more detail with reference to the drawings.

Figure 23:
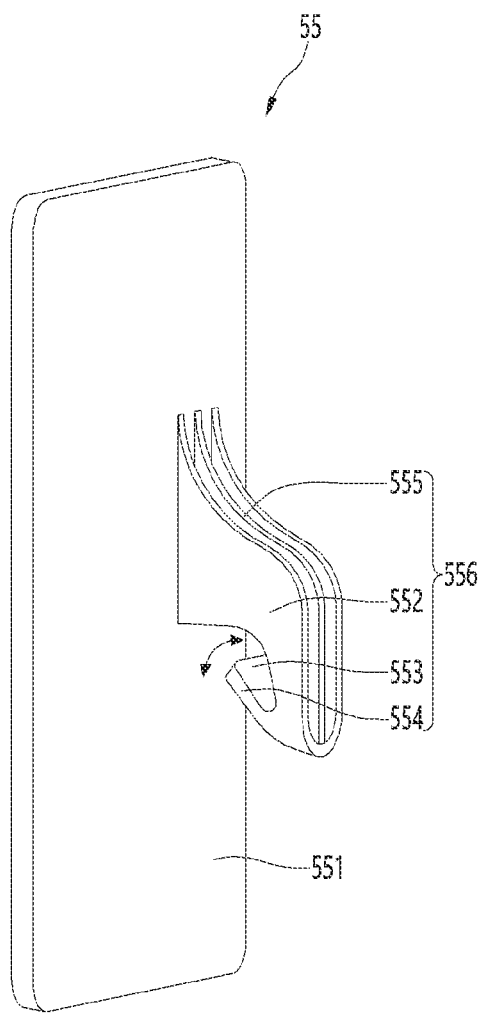
FIG. 23 is a rear perspective view illustrating a panel fixing member that is one component of the panel assembly.
Figure 24:
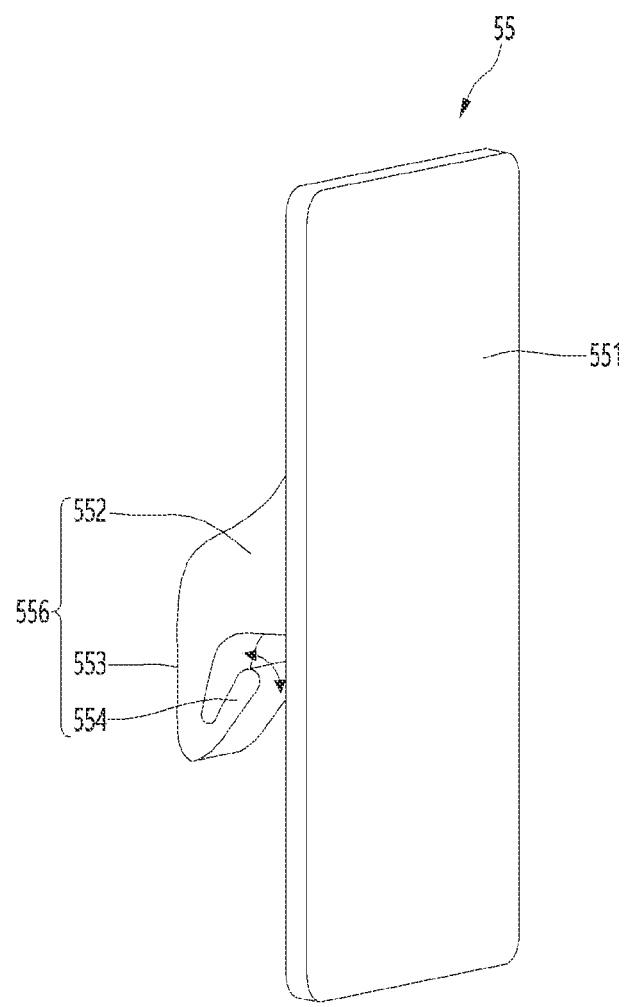
FIG. 24 is a front perspective view illustrating the panel fixing member.

FIG. 23 is a rear perspective view illustrating the panel fixing member that is one component of the panel assembly. FIG. 24 is a front perspective view illustrating the panel fixing member.

As illustrated in the drawings, the panel fixing member 55 may be made of a plastic material and may include a fixing member adhesion portion 551 mounted on the rear surface of the panel 51 and a hook 556 having a hook shape that protruding from the fixing member adhesion portion 551.

In detail, the fixing member adhesion portion 551 may be provided in a rectangular plate shape and may have a predetermined size to be mounted on the rear surface of the panel 51. An adhesive may be disposed on a front surface of the fixing member adhesion portion 551 to adhere to both side ends of the panel 51. That is, an adhesive for adhesion of the fixing member adhesion portion 551 may be provided between the panel 51 and the fixing member adhesion portion 551 so that the panel fixing member 55 is fixedly mounted to the panel 51. The fixing member adhesion portion 551 may be mounted at a position facing the accommodation member 46.

The hook 556 may protrude from a rear surface of the fixing member adhesion portion 551. The hook 556 may be provided in a shape such as a hook and may protrude from a center of a vertical length of the fixing member adhesion portion 551. The hook 556 may protrude from one end of the left and right sides of the fixing member adhesion portion 551, which is adjacent to an outer end of the door panel 51. Thus, in the panel fixing members 55 disposed at the left end and the right end of the panel 51, the protruding positions of the hook portion 556 may be different from each other. That is, the hook portion 556 of the panel fixing member 55 disposed at the left end of the panel 51 may protrude from the left end of the fixing member adhesion portion 551, and the hook portion 556 of the panel fixing member 55 disposed at the right end of the panel 51 may protrude from the right end of the fixing member adhesion portion 551.

The hook 556 may be provided in a shape such as a ring that is hooked while moving downward from the upper side. In detail, the hook 556 may include a backward extension portion 552 extending backward from the fixing member adhesion portion 551 and a downward extension portion 553 extending downward from a rear end of the rear extension portion 552. Thus, the downward extension portion 553 may be spaced apart from a rear surface of the fixing member adhesion portion 551, and the side frame 45 may be hooked to be restricted between the fixing member adhesion portion 551 and the downward extension portion 553.

In this case, an elastic portion 554 extending upward and forward may be further disposed on a lower end of the downward extension portion 553. The elastic portion 554 may be disposed to provide predetermined tension in a state in which the panel fixing member 55 is hooked to be restricted by the side frame 45. In detail, the elastic portion 554 may be provided in a shape extending upward from the lower end of the downward extension portion 553 and be gradually closer to the fixing member adhesion portion 551 and gradually away from the downward extension portion 553. The elastic portion 554 may be provided to have a thinner thickness than the backward extension portion 552 and the downward extension portion 553 and may have a structure that is easily elastically deformed according to an applied load.

When the panel assembly 50 is coupled to the door body 40 in the state in which the panel fixing member 55 is mounted, the panel assembly 50 may be pressed toward the front of the body 40 by elastic force of the elastic portion 554, and thus, the panel assembly 50 may be easily maintained in a state of being mounted on the door body 40.

A top surface of the backward extension portion 552 and a rear surface of the downward extension portion 553 may continuously connected to each other and may be inclined or rounded. Thus, while the panel fixing member 55 is inserted into the accommodation member 46, the top surface of the backward extension portion 552 and the rear surface of the downward extension portion 553 may be connected to the front plate 41 and the front plate 41 and be in contact with the upper ends of the plate opening 412 and the frame opening 453 so that the hook portion 556 is easily guided into the accommodation space 463 of the accommodation member 46.

A plurality of reinforcing ribs 555 disposed along the extension direction of the hook portion 556 may be further disposed on the top surface of the backward extension 552 and the rear surface of the downward extension portion 553, and the reinforcing ribs 555 may be arranged in parallel at regular intervals. Thus, even if an impact is applied to the hook portion 556 during the mounting process of the panel assembly 50, the hook portion 556 may be prevented from being damaged or deformed.

Due to the shape of the panel fixing member 55 as described above, the panel assembly 50 may be mounted on the door body 40 in a manner in which the panel assembly 50 moves downward from the upper side. Here, the panel assembly 50 may be mounted while moving in a direction that is close somewhat to the rear side from the front side, i.e., the door body 40 so that the restriction rib 445a is inserted and mounted in the lower bracket 54.

Hereinafter, a state in which the panel fixing member 55 is inserted into the accommodation member 46 and locked with the side frame 45 will be described in detail with reference to the drawings.

Figure 25:
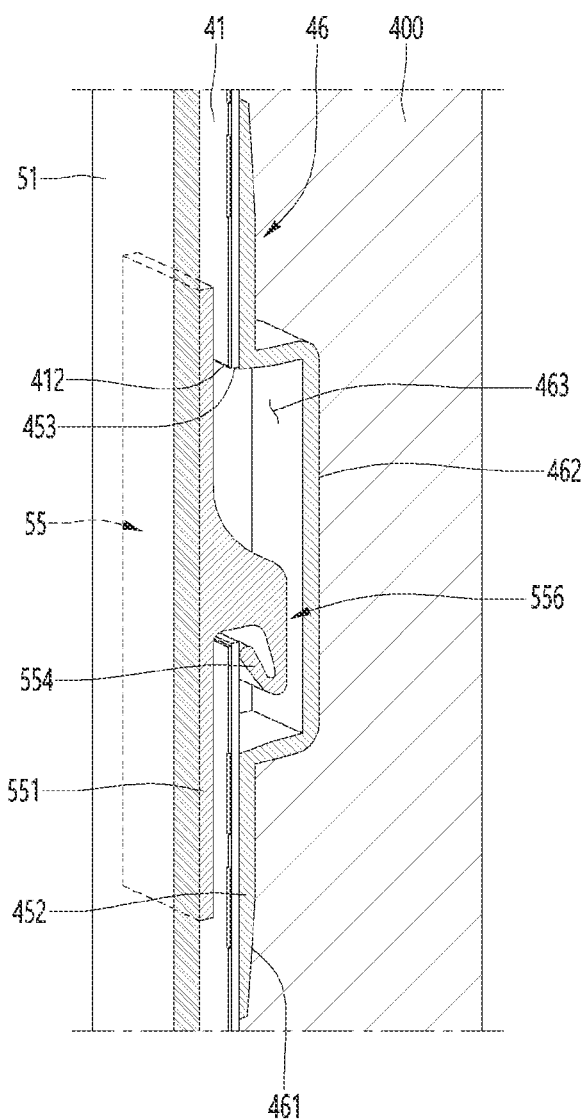
FIG. 25 is a cutaway perspective view taken along line XXV-XXV' of FIG. 2.
Figure 26:
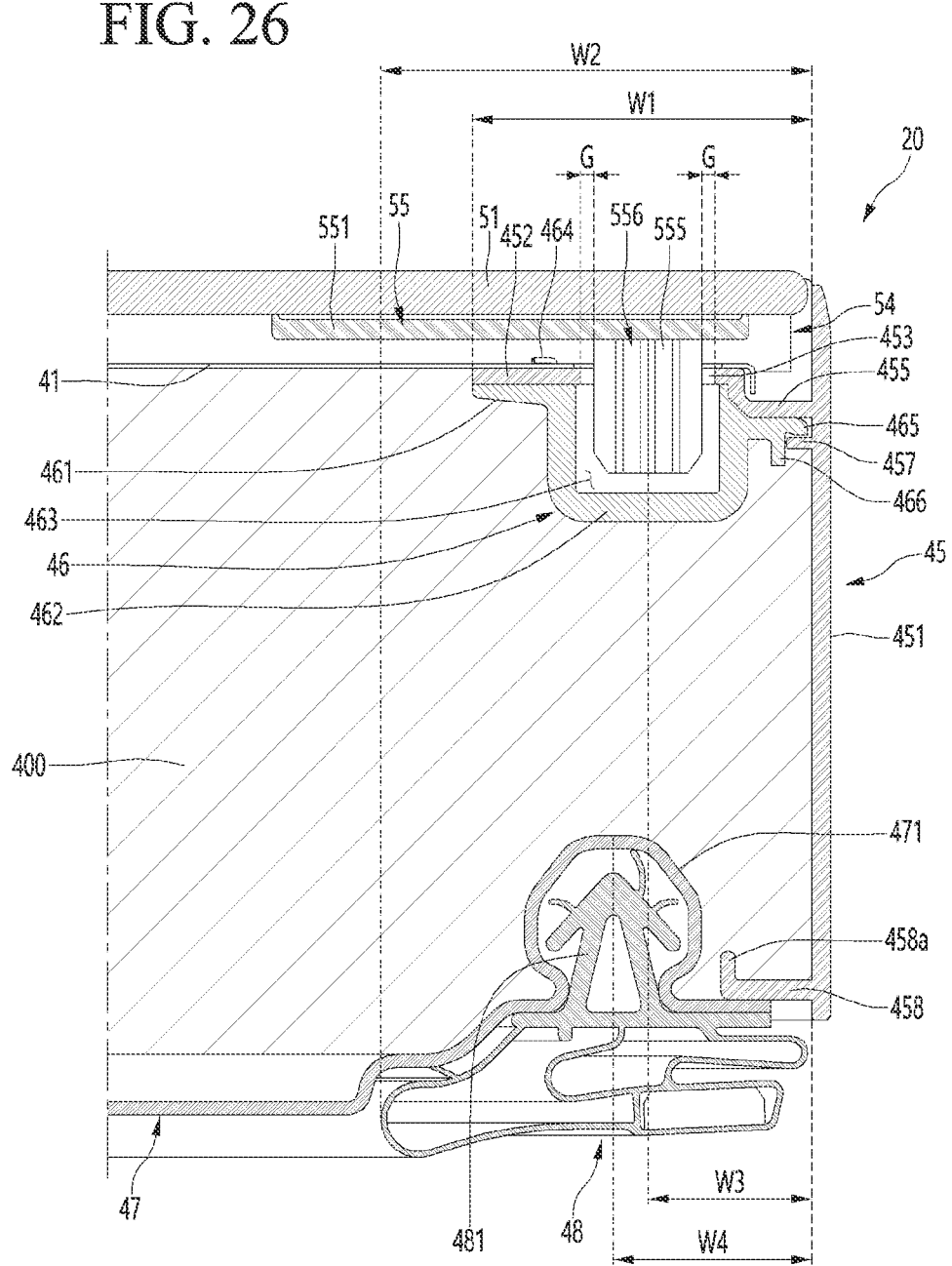
FIG. 26 is a cross-sectional view taken along line XXVI-XXVI' of FIG. 2.

FIG. 25 is a cutaway perspective view taken along line XXV-XXV of FIG. 2. FIG. 26 is a cross-sectional view taken along line XXVI-XXVI' of FIG. 2.

As illustrated in the drawings, when the panel assembly 50 is mounted, the panel fixing member 55 may be inserted into the accommodation member 46.

The panel fixing member 55 may sequentially pass through the plate opening 412 and the frame opening 453 and then be disposed inside the accommodation member 46. Here, the panel assembly 50 may be mounted while moving backward and downward, and the elastic portion 554 may press the frame front surface 452 while being inserted into the accommodation member 46. That is, the frame front surface 452 may be maintained in the contact state with the elastic portion 554, and the panel assembly 50 may be maintained in the state pressed toward the front surface of the door body 40 by the elastic force applied from the elastic portion 554.

The plate opening 412 and the frame opening 453 may be defined to have the same size, and the hook portion 556 may move vertically or horizontally along the plate opening 412 and the frame opening 453.

In detail, a vertical length of each of the plate opening 412 and the frame opening 453 may be significantly greater than a vertical length of the hook portion 556, and thus, the hook portion 556 may move in a diagonal direction so as to be easily inserted into the accommodation space 463. In addition, a predetermined distance G may be maintained between both ends of the hook portion 556 and both ends of the accommodation space 463 of the accommodation member 46.

Thus, the panel assembly 50 may be more easily guided to a fixed position during the mounting process of the panel assembly 50, and the position of the panel assembly 50 may be more easily adjusted. However, a gap between the side surface of the hook portion 556 and an inner surface of the accommodation space 463 may be within several mm to prevent the panel assembly 50 from moving in the mounted state.

Even when the panel fixing member 55 is mounted, if the panel assembly 50 moves upward as necessary, the panel assembly 50 may be easily separated.

The panel fixing member 55 and the accommodation member 46 may be disposed at positions corresponding to the gaskets 48 on the left and right ends of the door 20 or at a position outside the door 20. Thus, even in the structure in which the panel fixing member 55 and the accommodation member 46 are disposed, actual thermal insulation performance may be prevented from being deteriorated, and dew condensation may be prevented from being generated.

In detail, an end of the accommodation member 46 recessed into the insulator 400 may be disposed to be disposed at a position that is spaced a set distance W1 from an outer end of the door 20. The hook portion 556, which occupies a substantially protruding space in the panel fixing member 55, may be inserted into the accommodation member 46 and disposed within the set distance W1.

An inner end of the door gasket 48 may be disposed to be disposed at a position spaced a set distance W2 from the outer end of the door 20. That is, an end of the thermal insulating space sealed by the gasket 48 may be disposed at least at a position separated from the outer end of the door 20 by a set distance W2.

Thus, the accommodation member 46 and the panel fixing member 55 may be disposed along the gasket 48 and be disposed outside the actual thermal insulating space to prevent the thermal insulation performance of the door 20 from being deteriorated.

An extension line passing through a central portion of the hook portion 556 protruding from the panel fixing member 55 and an extension line passing through a central portion of the accommodation space 463 of the accommodation member 46 may be disposed on substantially the same line, and the hook portion 556 and a central portion of the accommodation space 463 from the outer end of the door 20 may be disposed to be spaced a set distance W3 from each other. The extension line may be disposed to be spaced a set distance W4 from the outer end of the door 20 to the central portion of the gasket mounting portion 481. Here, the gasket mounting portion 481 may be disposed inside the door 20 more than the hook portion 556 and the central portion of the accommodation space 463.

That is, an area sealed by the gasket 48 may correspond to the thermal insulating area inside the gasket 48, and the panel fixing member 55 and the accommodation member 46 may be disposed outside the thermal insulating area. Even if a thickness of the door 20 is partially reduced due to the arrangement of the panel fixing member 55 and the accommodation member 46, the thermal insulation performance in the thermal insulating area may not be deteriorated.

Hereinafter, a process in which the panel assembly 50 is mounted on the door 20 of the refrigerator 1 having the above structure will be described in more detail with reference to the drawings.

Figure 27:
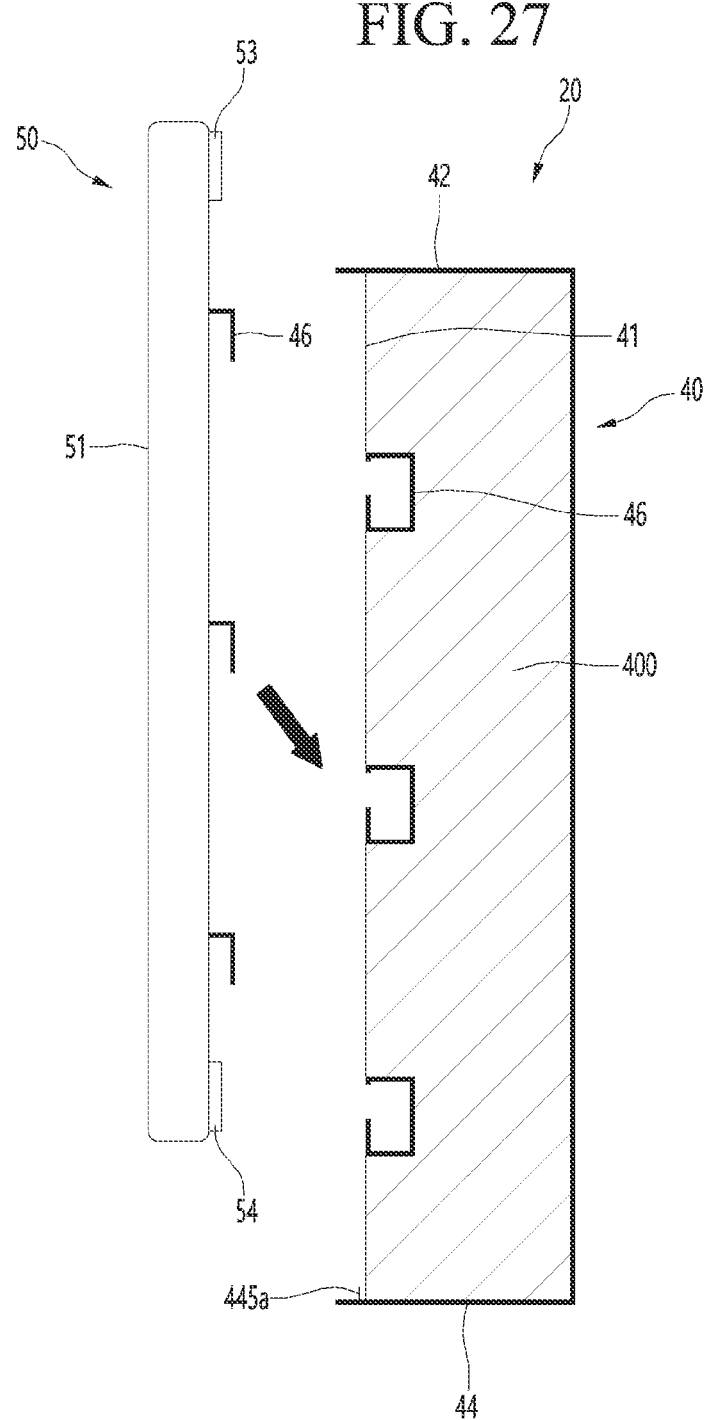
FIG. 27 is a schematic view illustrating a state before the panel assembly is mounted on the door body.
Figure 28:
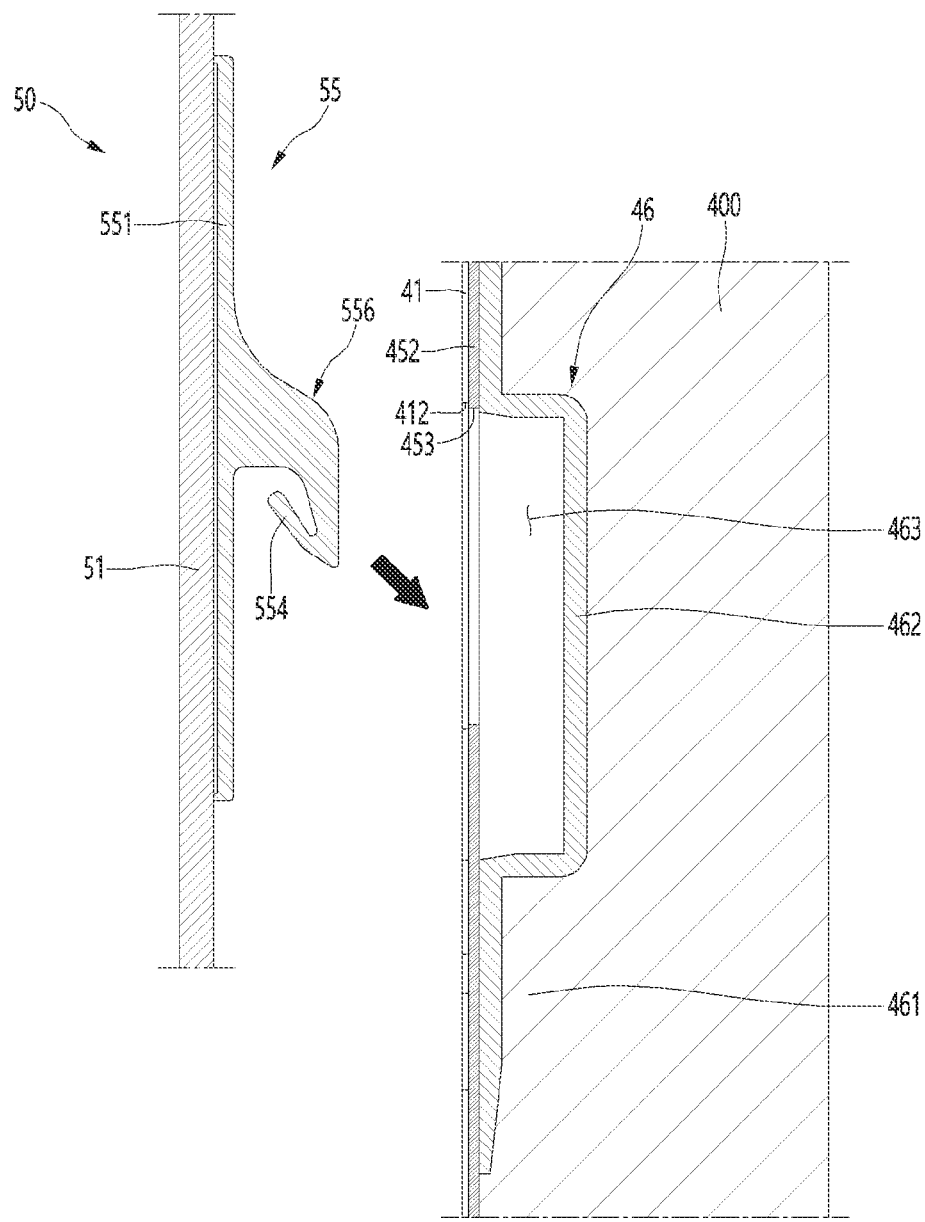
FIG. 28 is a view illustrating states of the panel fixing member and an accommodation member in the state of FIG. 27.

FIG. 27 is a schematic view illustrating a state before the panel assembly is mounted on the door body. FIG. 28 is a view illustrating states of the panel fixing member and the accommodation member in the state of FIG. 27.

As illustrated in the drawing, the door 20 may be assembled by mounting the panel assembly 50 on the door body 40. For this, the panel assembly 50 may be completed by mounting the upper bracket 53, the lower bracket 55, and the panel fixing member 55 on the panel 51. After assembling the front panel 51 and the side frame 45, and the upper cap decoration 42, the lower cap decoration 44, and the accommodation member 46, an insulator 400 may be molded to complete the door body 40.

The panel assembly 50 may be disposed to be mounted on the front surface of the door body 40 in the assembled state. Here, the rear surface of the panel assembly 50 may be directed to the front surface of the door body 40, and the lower end of the panel assembly 50 may be disposed above the lower support end 445 to fix the panel. The hook portion 556 of the panel fixing member 55 may be disposed at a position at which the hook portion 556 is capable of being inserted through the plate opening 412 and the frame opening 453 in the front surface of the door body 40.

In detail, the panel assembly 50 may move backward from a front side to approach the front surface of the door body 40, and simultaneously, the panel assembly 50 may move to approach the front surface of the door body 40 while moving downward from an upper side.

The panel assembly 50 may move diagonally downward from the rear side in a state of being adjacent from the front side of the door body so that the hook portion 556 of the panel fixing member 55 may pass through the plate opening 412 and the frame opening 453 and then be inserted into the accommodation groove of the accommodation member 46. As described above, while the panel assembly 50 moves to be slid downward from the front surface of the door body 40 to the rear side when viewed from the front surface of the door body 40, the panel fixing member 55 may be inserted into the accommodation member 46.

In the process of sliding the panel assembly 50 backward and downward so that the panel fixing member 55 is inserted into the accommodation member 46, the lower restriction rib 445a of the lower support end 445 may be inserted into the lower insertion portion 544 of the lower bracket 54 to restrict the lower end of the panel assembly 50.

Thus, in the panel assembly 50, the downward movement may be restricted by the restriction rib 445a and the lower bracket 54, and the forward and backward movement may be restricted by the panel fixing member 55.

Figure 29:
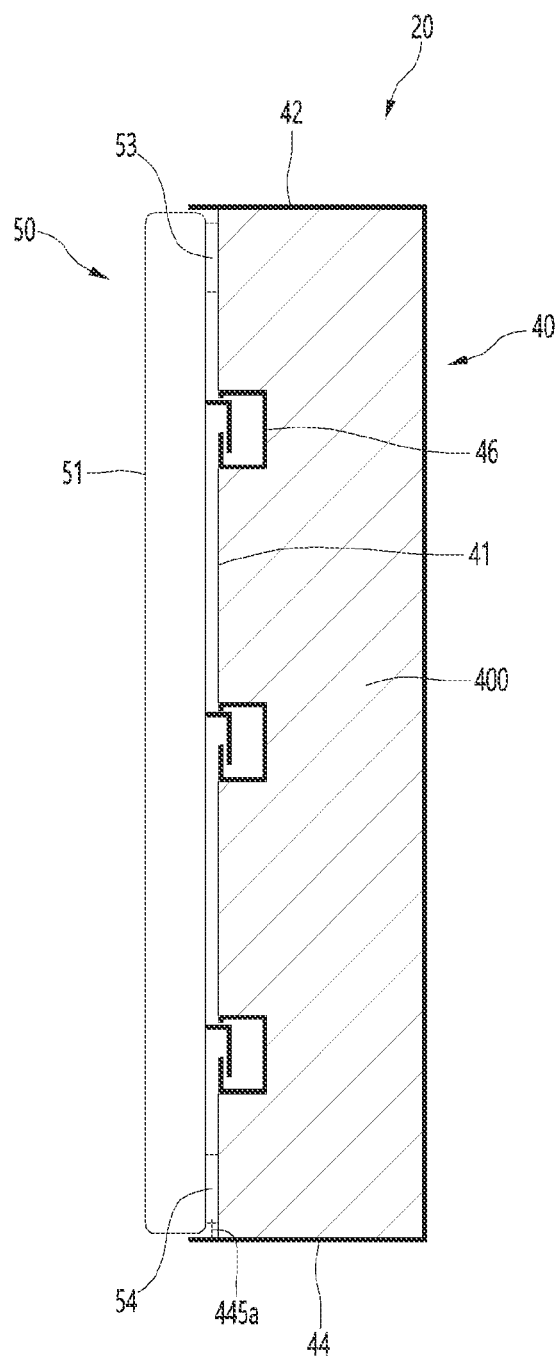
FIG. 29 is a schematic view illustrating a state in which the panel assembly is mounted on the door body.
Figure 30:
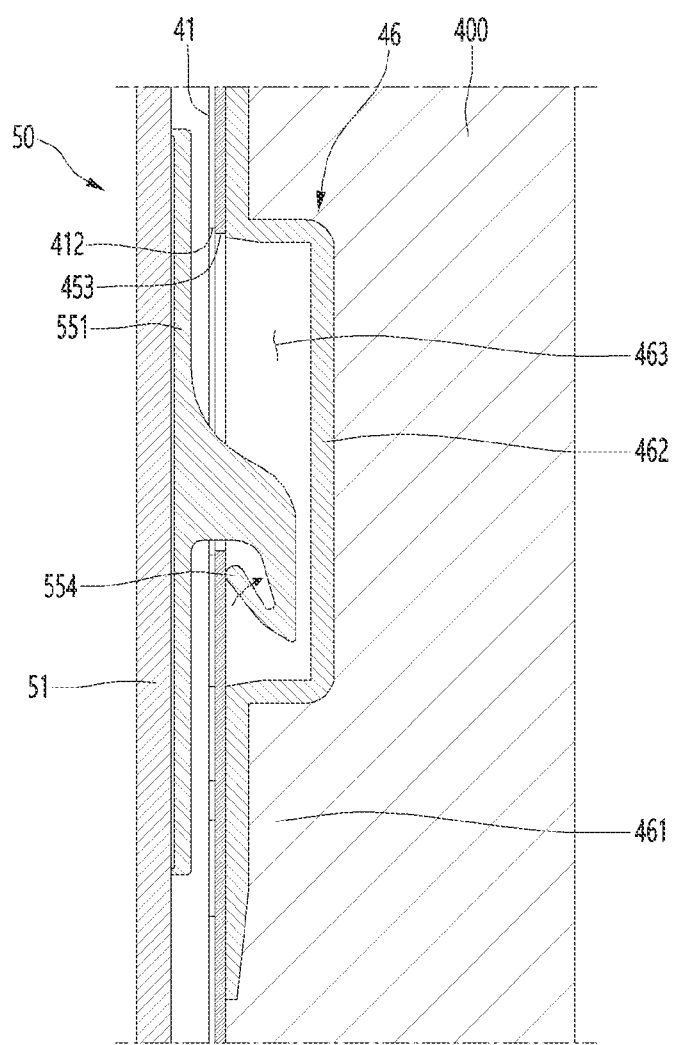
FIG. 30 is a view illustrating states of the panel fixing member and an accommodation member in the state of FIG. 29.

FIG. 29 is a schematic view illustrating a state in which the panel assembly is mounted on the door body. FIG. 30 is a view illustrating states of the panel fixing member and an accommodation member in the state of FIG. 29.

As illustrated in the drawing, when the panel assembly 50 is mounted on the front surface of the door body 40, the panel assemblies 50 may be disposed inside a region defined by the upper support end 422, the lower support end 445, and the side support end 451a, respectively, and may be disposed in contact with each other.

When the panel assembly 50 is mounted on the front surface of the door body 40, the hook portion 556 of the panel fixing member 55 may be completely inserted into the accommodation space 463 of the accommodation member 46.

Here, the hook portion 556 may be disposed below the frame opening 453, and the elastic portion 554 may be in contact with the frame front surface 452. Here, as the hook portion 556 moves downward, the elastic portion 554 may be elastically deformed backward while being in contact with the frame front surface 452 to press the frame front surface 452 from the rear.

Thus, the panel assembly 50 may be pressed toward the door body 40 while having tension, and a gap may be maintained while being somewhat spaced apart from the front surface of the door body 40.

A plurality of the panel fixing members 55 disposed along the left and right ends of the panel assembly 50 may maintain a state of being hooked and restricted on the side frame 45 inside the accommodation member 46, and the forward and backward movement of the panel assembly 50 may be restricted.

Due to the elastic support structure by the elastic portion 554, even when an impact is applied when the door 20 is opened and closed, the impact transmitted to the panel 51 made of the glass material may be alleviated. Even if a portion of the door 20 is slightly expanded, contracted, or twisted according to a change in operation temperature of the refrigerator 1, the deformation may be adjusted by the elastic support structure of the elastic portion 554 and the gas between the hook portion 556 and the accommodation space 463 to prevent the panel assembly 50 from being deformed and damaged.

Figure 31:
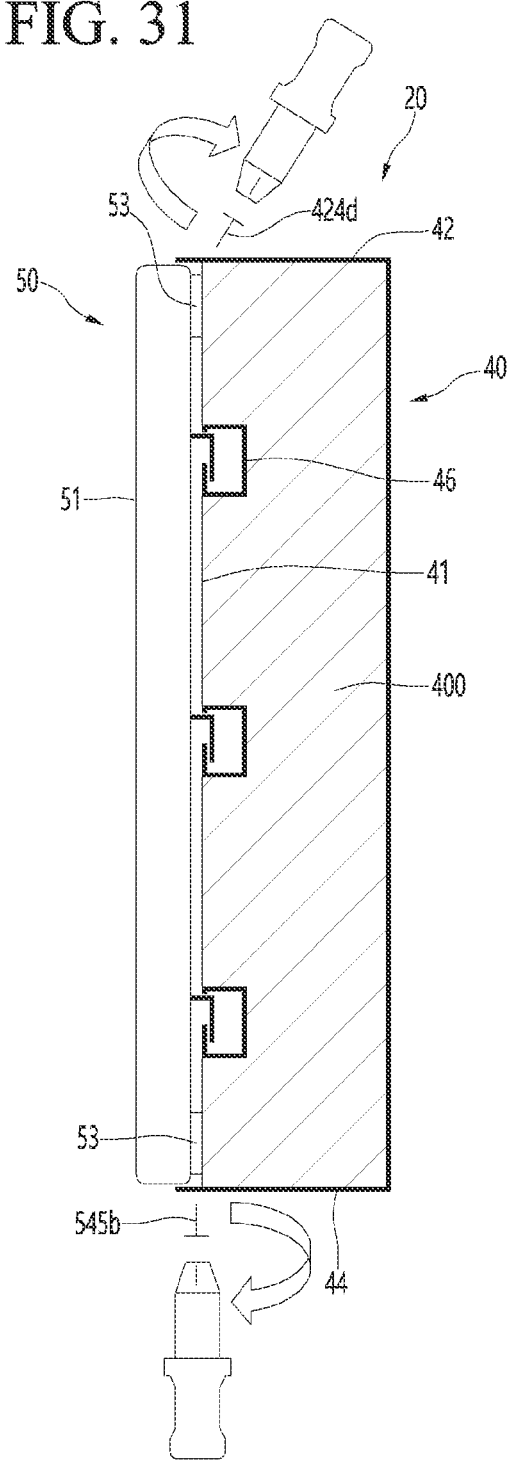
FIG. 31 is a schematic view illustrating a state in which a screw is coupled to the panel assembly.

FIG. 31 is a schematic view illustrating a state in which the screw is coupled to the panel assembly.

As illustrated in the drawings, in a state in which the panel assembly 50 is disposed on the front surface of the door body 40, screws 424d and 545b may be coupled to firmly fix the panel assembly 50.

When the panel assembly 50 is mounted on the front surface of the door body 40, the upper end of the upper bracket 53 may be in contact with the upper cap decoration 42. Particularly, the upper coupling protrusion 533 of the upper bracket 53 may be in contact with the upper coupling portion 424 of the upper cap decoration 42.

In detail, as illustrated in FIG. 19, when the panel assembly 50 is mounted, the upper coupling protrusion 533 may be inserted into the upper extension portion 424a. In the state in which the upper coupling protrusion 533 is inserted into the upper extension portion 424a, the protrusion inclined surface 533a of the upper coupling protrusion 533 may be in contact with the upper inclined surface 424b of the upper extension portion 424a. Also, the screw hole 533b of the protrusion inclined surface 533a and the screw hole 424c of the upper inclined surface 424b may be aligned with each other.

In this state, the user may couple the screw 424d through the recessed space 420 of the upper cap decoration 42. The screw 424d may pass through the screw hole 424c of the upper inclined surface 424b and be coupled to the screw hole 533b of the protrusion inclined surface 533a. The screw 424d may be coupled in a direction crossing the upper inclined surface 424b and the protruding inclined surface 533a. Thus, the panel assembly 50 may finely move upward and backward according to the coupling of the screw 424d and thus may be adjusted according to a degree of the coupling of the screw 424d.

The upper end of the panel assembly 50 may be fixed to the upper cap decoration 42 by coupling the screw 424d. The upper end of the panel assembly 50 may be in contact with the upper support end 422 or be maintained at a predetermined distance.

When the door body 40 is mounted in a state in which the door body 40 is laid down for assembly of the door 20, the screw 424d may be disposed to be inclined, and thus, the coupling of the screw 424d may be more easily performed through the recessed space 420.

The lower end of the panel assembly 50 may be restricted by inserting the lower restriction rib 445a into the lower insertion portion 544 of the lower bracket 54. In addition, the lower end of the panel assembly 50 may be more firmly restricted through the coupling of the screw 545b.

As illustrated in FIG. 22, when the panel assembly 50 is mounted, the lower bracket 54 may be in contact with the lower support end 445. The lower coupling boss 545 of the lower bracket 54 may be aligned with the screw hole 445b of the lower cap decoration 44.

In this state, the screw 545b may pass through the screw hole 445b of the lower cap decoration 44 so as to be coupled to the lower coupling boss 545. Due to the coupling of the screw 545b, the lower end of the panel assembly 50 may be further restricted, and the vertical movement of the panel assembly 50 may be prevented when the door 20 is opened and closed.

The panel assembly 50 may constitute the front surface of the door 20, and not only the upper door 20 but also other doors 20a, 20b, 20c, and 30 may also have the same structure.

Figure 32:
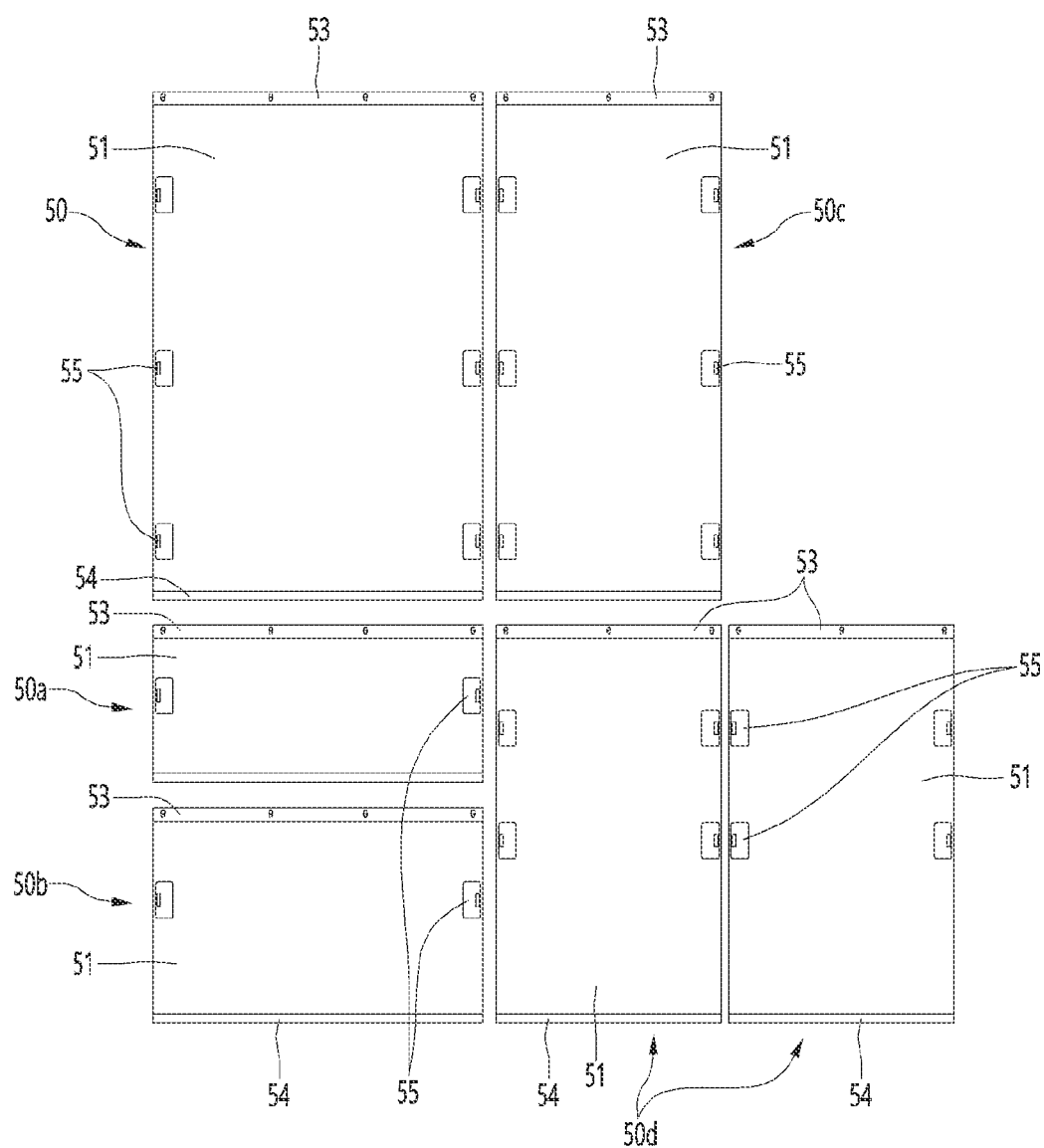
FIG. 32 is a rear view illustrating the panel assembly mounted on each of refrigerators of FIG. 1.

FIG. 32 is a rear view illustrating the panel assembly mounted on each of refrigerators of FIG. 1.

As illustrated in the drawing, a plurality of doors 20, 20a, 20b, 20c, and 30 constituting the refrigerators 1 and 1' according to an embodiment may have the same panel assembly structure as the panel assemblies 50a, 50b, 50c, and 50d.

The doors 20, 20a, 20b, 20c, and 30 have a difference only in a horizontal width and a vertical length, but the configuration of the panel assemblies 50, 50a, 50b, 50c, and 50d may have the same structure. That is, an upper bracket 53 and a lower bracket 54 may be mounted at upper and lower ends of the panel 51, respectively, and the upper bracket 53 and the lower bracket 54 may have the same structure.

A panel fixing member 55 may be mounted at each of both left and right ends between the upper bracket 53 and the lower bracket 54. Here, only the number of panel fixing members 55 arranged in the vertical direction may be different according to the vertical length of the panel 51, but the structure may be the same.

Also, door bodies 40 constituting the doors 20, 20a, 20b, 20c, and 30 are not illustrated in detail, but all of the door bodies may have the same structure or may be coupled to the same panel assemblies 50, 50a, 50b, 50c, and 50d.

In addition to the foregoing embodiment, a refrigerator according to various embodiments may be exemplified. According to another embodiment of the present invention, a magnet may be added to the panel assembly, and coupling force between the panel assembly and the door body may be improved by the magnet. In further another embodiment, other configurations except for the magnet are all the same as those of the above-described embodiment, and the same components are denoted by the same reference numerals, and detailed descriptions thereof will be omitted.

Figure 33:
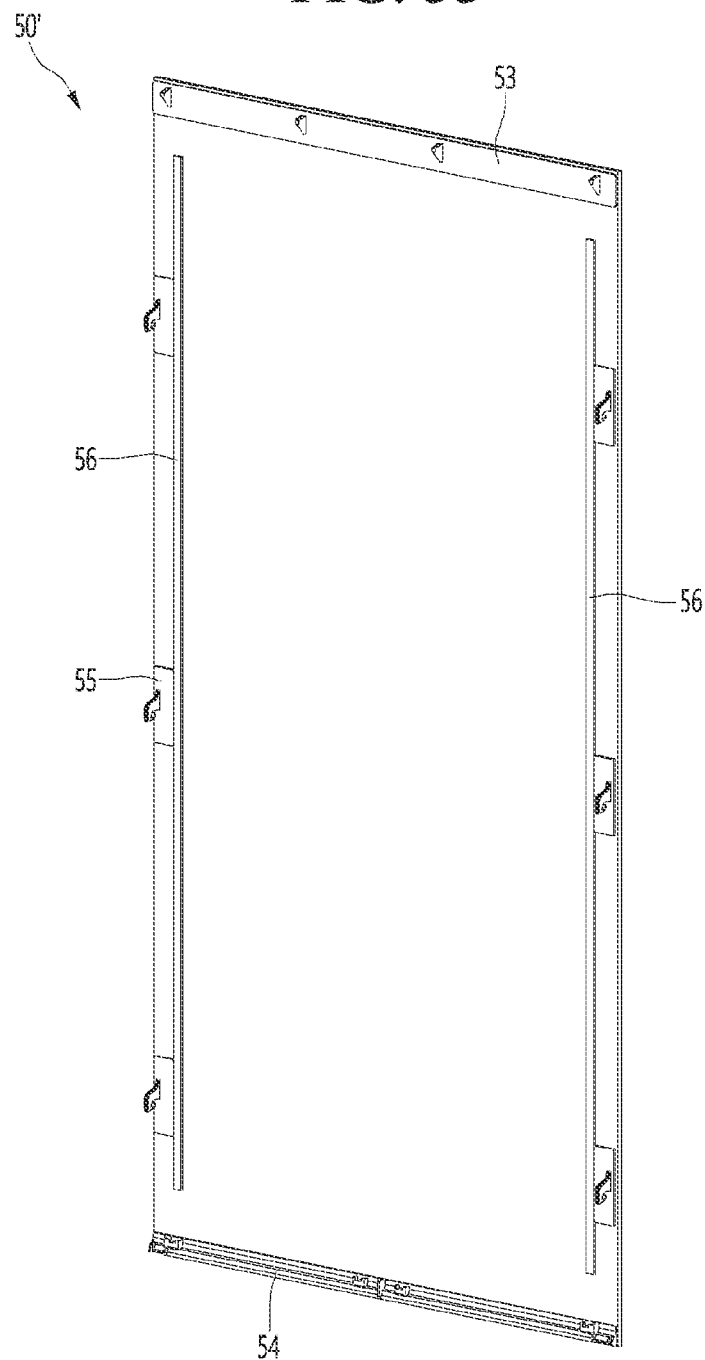
FIG. 33 is a rear perspective view illustrating a panel assembly of a refrigerator door according to a second embodiment of the present invention.
Figure 34:
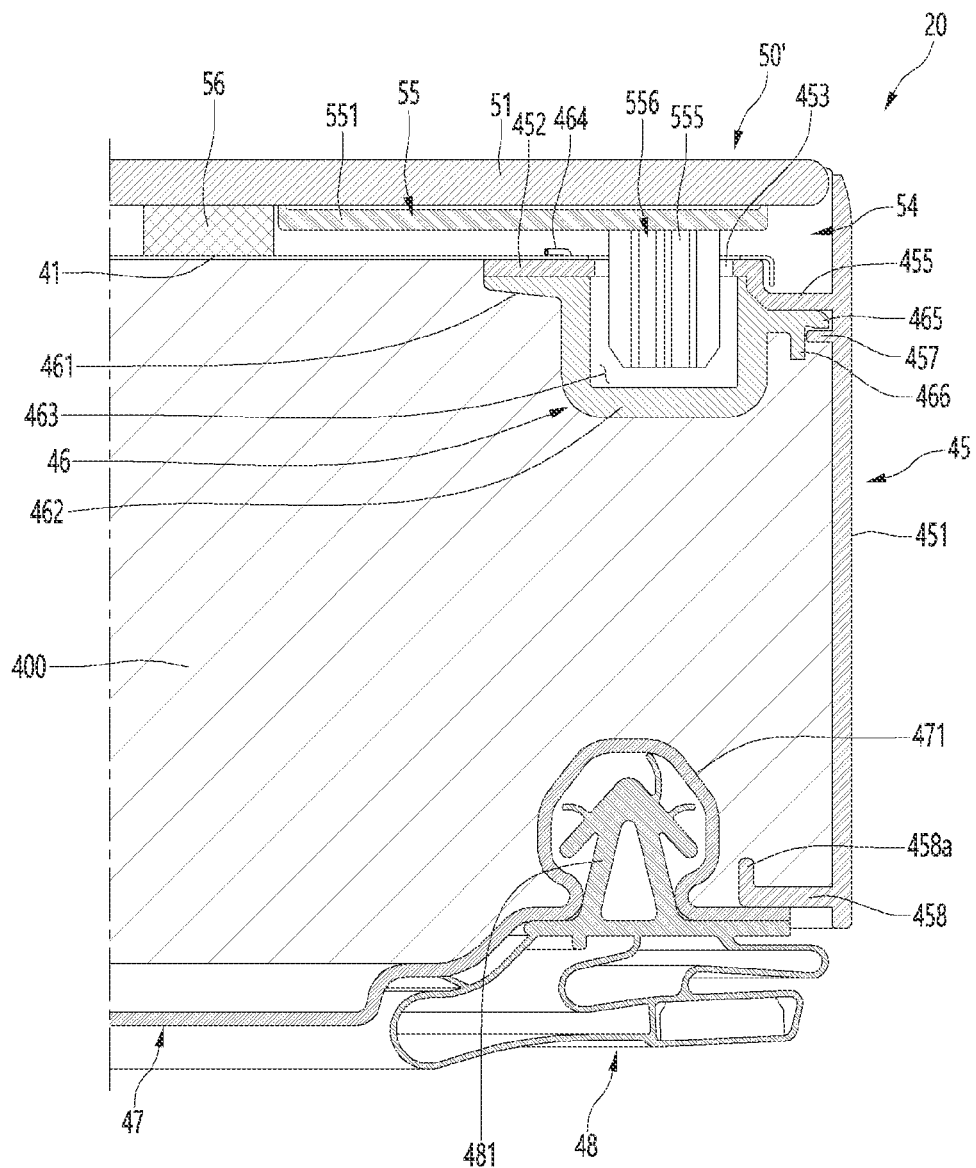
FIG. 34 is a partial cross-sectional view illustrating the door in a state in which the panel assembly is mounted.

FIG. 33 is a rear perspective view illustrating a panel assembly of a refrigerator door according to a second embodiment of the present invention. FIG. 34 is a partial cross-sectional view illustrating the door in a state in which the panel assembly is mounted.

As illustrated in the drawing, a refrigerator door 20 according to another embodiment may include a door body 40 and a panel assembly 50' mounted on a front surface of the door body 40.

The door body 40 may include a front plate 41, a door liner 47, an upper cap decoration 42, a lower cap decoration 44, and a side frame 45 therein, and an accommodation member 46 may be mounted on a rear surface of the front plate 41. A structure of the door body 40 may be exactly the same as the structure of the above-described embodiment.

The panel assembly 50' may be mounted on a front surface of the door body 40 to define an outer appearance of a front surface of the door 20. The panel assembly 50' may include a panel 51, an upper bracket 53, a lower bracket 56, a panel fixing member 55, and a magnet 56. Specific structures and shapes of the panel 51, the upper bracket 53, the lower bracket 54, and the panel fixing member 55 excluding the magnet 56 may be the same as those of the above-described embodiment.

The panel 51 may be made of a glass material and define an outer appearance of a front surface of the door 20. An upper bracket 53 and a lower bracket 54 may be provided on upper and lower ends of the rear surface of the panel 51, respectively.

The upper bracket 53 may be provided on an upper end of the panel 51 and may have a horizontal length that is equal to a horizontal length of the panel 51. An upper support rib 532 may be disposed on a rear upper end of the upper bracket 53, and an upper coupling protrusion 533 may be disposed below the upper support rib 532 so that the upper cap decoration 42 and the screw 424d are coupled.

The lower bracket 54 may be provided on a lower end of the panel 51 and may have a horizontal length that is equal to a horizontal length of the panel 51. A lower insertion portion 544 into which a lower restriction rib 445a of the lower cap decoration 44 is inserted may be defined in a lower end of the lower bracket 54, and a lower coupling boss 545 to which a screw 545b through which the lower cap decoration 44 passes is coupled may be disposed.

A plurality of the panel fixing members 55 may be provided on the rear surface of the panel 51 and may be disposed vertically along both left and right ends of the panel 51. The panel fixing member 55 may be disposed between the upper bracket 53 and the lower bracket 54 at regular intervals.

The panel fixing member 55 may include a fixing member adhesion portion 551 adhesively fixed to the rear surface of the panel 51 and a hook portion 556 protruding backward from the fixing member adhesion portion 551. The hook portion 556 may be provided in a hook shape, and when the panel assembly 50' is mounted, the hook portion 556 may be inserted into the accommodation member 46 of the door body 40. An elastic portion 554 that is elastically supported by the side frame 45 from the inside of the accommodation member 46 may be disposed on the hook portion 556, and in the state in which the panel assembly 50' is mounted, the elastic portion 554 may provide tension to the panel assembly 50'.

A magnet 56 for assisting the mounting of the panel assembly 50 may be provided on the rear surface of the panel 51. The magnet 56 may extend lengthily in the vertical direction and may extends in the vertical direction along a side end of the panel fixing member 55. The magnet 56 may be provided with a pair on both left and right sides.

One surface of the magnet 56 may adhere to the rear surface of the panel 51, and the other surface may be attached to the front plate 41 by magnetic force when the panel assembly 50 is mounted on the door body 40.

The magnet 56 may be disposed on each of the side portions 511 on both sides of the front plate 41. Therefore, a thickness of the magnet 56 may correspond to a distance between the rear surface of the panel 51 and the front panel 51, i.e., front surfaces of the side portions 511 when the panel assembly 50 is mounted.

The magnetic force may be applied to the panel assembly 50 and the front plate 41 in a direction in which the panel assembly 50 and the front plate 141 are attractive with respect to each other by the magnet 56. Thus, the panel assembly 50 may be maintained in a state of being further attached to the front surface of the door body 40.

The magnet 56 may be disposed in a space between the panel assembly 50 and the front plate 41. Thus, the thickness of the door body 40 may not be affected, and the thermal insulation performance of the door 20 may not be deteriorated.

In addition to the foregoing embodiment, a refrigerator according to various embodiments may be exemplified. According to another embodiment of the present invention, a panel of a panel assembly may be made of a metal material so that an outer appearance of the refrigerator has a metal texture. In further another embodiment, other configurations except for the panel are all the same as those of the above-described embodiment, and the same components are denoted by the same reference numerals, and detailed descriptions thereof will be omitted.

Figure 35:
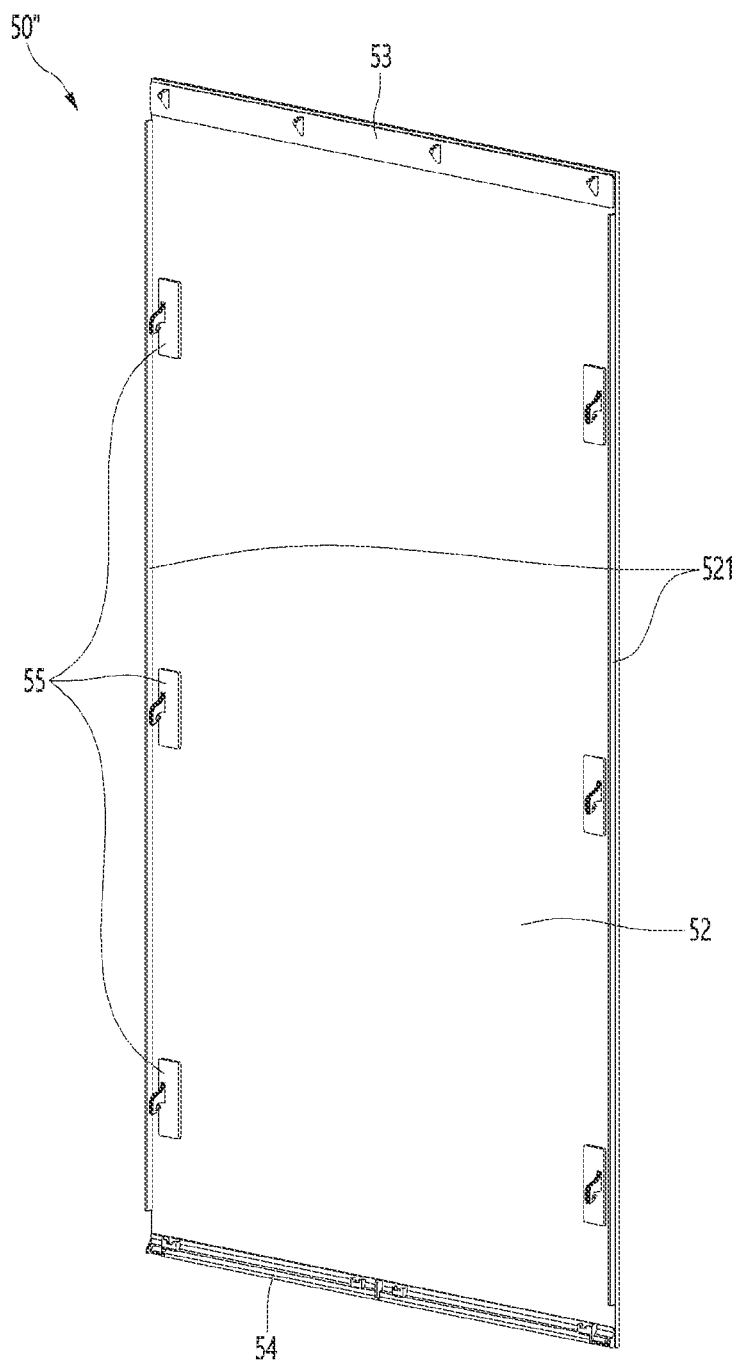
FIG. 35 is a perspective view illustrating a rear surface of a panel assembly of a refrigerator door according to a third embodiment of the present invention.

FIG. 35 is a perspective view illustrating a rear surface of a panel assembly of a refrigerator door according to a third embodiment of the present invention.

As illustrated in the drawing, a refrigerator door 20 according to further another embodiment may include a door body 40 and a panel assembly 50" mounted on a front surface of the door body 40.

The door body 40 may include a front plate 41, a door liner 47, an upper cap decoration 42, a lower cap decoration 44, and a side frame 45 therein, and an accommodation member 46 may be mounted on a rear surface of the front plate 41. A structure of the door body 40 may be exactly the same as the structure of the above-described embodiment.

The panel assembly 50" may be mounted on a front surface of the door body 40 to define an outer appearance of a front surface of the door 20. The panel assembly 50" may include a panel 52, an upper bracket 53, a lower bracket 54, and a panel fixing member 55. Specific structures and shapes of the upper bracket 53, the lower bracket 54, and the panel fixing member 55 excluding the panel 52 may be the same as those of the above-described embodiment.

The panel 52 may be made of a metal material, and forms the front exterior of the door 20. For example, the panel 52 may be made of a stainless material and may be provided in a plate shape. A bent portion 512 may be disposed around the panel 52. The bent portion 512 may be vertically bent along a circumference of a front surface of the panel 52 and may be in contact with each of an upper support end of the upper cap decoration 42, a lower support end 445 of the lower cap decoration 44, and a side support end 451a of the side frame 45 to support the panel 52.

An upper bracket 53 and a lower bracket 54 may be provided on upper and lower ends of the rear surface of the panel 52, respectively.

The upper bracket 53 may be provided on an upper end of the panel 52 and may have a horizontal length that is equal to a horizontal length of the panel 52. An upper support rib 532 may be disposed on a rear upper end of the upper bracket 53, and an upper coupling protrusion 533 may be disposed below the upper support rib 532 so that the upper cap decoration 42 and the screw 424d are coupled.

The lower bracket 54 may be provided on a lower end of the panel 52 and may have a horizontal length that is equal to a horizontal length of the panel 52. A lower insertion portion 544 into which a lower restriction rib 445a of the lower cap decoration 44 is inserted may be defined in a lower end of the lower bracket 54, and a lower coupling boss 545 to which a screw 545b through which the lower cap decoration 44 passes is coupled may be disposed.

A plurality of the panel fixing members 55 may be provided on the rear surface of the panel 52 and may be disposed vertically along both left and right ends of the panel 52. The panel fixing member 55 may be disposed between the upper bracket 53 and the lower bracket 54 at regular intervals.

The panel fixing member 55 may include a fixing member adhesion portion 551 adhesively fixed to the rear surface of the panel 52 and a hook portion 556 protruding backward from the fixing member adhesion portion 551. The hook portion 556 may be provided in a hook shape, and when the panel assembly 50" is mounted, the hook portion 556 may be inserted into the accommodation member 46 of the door body 40. An elastic portion 554 that is elastically supported by the side frame 45 from the inside of the accommodation member 46 may be disposed on the hook portion 556, and in the state in which the panel assembly 50" is mounted, the elastic portion 554 may provide tension to the panel assembly 50".

In addition to the foregoing embodiment, a refrigerator according to various embodiments may be exemplified. According to further another embodiment of the present invention, a panel of a panel assembly may be made of a metal material, and a magnet may be disposed on the panel to improve coupling force between the panel assembly and a door body. In further another embodiment, other configurations except for the panel and the magnet are all the same as those of the above-described embodiment, and the same components are denoted by the same reference numerals, and detailed descriptions thereof will be omitted.

Figure 36:
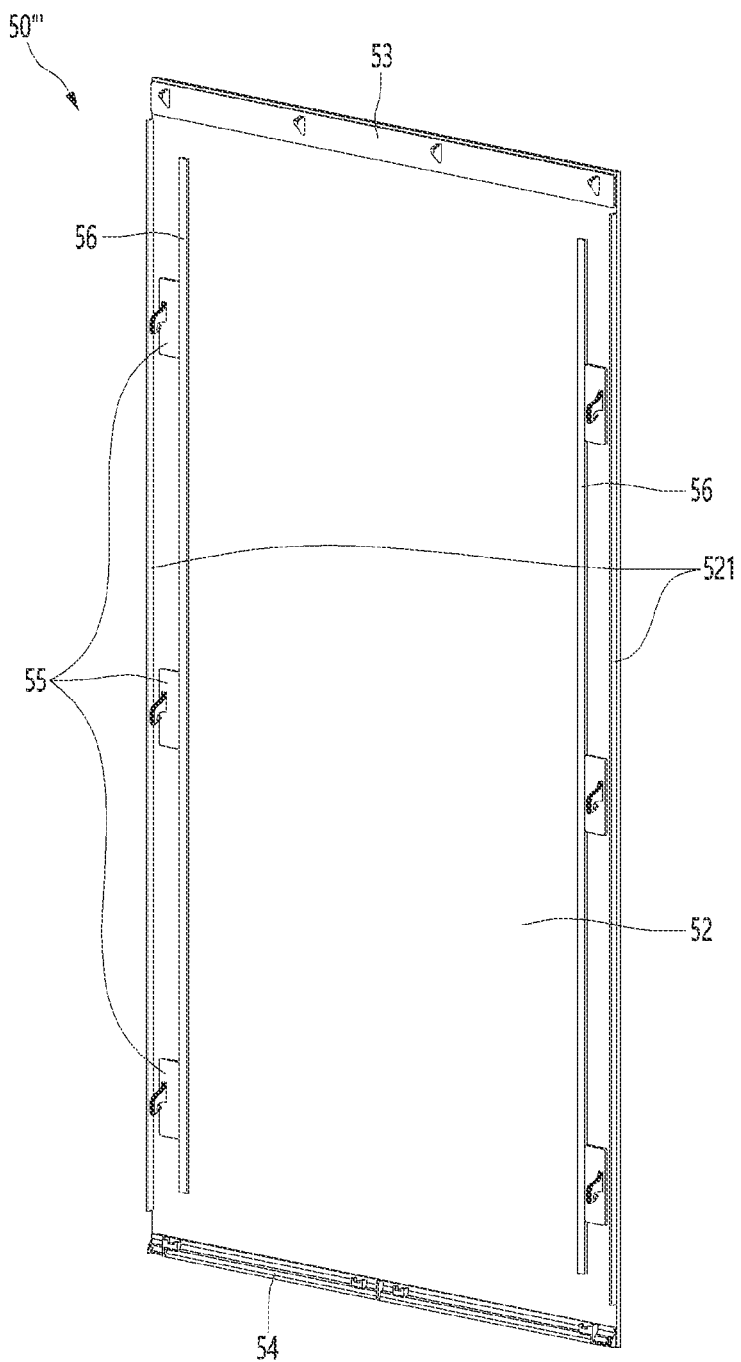
FIG. 36 is a perspective view illustrating a rear surface of a panel assembly of a refrigerator door according to a fourth embodiment of the present invention.

FIG. 36 is a perspective view illustrating a rear surface of a panel assembly of a refrigerator door according to a fourth embodiment of the present invention.

As illustrated in the drawing, a refrigerator door 20 according to further another embodiment may include a door body 40 and a panel assembly 50''' mounted on a front surface of the door body 40.

The door body 40 may include a front plate 41, a door liner 47, an upper cap decoration 42, a lower cap decoration 44, and a side frame 45 therein, and an accommodation member 46 may be mounted on a rear surface of the front plate 41. A structure of the door body 40 may be exactly the same as the structure of the above-described embodiment.

The panel assembly 50''' may be mounted on a front surface of the door body 40 to define an outer appearance of a front surface of the door 20. The panel assembly 50''' may include a panel 52, an upper bracket 53, a lower bracket 54, a panel fixing member 55, and a magnet 56. Specific structures and shapes of the upper bracket 53, the lower bracket 54, and the panel fixing member 55 excluding the panel 52 may be the same as those of the above-described embodiment.

The panel 52 may be made of a metal material, and forms the front exterior of the door 20. For example, the panel 52 may be made of a stainless material and may be provided in a plate shape. A bent portion 512 may be disposed around the panel 52. The bent portion 512 may be vertically bent along a circumference of a front surface of the panel 52 and may be in contact with each of an upper support end 422 of the upper cap decoration 42, a lower support end of the lower cap decoration 44, and a side support end 451a of the side frame 45 to support the panel 52.

An upper bracket 53 and a lower bracket 54 may be provided on upper and lower ends of the rear surface of the panel 52, respectively.

The upper bracket 53 may be provided on an upper end of the panel 52 and may have a horizontal length that is equal to a horizontal length of the panel 52. An upper support rib 532 may be disposed on a rear upper end of the upper bracket 53, and an upper coupling protrusion 533 may be disposed below the upper support rib 532 so that the upper cap decoration 42 and the screw 424d are coupled.

The lower bracket 54 may be provided on a lower end of the panel 52 and may have a horizontal length that is equal to a horizontal length of the panel 52. A lower insertion portion 544 into which a lower restriction rib 445a of the lower cap decoration 44 is inserted may be defined in a lower end of the lower bracket 54, and a lower coupling boss 545 to which a screw 545b through which the lower cap decoration 44 passes is coupled may be disposed.

A plurality of the panel fixing members 55 may be provided on the rear surface of the panel 52 and may be disposed vertically along both left and right ends of the panel 52. The panel fixing member 55 may be disposed between the upper bracket 53 and the lower bracket 54 at regular intervals.

The panel fixing member 55 may include a fixing member adhesion portion 551 adhesively fixed to the rear surface of the panel 52 and a hook portion 556 protruding backward from the fixing member adhesion portion 551. The hook portion 556 may be provided in a hook shape, and when the panel assembly 50''' is mounted, the hook portion 556 may be inserted into the accommodation member 46 of the door body 40. An elastic portion 554 that is elastically supported by the side frame 45 from the inside of the accommodation member 46 may be disposed on the hook portion 556, and in the state in which the panel assembly 50''' is mounted, the elastic portion 554 may provide tension to the panel assembly 50'''.

A magnet 56 for assisting the mounting of the panel assembly 50''' may be provided on the rear surface of the panel 52. The magnet 56 may extend lengthily in the vertical direction and may extends in the vertical direction along a side end of the panel fixing member 55. The magnet 56 may be provided with a pair on both left and right sides.

One surface of the magnet 56 may adhere to the rear surface of the panel 52, and the other surface may be attached to the front plate 41 by magnetic force when the panel assembly 50''' is mounted on the door body 40.

The magnet 56 may be disposed on each of the side portions 511 on both sides of the front plate 41. Therefore, a thickness of the magnet 56 may correspond to a distance between the rear surface of the panel 52 and the front panel 52, i.e., front surfaces of the side portions 511 when the panel assembly 50''' is mounted.

The magnetic force may be applied to the panel assembly 50''' and the front plate 41 in a direction in which the panel assembly 50''' and the front plate 141 are attractive with respect to each other. Thus, the panel assembly 50''' may be maintained in a state of being further attached to the front surface of the door body 40.

Also, the magnet 56 may be disposed in a space between the panel assembly 50''' and the front plate 41. Thus, the thickness of the door body 40 may not be affected, and the thermal insulation performance of the door 20 may not be deteriorated.

Figure 37:
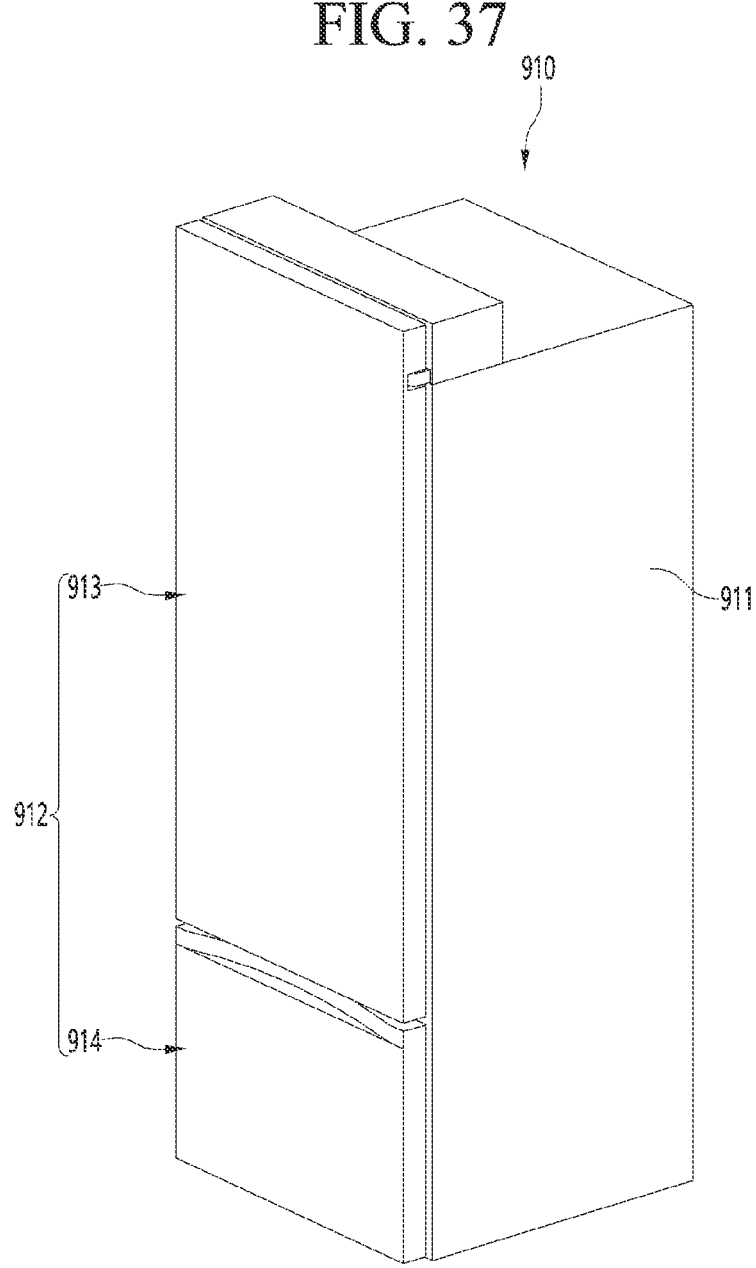
FIG. 37 is a perspective view illustrating a refrigerator according to a fifth embodiment.
Figure 38:
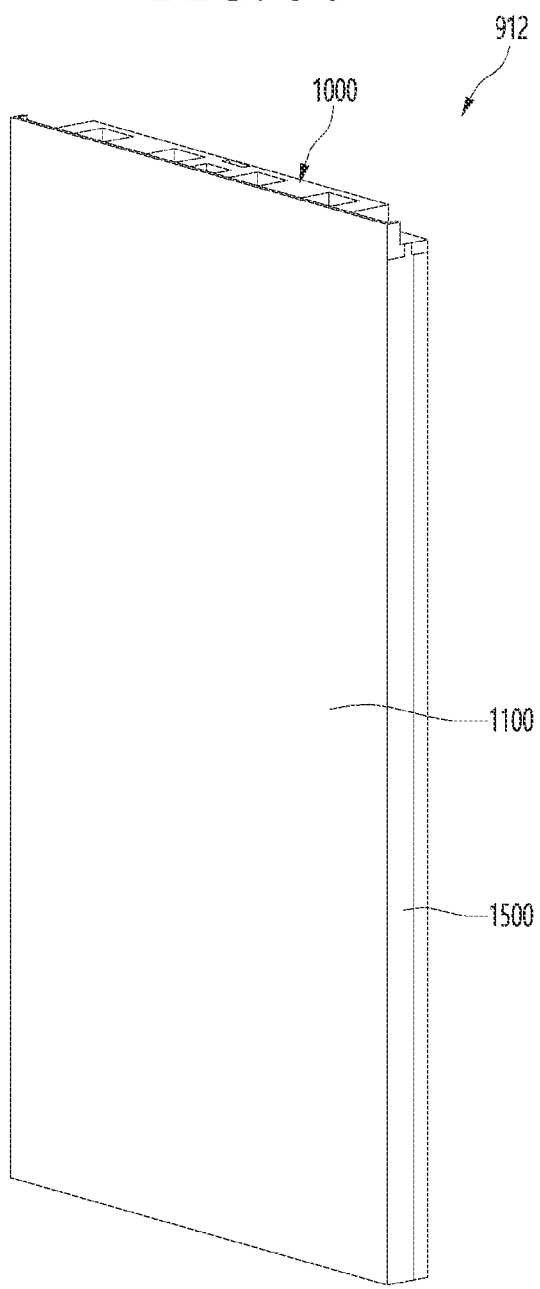
FIG. 38 is a perspective view illustrating a refrigerator door according to the fifth embodiment of the present invention.

FIG. 37 is a perspective view illustrating a refrigerator according to a fifth embodiment. FIG. 38 is a perspective view illustrating a refrigerator door according to the fifth embodiment of the present invention.

Referring to FIGS. 37 and 38, a refrigerator 910 according to the present embodiment may be placed independently or together with another refrigerator in a kitchen or living room. In this case, furniture or a wall O in which the refrigerator 910 is accommodated may be provided in the kitchen or living room. A height of an accommodation space inside the furniture or wall O may be set so that a gap between a top surface of the refrigerator 910 and an upper wall of the furniture or wall O is not large when the refrigerator 910 is accommodated.

If the gap between the top surface of the refrigerator 910 and the upper wall of the furniture or wall O is not large, the upper structure of the refrigerator 910 may not be visible from the outside, and the furniture or wall O and the refrigerator 910 may be improved in sense of unity.

The refrigerator 910 may include a cabinet 911 having a storage compartment and a refrigerator door 912 for opening and closing the storage compartment.

The refrigerator door 912 may include a plurality of doors 913 and 914 spaced apart from each other in a vertical direction. Some or all of the plurality of doors 913 and 914 may open and close the storage compartment in a sliding or rotating manner.

The refrigerator door 912 may include a frame assembly 1000 defining an outer appearance and a front panel 1100 detachably coupled to the frame assembly 1000.

The front panel 1100 may form at least a portion or all of the outer appearance of the front surface of the refrigerator door 912. The outer appearance of the front surface of the refrigerator door 912 may substantially define the outer appearance of the front surface of the refrigerator 910.

Thus, the user may see the front surface of the front panel 1100 at the front side of the refrigerator 910. The front of the front panel 1100 may serve as a decorative panel at a place on which the refrigerator 910 is installed. In this embodiment, the front panel 1100 may be replaced according to a user's preference.

Hereinafter, the refrigerator door 912, which is not only easy to replace the front panel 1100 but also allows replacement of the front panel 1100 without space restriction even when the refrigerator 910 is accommodated inside the furniture or wall, will be described.

Figure 39:
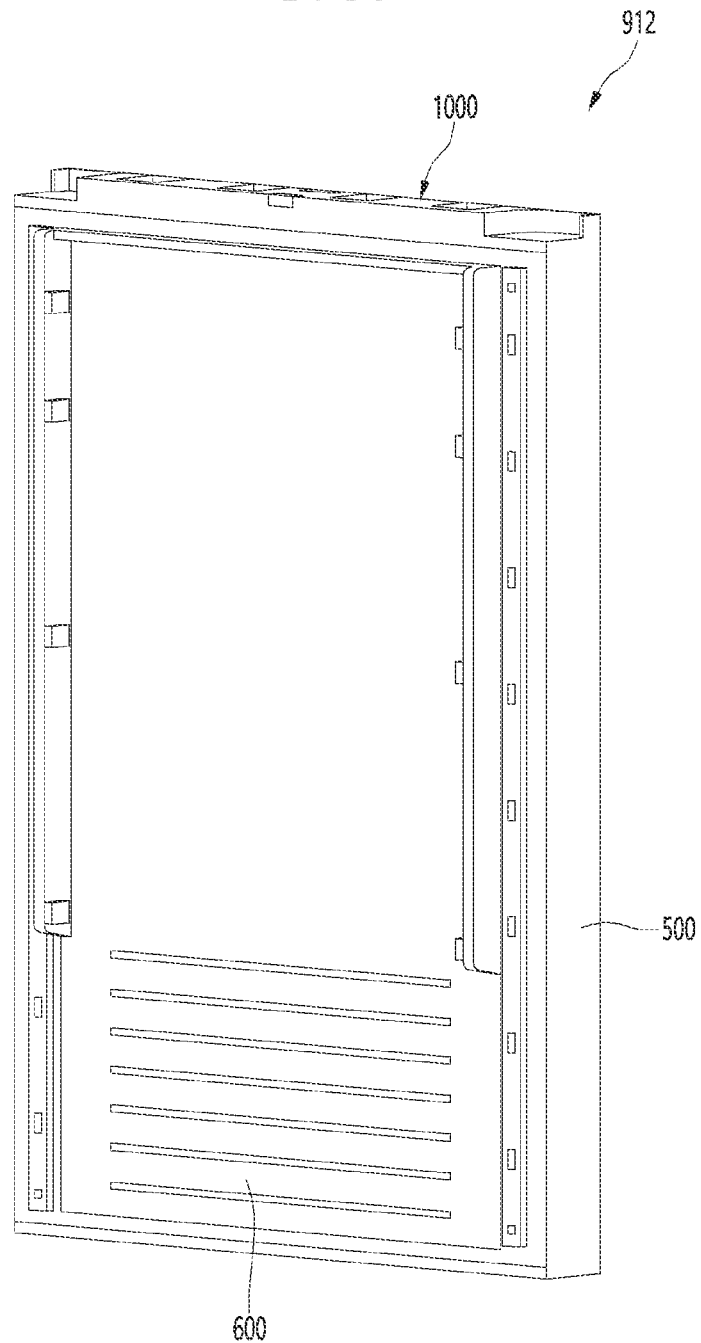
FIG. 39 is a rear perspective view illustrating the refrigerator door.
Figure 40:
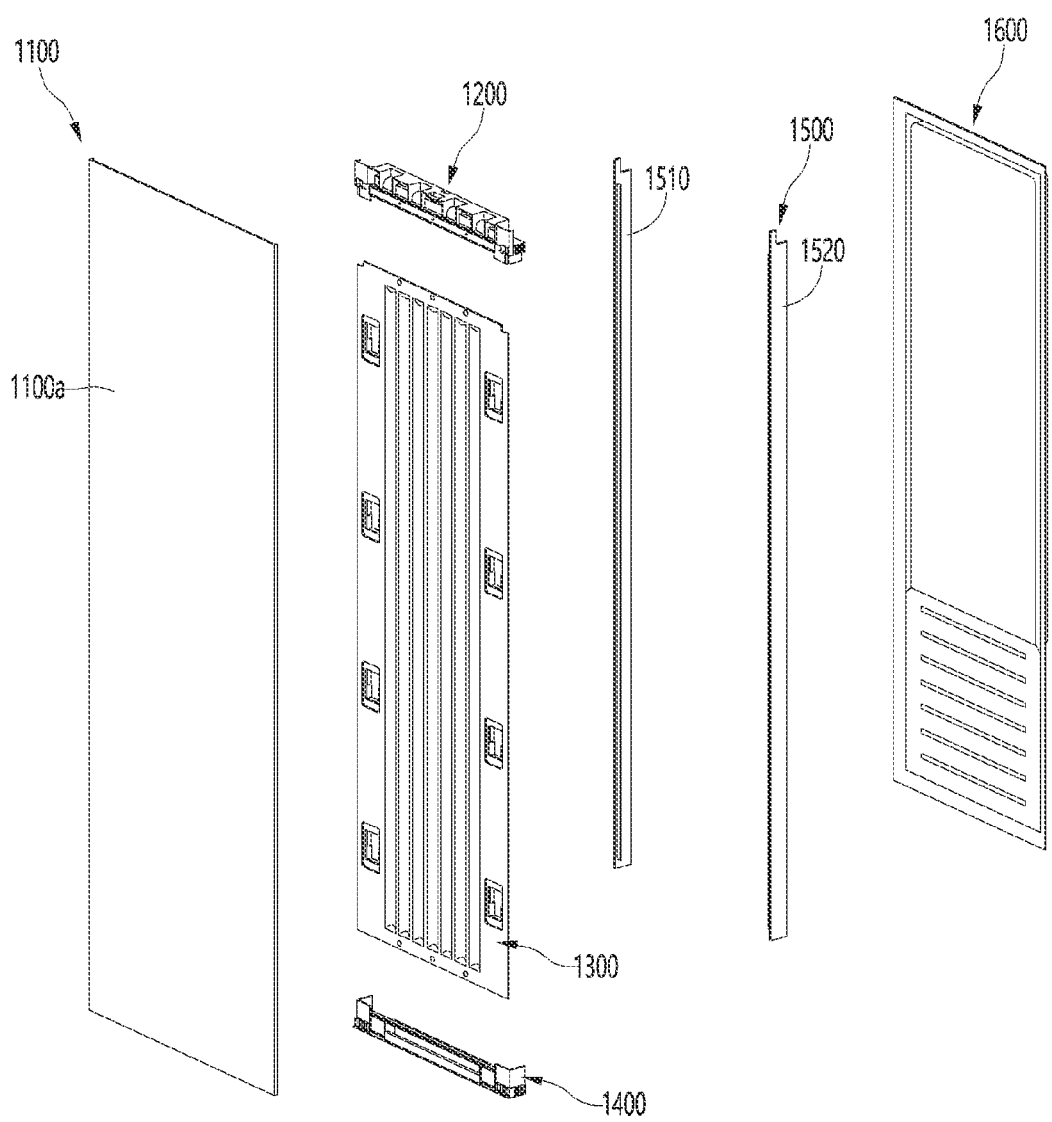
FIG. 40 is an exploded perspective view illustrating the refrigerator door.

FIG. 39 is a rear perspective view illustrating the refrigerator door, and FIG. 40 is an exploded perspective view illustrating the refrigerator door.

Referring to FIGS. 37 to 40, the refrigerator door 912 may include the frame assembly 1000 and the front panel 1100 detachably connected to the frame assembly 2 as described above.

The frame assembly 1000 may include a front frame 1300 and a door liner 1600 disposed behind the front frame 1300.

The front panel 1100 may define an outer appearance of the front surface of the refrigerator 910 and thus may be made of a steel or glass material.

The front panel 1100 may be provided to be replaceable so as to satisfy user's desire to change the design and to easily change the outer appearance. For example, the front panel 1100 is detachable from the frame assembly 1000.

In detail, the front panel 1100 may include one or more fixing portions that are detachably fixed to the frame assembly 1000.

The fixing portion may include a first fixing portion 1110, a second fixing portion 1120, and a third fixing portion 1130 disposed on a rear surface part 1100b of the front panel 1100.

The first fixing portion 1110 may be referred to as an upper bracket, the third fixing portion 1130 may be referred to as a lower bracket, and the second fixing portion 1120 may be referred to as a panel fixing member.

For example, the first fixing portion 1110 may be provided at an upper end of the front panel 1100 and may be coupled to an upper frame 1200 to be described later.

In addition, at least one pair of the second fixing portions 1120 may be provided on the rear surface portion 1100b of the front panel 1100 and may be coupled to a front frame 1300 to be described later.

The third fixing portion 1130 may be provided at a lower end of the rear surface portion 1100b of the front panel 1100 and coupled to a lower frame 1400 to be described later.

A portion of the door liner 1600 may be coupled to the front frame 1300 while being spaced apart from the front frame 1300. Thus, an insulating space for accommodating an insulator may be defined between the front frame 1300 and the door liner 1600.

The door liner 1600 may define a rear surface of the door 912 to cover an opened front surface of the cabinet 911 when the door 912 is closed.

The frame assembly 1000 may further include an upper frame 1200, a lower frame 1400, and a side frame 1500.

The upper frame 1200 may be coupled to an upper end of the front frame 1300, and the lower frame 1400 may be coupled to a lower end of the front frame 1300.

The upper frame 1200 may cover an upper side of the insulating space, and the lower frame 1400 may cover a lower side of the insulating space.

In addition, the side frame 1500 may be coupled to each of both ends of the front frame 1300. For example, the side frame 1500 may include a first side frame 1510 coupled to one of the side ends of the front frame 1300 and a second side frame 1520 coupled to the other one.

Each of the side frames 1510 and 1520 may directly connect the front frame 1300 to the door liner 1600 or cover a connection portion between the front frame 1300 and the door liner 1600.

The fixing portions 1110, 1120, and 1130 of the front panel 1100 will be described in detail with reference to FIG. 41.

Figure 41:
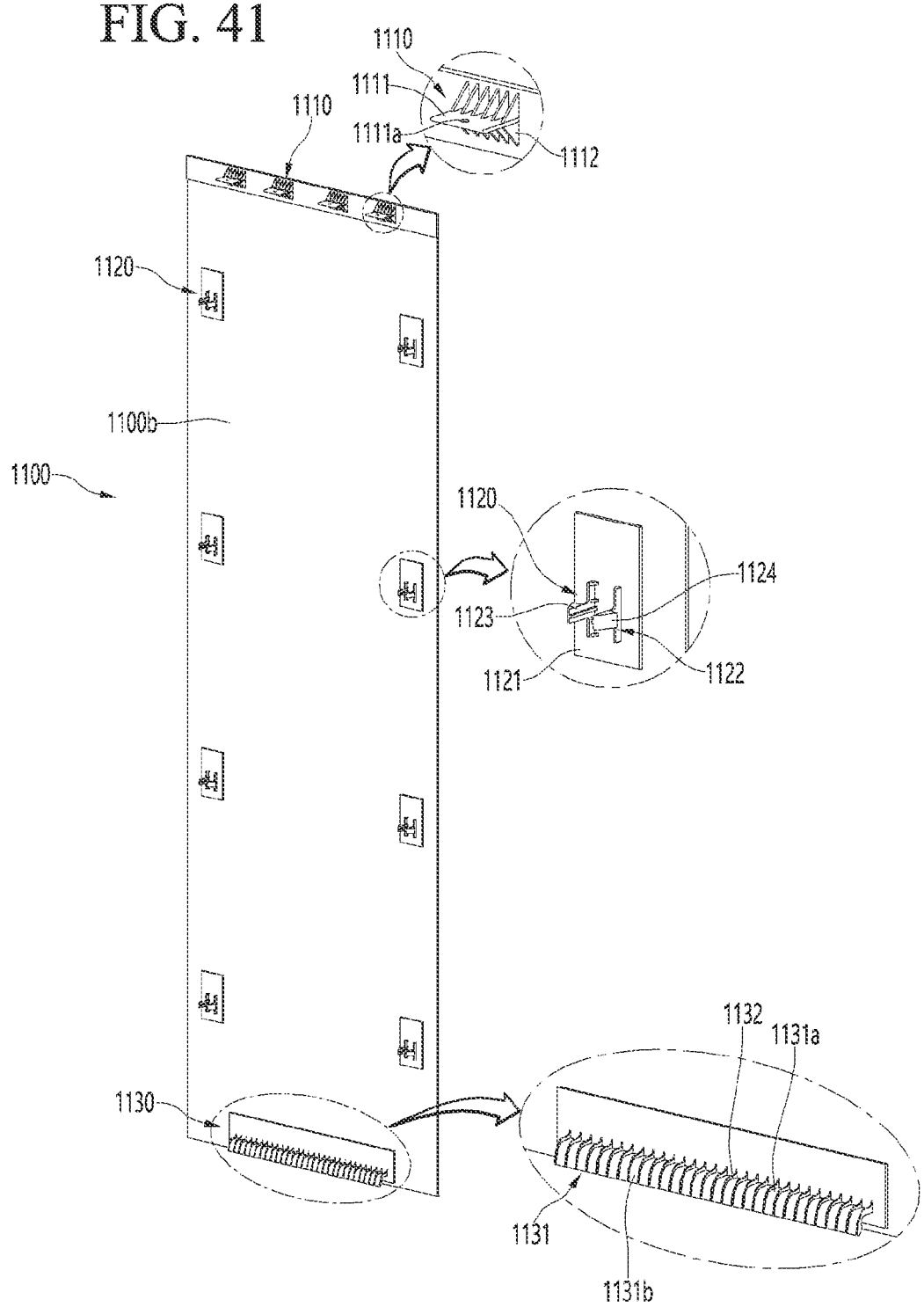
FIG. 41 is a perspective view illustrating a front panel.

FIG. 41 is a perspective view illustrating a front panel.

The fixing portions 1110, 1120, and 1130 may be attached to the rear surface portion 1100b of the front panel 1100, and through this, the front panel 1100 may be detachable regardless of whether the front panel 1100 is made of steel or glass.

The first fixing portion 1110 may be injection-molded and attached to an upper end of the front panel rear surface portion 1100b. The first fixing portion 1110 may be referred to as an upper fixing portion.

In detail, the first fixing portion 1110 may include a protruding seating portion 1111 that is capable of being inserted into the upper frame 1200. The seating portion 1111 may have a plate shape to protrude vertically from the front panel rear surface portion 1100b.

In addition, a plurality of support ribs 1112 may be disposed above and below the seating portion 1111. The support rib 1112 may be coupled to the front panel rear portion 1100b and the seating portion 1111 in the form of a right-angled triangle.

In addition, the seating portion 1111 may further include a coupling hole 1111a disposed to correspond to an upper coupling hole 1223 (see FIG. 42) of the upper frame 1200 to be described later. A fixing member (not shown) such as a screw may be inserted through the upper coupling hole 1223 and the coupling hole 1111a so that the upper frame 1200 and the first fixing portion 1110 are coupled to each other.

The coupling hole 1111a may be disposed at one end of the seating portion 1111. In detail, the coupling hole 1111a may be disposed at the farthest end from the front panel rear surface portion 1100b of the seating portion 1111.

The second fixing portion 1120 may be injection-molded and attached to the front panel rear surface portion 1100b and may be provided in a pair. The second fixing portion 1120 may be referred to as a hook.

For example, the second fixing portion 1120 may have a hook shape to protrude from the rear surface portion 1100b of the front panel 1100.

In addition, the second fixing portion 1120 may be provided in a pair disposed on left and right sides of the front panel rear surface portion 1100b, and a plurality of pairs may be arranged in the vertical direction.

In detail, the second fixing portion 1120 may include a plate 1121 attached to the front panel rear surface portion 1100b. A hook member 1122 may be provided on the plate 1121.

The plate 1121 may have a size corresponding to the hook coupling portion 1320 of the front frame 1300 to be described later.

The hook member 1122 may be provided in a shape biased to one side of the plate 1121, which is to facilitate coupling and separation according to the hook shape.

The hook member 1122 may include an extension portion 1123 extending perpendicularly to the plate 1121 and may include a hook portion 1124 extending by being bent from the extension portion 1123.

That is, the extension portion 1123 extending perpendicularly to the front panel rear surface portion 1100b and the hook portion 1124 extending from the extension portion 1123 in parallel to the front panel rear surface portion 1100b may define the hook shape.

The hook portions 1124 may extend in a direction away from each other.

In detail, the hook member 1122 may be provided in the shape of a pair of arrows provided to be spaced apart from each other.

In addition, the hook portion 1124 may have a right-angled triangular cross-section along the extending direction of the extension portion 1123. For example, one surface of the hook portion 1124 may be fixed to be in contact with one surface of an inclined protrusion 1322 to be described later.

The third fixing portion 1130 may be injection-molded and attached to a lower end of the front panel rear surface portion 1100b. The third fixing portion 1130 may be referred to as a lower fixing portion.

For example, the third fixing portion 1130 may protruded from a lower end of the front panel rear surface portion 1100b to extend to left and right sides.

In detail, the third fixing portion 1130 may include an insertion portion 1131 inserted into a lower recessed portion 1430 of a lower frame 1400 to be described later.

The insertion portion 1131 may protrude from the front panel rear surface portion 1100b, and for example, may include a first extension portion 1131a extending vertically from the front panel rear surface portion 1100b and a second extension portion 1131b that is bent from the first extension portion 1131a to extend.

The second extension portion 1131b may extend toward a lower portion of the front panel 1100. In addition, the third fixing portion 1130 may include one or more support ribs 1132 to surround the insertion portion 1131.

Figure 42:
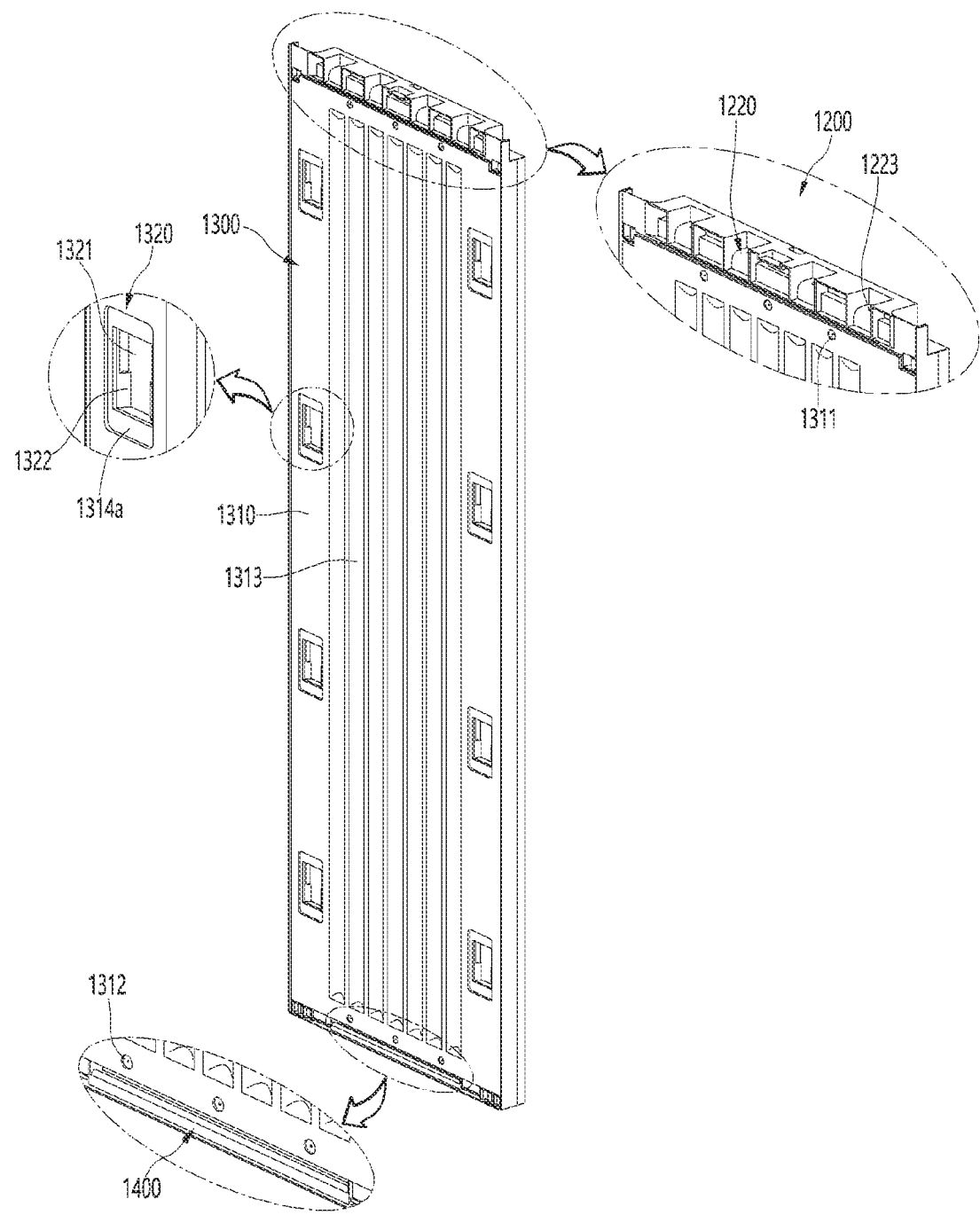
FIG. 42 is a perspective view illustrating a frame assembly.

FIG. 42 is a perspective view illustrating a frame assembly according to an embodiment of the present invention.

Hereinafter, the frame assembly 1000 will be described in detail with reference to FIGS. 42 to 45.

The frame assembly 1000 includes a front frame 1300 that is spaced a predetermined distance from the door liner 1600 and disposed at a front side, an upper frame 1200 coupled to an upper portion of the front frame 1300, and a lower frame 1400 coupled to a lower portion of the front frame 300.

The frame assembly 1000 may further include a pair of side frames 500 disposed between the front frame 1300 and the door liner 1600.

In addition, a thermal insulating space may be defined through the frame assembly 1000, and an insulator may be filled in the thermal insulating space.

Figure 43:
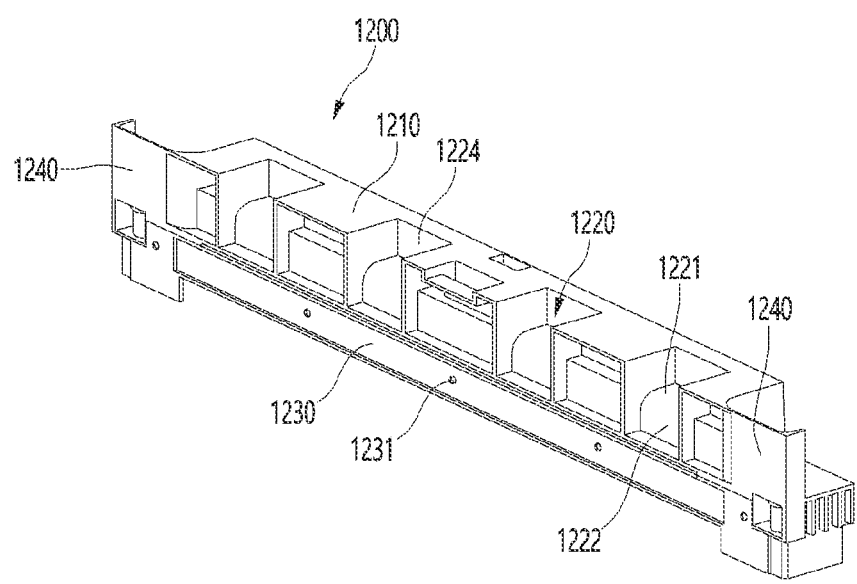
FIG. 43 is a perspective view illustrating an upper frame.
Figure 44:
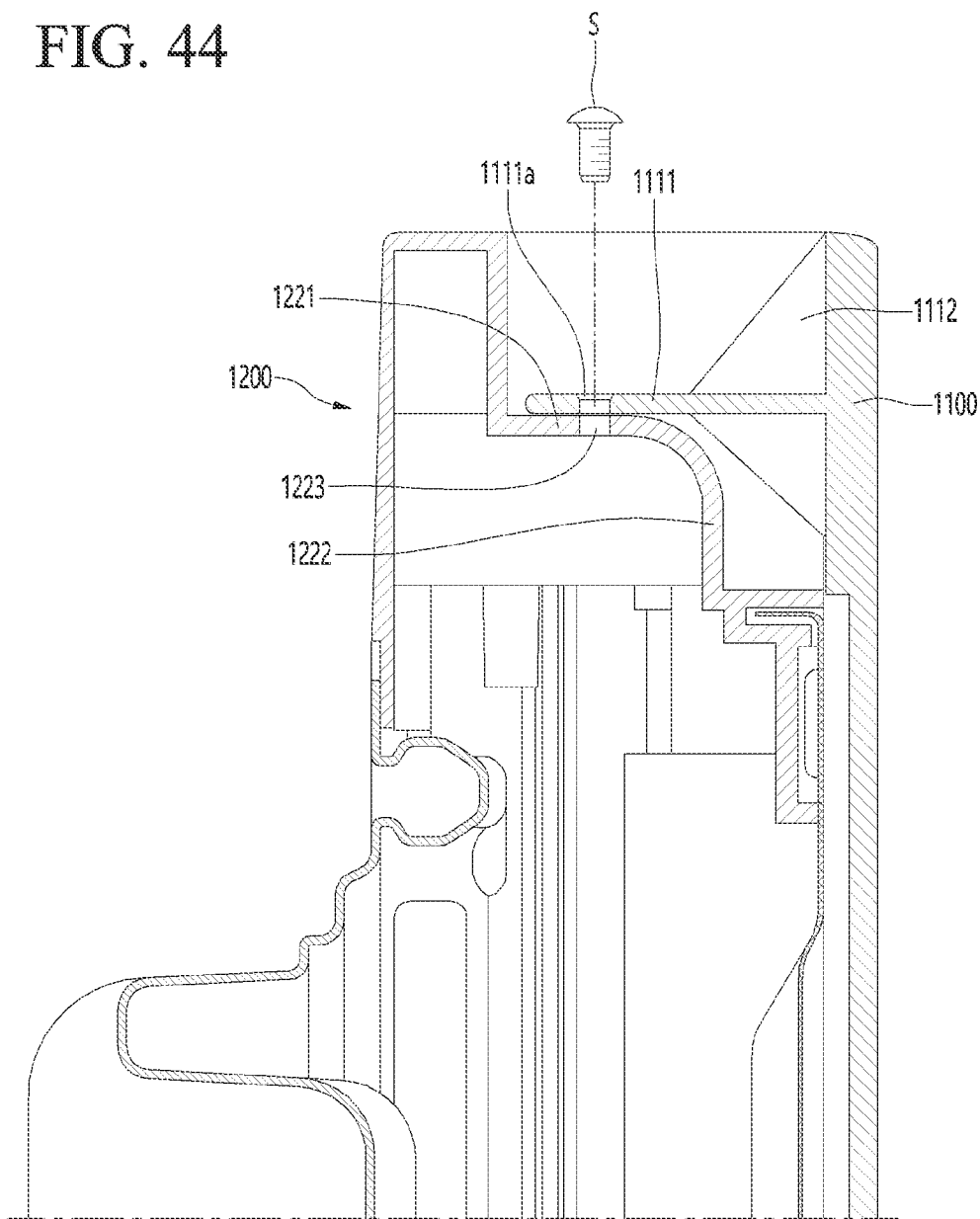
FIG. 44 is a cross-sectional view illustrating a state in which the upper frame and a front panel are coupled to each other.

FIG. 43 is a perspective view illustrating an upper frame, and FIG. 44 is a cross-sectional view illustrating a state in which the upper frame and a front panel are coupled to each other.

The structure of the upper frame 1200 and the coupling between the upper frame 1200 and the first fixing portion 1110 will be described with reference to FIGS. 43 and 44.

The upper frame 1200 may include a panel support portion 1220 which is coupled to an upper portion of the front frame 1300 and on which a seating portion 1111 of the first fixing portion 1110 is seated.

In addition, both ends 1240 to which a hinge (not shown) or a magnet (not shown) for opening and closing the door 912 are coupled may be provided on both sides of the upper frame 1200, respectively.

In detail, one of both the ends 1240 of the upper frame 1200 may be provided with a hinge, and the other may be provided with a magnet, which may vary depending on which any side of the left and right sides of the refrigerator door 912 is coupled.

The panel support portion 1220 may be in a shape recessed from a top surface 1210 of the upper frame 1200 and may be disposed to correspond to the plurality of first fixing portions 1110.

For example, the panel support portion 1220 may be disposed symmetrically to correspond to a position of the first fixing portion 1110 that is arranged symmetrically with respect to left and right sides.

In detail, the panel support portion 1220 may include a first surface 1221 that is depressed downward from the top surface 1210 of the upper frame 1200 and a second surface 1222 that is bent to extend from the first surface 1221 and is perpendicular to the top surface 1210 of the upper frame 1200.

The first surface 1221 may be recessed downward from the top surface 1210 of the upper frame 1200, and the second surface 1222 may be recessed backward from the front surface of the upper frame 200.

Through the recessed panel support portion 1220, when coupled to the first fixing portion 1110, an interference with an external configuration may be prevented.

In addition, an upper coupling hole 1223 corresponding to the coupling hole 1111a of the first fixing portion 1110 may be defined in the first surface 1221.

The panel support portion 1220 may further include an inner surface portion 1224 surrounding the recessed first surface 1221 and the second surface 1222.

The inner surface portion 1224 may be a hexahedral shape having an opened top surface and a front surface, and the first surface 1221 and the second surface 1222 may be provided therein.

In addition, the upper frame 1200 may further include a frame coupling portion 1230 coupled to the front frame 1300.

For example, the frame coupling portion 1230 may extend from a lower side of the panel support portion 1220 and include a plurality of frame coupling holes 1231.

In detail, an upper coupling portion 1311 to be described later of the front frame 1300 may be disposed on the front surface of the frame coupling portion 1230 and may be coupled through a fixing member (not shown) such as a screw.

An upper cover (not shown) may be further included to prevent the panel support portion 1220 provided by the recess from being exposed to the outside.

Referring to FIG. 44, the seating portion 1111 of the first fixing portion 1110 is seated on the panel support portion 1220 of the upper frame 1200.

In addition, the first fixing portion 1110 and the upper frame 1200 through the screw S passing through the coupling hole 1111a of the first fixing portion 1110 and the upper coupling hole 1223 of the upper frame 1200 may be coupled to each other.

Figure 45:
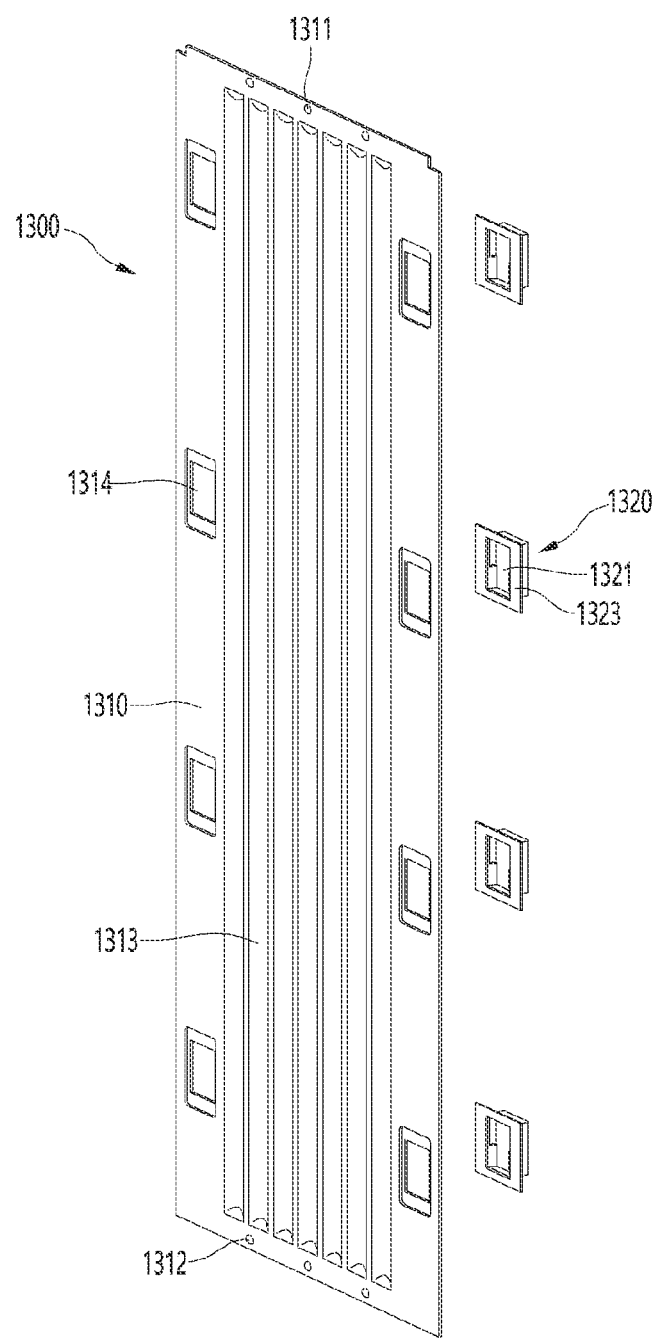
FIG. 45 is a perspective view illustrating a front frame.
Figure 46:
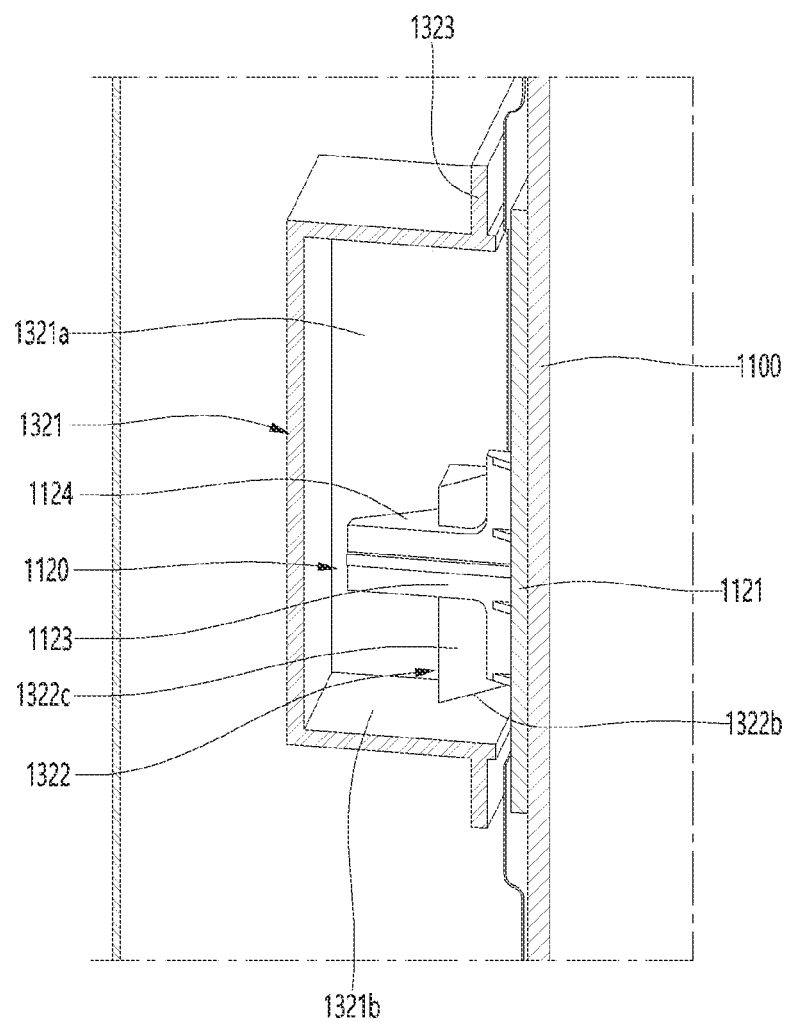
FIGS. 46 and 47 are cross-sectional views illustrating a state in which the front frame and the front panel are coupled to each other.
Figure 47:
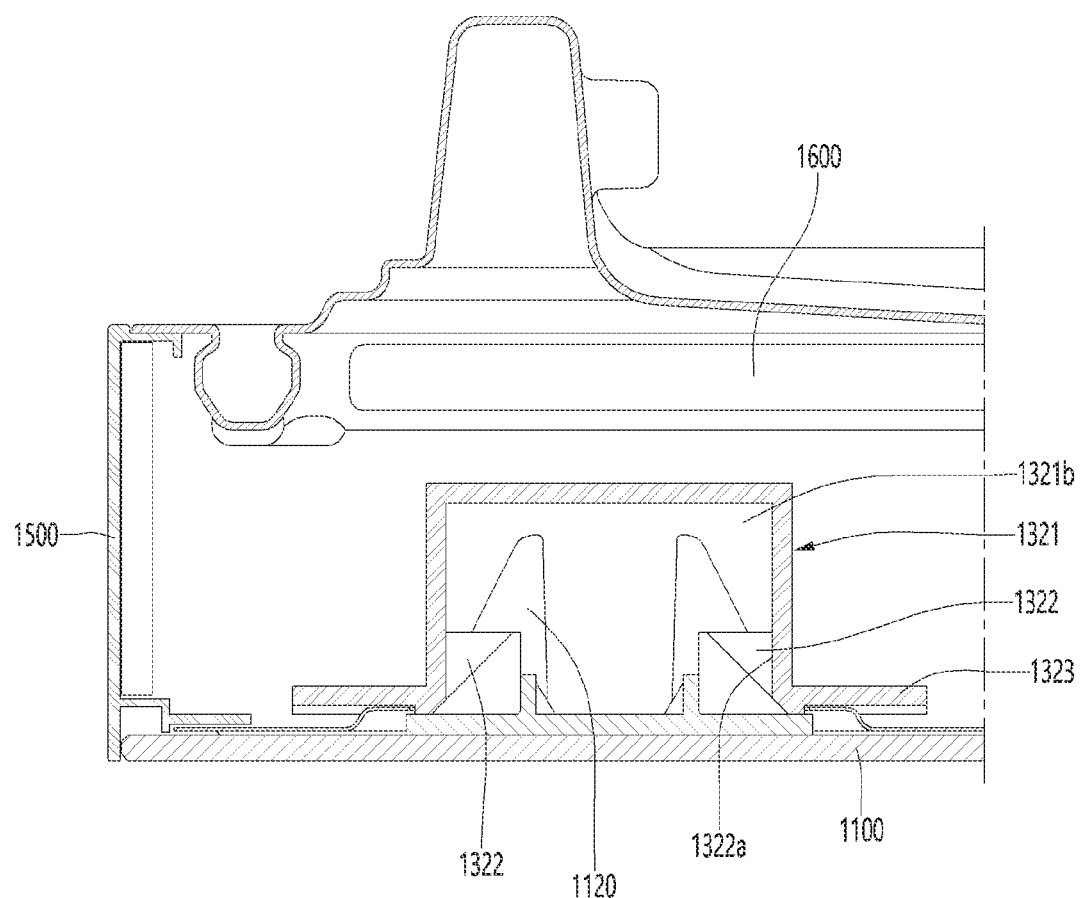

FIG. 45 is a perspective view illustrating the front frame. FIGS. 46 and 47 are cross-sectional views illustrating a state in which the front frame and the front panel are coupled to each other.

The front frame 1300 and the coupling between the front frame 1300 and the second fixing portion 1120 will be described with reference to FIGS. 45 to 47.

The front frame 1300 may include a front plate 1310 that covers most of the front panel 1100.

An insulator may be filled between the front plate 1310 and the door liner 1600, and as the front plate 310 prevents the insulator from being exposed, the insulator may be originally filled between the front panel and the door liner, unlike the front panel that could not be replaced, and thus, the front panel may be replaced.

The front plate 1310 may include a plurality of central recessed portions 1313 extending vertically. The central recessed portion 313 may provide an unevenness so that the insulator is evenly filled in the thermal insulating space.

In addition, the front plate 1310 may further include an upper coupling portion 1311 coupled to the upper frame 1200 and a lower coupling portion 1312 coupled to the lower frame 1400.

In addition, the front plate 1310 may further include one or more holes 1314 (or frame openings) for providing a hook coupling portion 1320 to be described later.

The front plate 1310 and the hook coupling portion 1320 may be provided as one, or the hook coupling portion 1320 may be separately provided and attached to the front plate 1310.

The front frame 1300 may further include a hook coupling portion 1320 coupled to the second fixing portion 1120.

The hook coupling portion 1320 may be provided as a pair at left and right sides to correspond to the second fixing portion 1120 and may be disposed to correspond to the position of the second fixing portion 1120.

In this embodiment, the hook coupling portion 1320 may be referred to as an accommodation member.

In detail, the hook coupling portion 1320 may include a recessed portion 1321 which is recessed toward a rear side of the front plate 1310.

For example, the hook coupling portion 1320 may include an adhesion portion 1323 attached to surround the hole 1314 of the front plate 1310, and a recessed portion 1321 recessed from the adhesion portion 1323.

In detail, the recessed portion 1321 may be a hexahedral shape with one open surface, and the adhesion portion 1323 may be disposed on an edge of the opened one surface.

For example, the opened surface may correspond to the hole 1314 of the front plate 1310, and the inside of the recessed portion 1321 may be exposed to the front surface of the front plate 1310 through the hole 1314.

In addition, as the hook coupling portion 1320 is attached while covering the hole 1314 of the front plate 1310, the insulator may be prevented from leaking through the hole 1314.

A size of the hole 1314 of the front plate 1310 may correspond to a size of the opened surface of the recessed portion 1321, and an adhesive recessed portion 1314a that is in contact with the adhesion portion 1323 as an edge of the hole 1314 may be further included.

A rear surface of the adhesive recessed portion 1314a and the adhesion portion 1323 may adhere to each other by an adhesive means such as a tape, and the adhesive recessed portion 1314a may be recessed at a predetermined interval toward the rear side.

The adhesive recessed portion 1314a may serve to guide sliding of the second fixing portion 1120 when the second fixing portion 1120 and the hook coupling portion 1320 are separated from each other.

In detail, the second fixing portion 1120 may be slid only up to a portion at which the adhesive recessed portion 1314a is disposed.

In addition, the hook coupling portion 1320 may include an inclined protrusion 1322 provided in the recessed portion 1321.

The inclined protrusion 1322 may be a pair of protruding from both the side surfaces 1321a of the recessed portion 1321 and may protrude from both the side surfaces 1321a of the recessed portion 1321 having an inclination.

For example, the inclined protrusion 1322 may have a side surface 1322a and a lower surface 1322b that is in contact with an inner surface of the recessed portion 1321 and may extend vertically.

In addition, a top surface of the inclined protrusion 1322 may not be in contact with the inner surface of the recessed portion 1321.

In detail, a cross-section perpendicular to the extending direction of the inclined protrusion 1322 may be a right-angled triangle. For example, the side surface 1322a and the lower surface 1322b of the inclined protrusion 1322 may be connected to the side surface 1321a and the lower surface 1321b of the recessed portion 1321.

In addition, the inclined protrusions 1322 may be closer to each other from the front to the rear. In detail, the inclined protrusion 1322 may be a triangular prism having a cross-section at a right-angled triangle, and an inclined surface 1322c corresponding to a hypotenuse of the right-angled triangle may be exposed in front of the recessed portion 1321.

In detail, the inclined surface 1322c of the inclined protrusion 1322 may correspond to an outer surface of the hook portion 1124 of the second fixing portion 1120.

When the second fixing portion 1120 is coupled to the hook coupling portion 1320, slight force may be applied along the inclined surface 1322c of the inclined protrusion 1322 so as to be hook-coupled, and when the second fixing portion 1120 is separated from the hook coupling portion 1320, the second fixing portion 1120 may move to an upper side of the recessed portion 1321, in which the inclined protrusion 1322 is not provided, so that the hook coupling is easily released.

Referring to FIGS. 46 and 47, when the second fixing portion 1120 is coupled to the hook coupling portion 1320, the hook member 1122 of the second fixing portion 1120 is disposed inside to the hook coupling portion 1320.

In detail, in a state in which the front panel 1100 is fixed to the frame assembly 1000, the hook portion 1124 of the hook member 1122 may be hooked by the inclined protrusion 1322 of the hook coupling portion 1320, and thus, the second fixing portion 1120 and the front frame 1300 may not be separated from each other.

Figure 48:
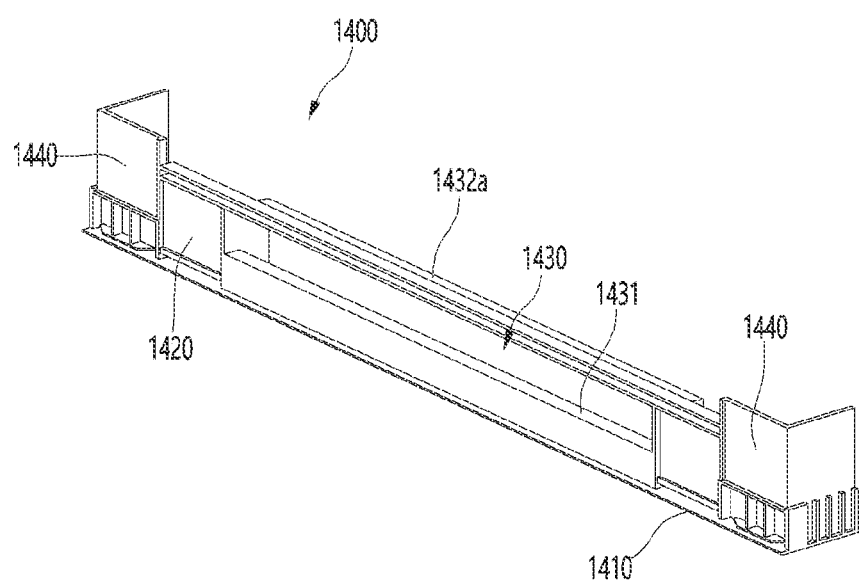
FIG. 48 is a perspective view illustrating a lower frame.
Figure 49:
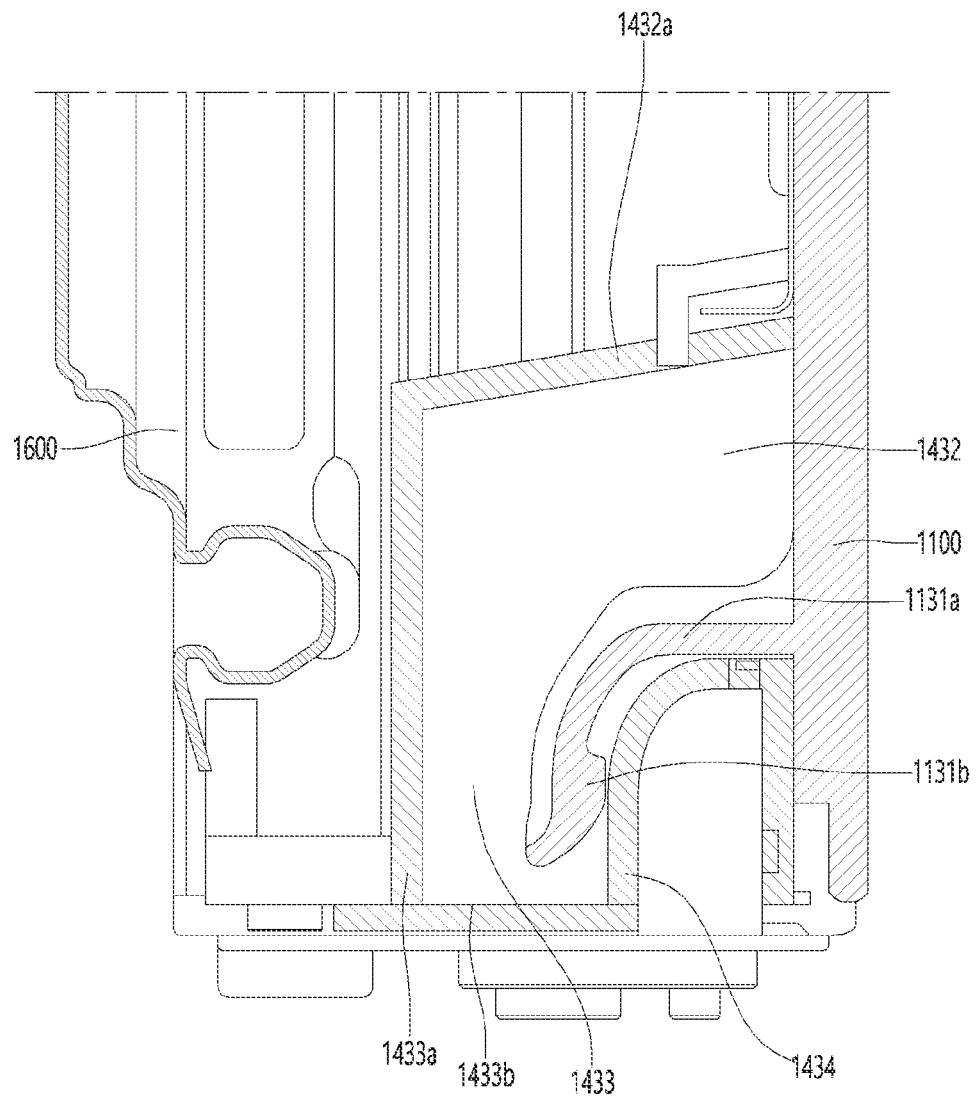
FIG. 49 is a cross-sectional view illustrating a process in which the lower frame and the front panel are coupled to each other.

FIG. 48 is a perspective view illustrating the lower frame, and FIG. 49 is a cross-sectional view illustrating a process in which the lower frame and the front panel are coupled to each other.

The structure of the lower frame 1400 and the coupling between the lower frame 1400 and the third fixing portion 1130 will be described with reference to FIGS. 48 and 49.

The lower frame 1400 may be coupled to a lower portion of the front frame 1300, and the third fixing portion 1130 may be inserted.

In detail, the lower frame 1400 may include a lower recessed portion 1430 that is depressed from the front to the rear of the door 912.

For example, the lower recessed portion 1430 may have a lower recessed portion inlet 1431 extending to left and right sides on the front surface 1420.

The lower recessed portion inlet 1431 may be spaced a predetermined interval from the lower surface 1410 of the lower frame 1400.

In addition, the lower recessed portion 1430 may include a first recessed portion 1432 extending from the lower recessed portion inlet 1431 toward the rear surface and a second recessed portion 1433 extending from the first recessed portion 1432 by being bent from the first recessed portion 1432.

For example, the first recessed portion 1433 may include a side surface 1432a extending from the lower recessed portion inlet 1431 toward the rear surface.

The second recessed portion 1433 may be bent from the side surface 1432a of the first recessed portion 1433 to extend toward the lower surface 1410 of the lower frame 1400.

In addition, the second recessed portion 1433 may further include a lower surface 1433b defining a portion of the lower surface 1410 of the lower frame 1400.

The first extension portion 1131a of the third fixing portion 1130 may be inserted into the first recessed portion 1432, and the second extension portion 1131b of the third fixing portion 1130 may be inserted into the second recessed portion 1433.

In addition, the lower recessed portion 1430 may further include a lower seating surface 1434 that supports the first extension portion 1131a of the third fixing portion 1130 in a state in which the third fixing portion 1130 is fixed.

In detail, the lower seating surface 1434 may include a first surface supporting the first extension portion 1131a of the third fixing portion 1130 and a second surface that is bent from the first surface to extend downward.

In addition, the lower frame 1400 may further include a frame coupling portion (not shown) coupled to the front frame 1300.

In addition, both ends 1440 to which a hinge (not shown) or a magnet (not shown) for opening and closing the door 912 are coupled may be provided on both sides of the lower frame 1400.

In detail, one of both the ends 1440 of the lower frame 1400 may be provided with a hinge, and the other may be provided with a magnet, which may vary depending on which any side of the left and right sides of the refrigerator door 912 is coupled.

Referring to FIG. 49, when the front panel 1100 and the frame assembly 1000 are coupled to each other, the third fixing portion 1130 is inserted into the lower frame 1400.

In detail, the first extension portion 1131a of the third fixing portion 1130 may be supported on an upper end of the lower seat surface 1434 of the lower frame 1400.

In addition, the first extension portion 1131a of the third fixing portion 1130 may be disposed in the first recessed portion 1432 of the lower frame 1400, and the second extension portion 1131b of the third fixing portion 1130 may be disposed in the second recessed portion 1433 of the lower frame 400.

Figure 50:
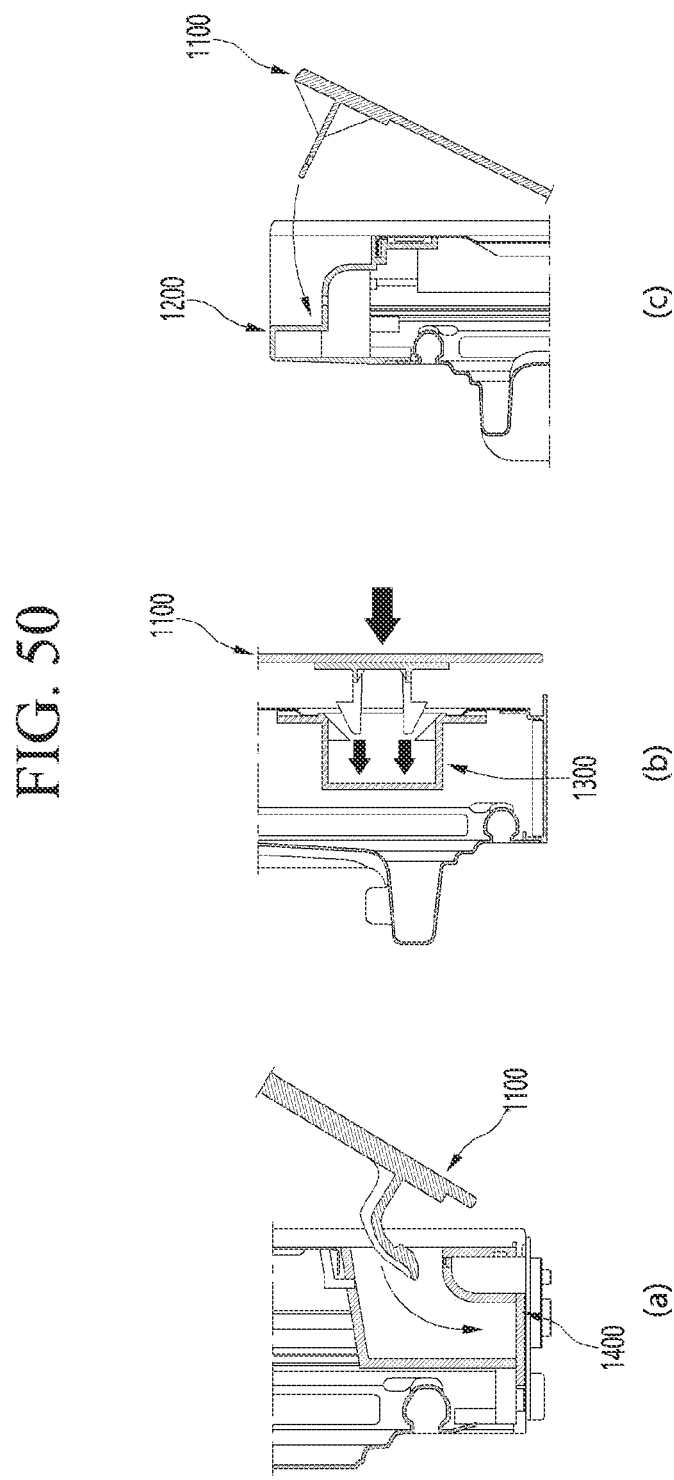
FIG. 50 is a view illustrating a process in which the front panel and the frame assembly are coupled to each other.
Figure 51:
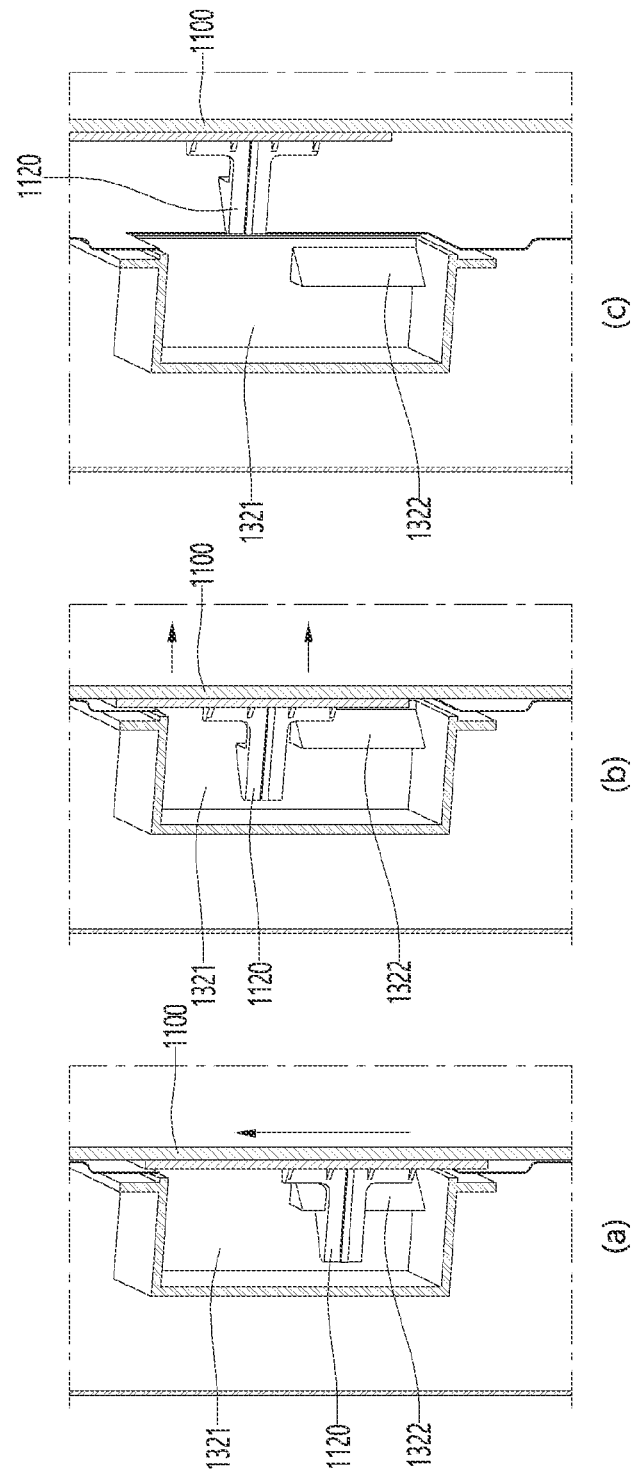
FIG. 51 is a view illustrating a process in which the front panel and the front frame are separated from each other.

FIG. 50 is a view illustrating a process in which the front panel and the frame assembly are coupled to each other, and FIG. 51 is a view illustrating a process in which the front panel and the front frame are separated from each other.

Coupling and separation of the front panel 1100 and the frame assembly 1000 will be described in detail with reference to FIGS. 50 and 51.

First, the coupling between the front panel 1100 and the frame assembly 1000 will be described.

The third fixing portion 1130 of the front panel 1100 may be inserted into the lower recessed portion 1430 of the lower frame 1400. Here, since each of the third fixing portion 1130 and the lower recessed portion 1430 has a shape including a bent portion, the front panel 1100 may be inserted in a state in which an upper portion is inclined to a front surface at a predetermined interval.

After inserting the third fixing portion 1130 of the front panel 1100 into the lower recessed portion 1430, the front panel 1100 may rotate around the third fixing portion 1130 while rotating the front surface, and thus, the upper end of the panel 1100 may approach the frame assembly 1000.

Here, certain force may be applied to the front surface of the front panel 1100 so that the second fixing portion 1130 is hook-coupled to the hook coupling portion 1320.

The second fixing portion 1130 is made of a material having predetermined elasticity, and while moving along the inclined surface 1322c of the inclined protrusion 1322 of the hook coupling portion 1320, the hook portion 1124 of the second fixing portion 1130 and the inclined protrusion 1322 may be locked with respect to each other.

In addition, when the hook portion 1124 and the inclined protrusion 1322 are coupled to each other, if predetermined force is applied by the inclination of the hook portion 1124 and the inclined protrusion 1322, the locking may be realized. However, when the hook portion 1124 is inserted between the recessed portion 1321 and the inclined protrusion 1322, the recessed portion 1321 may be fixed forward and backward by an interference between the hook portion 1124 and the inclined protrusion 1322.

That is, each of the second fixing portion 1130 and the inclined protrusion 1322 may have a snap-fit shape.

When the hook coupling is performed from the lower portion of the front panel 1100 toward the upper portion, the first fixing portion 1110 may be seated on the front panel support portion 1220 of the upper frame 1200. Thereafter, the front panel 1100 may be finally fixed by using a screw S.

A process of separating the front panel 100 from the frame assembly 1000 for replacement of the front panel 1100 will be described with reference to FIG. 51.

First, after removing the screw fixing the first fixing portion 110 and the upper frame 200, the user slides the front panel 1100 upward.

When the front panel 1100 moves by being slid upward, the second fixing portion 1120 may move to the upper side of the hook coupling portion 1320, and the locking with the inclination protrusion 1322 provided at the lower side of the hook coupling portion 1320 may be released.

In detail, an upper end of the plate 1121 of the second fixing portion 1120 may be slid to the upper end of the adhesive recessed portion 1314a of the front frame 1300, and when hooked on a protrusion of the adhesive recessed portion 1314a, the locking between the second fixing portion 1120 and the hook coupling portion 1320 may be released.

Thereafter, if the front panel 1100 moves forward, the hook coupling may be easily released. Through this, when the front panel 1100 is coupled, the front panel may be easily fixed and may be firmly maintained to be fixed through the hook coupling, and when the front panel 1100 is separated, the hook coupling may be easily released.

The invention claimed is:

1. A refrigerator comprising:
a cabinet that defines a storage space; and
a door configured to open and close at least a portion of the storage space,
wherein the door comprises:
a frame assembly in which an insulator is provided, and
a panel assembly that is mounted on a front surface of the frame assembly and that defines an outer appearance of a front surface of the door,
wherein the panel assembly comprises:
a front panel, a panel fixing member provided on a rear surface of the front panel, and
a bracket spaced vertically apart from the panel fixing member, the bracket being coupled to the frame assembly,
wherein the panel fixing member passes through the frame assembly and is coupled to the frame assembly inside the frame assembly,
wherein the frame assembly comprises:
a front frame that defines a first opening,
a side frame that is coupled to the front frame and that defines a second opening, wherein the panel fixing member passes through the first and second openings, and
an accommodation member that defines a space accommodating the panel fixing member that passes through the first and second openings.

2. The refrigerator of claim 1, wherein the panel assembly comprises a plurality of panel fixing members that are arranged vertically on both left and right sides of the rear surface of the front panel.

3. The refrigerator of claim 1, wherein the side frame comprises:
a frame side surface that defines a side surface of the frame assembly; and
a frame front surface that protrudes from the frame side surface, and
wherein the second opening is defined in the frame front surface, and the accommodation member is mounted on the frame front surface.

4. The refrigerator of claim 3, further comprising a side rib that is disposed on the frame side surface, the side rib being spaced backward from the frame front surface, and
wherein one end of the accommodation member is inserted between the frame front surface and the side rib.

5. The refrigerator of claim 3, wherein the accommodation member comprises:
an accommodation member mounting surface that is fixed to the frame front surface; and
an accommodation portion that is recessed backward from the accommodation member mounting surface and that defines the space in which the panel fixing member is accommodated, and
wherein the accommodation portion is larger than the second opening.

6. The refrigerator of claim 1, wherein the frame assembly defines a gasket groove in which a gasket that is in contact with a front surface of the cabinet to seal the storage space is mounted, the gasket groove being defined at a rear surface of the frame assembly, and
wherein each of the panel fixing member and the accommodation member protrudes from a position facing the gasket groove.

7. The refrigerator of claim 1, wherein the panel fixing member comprises:
a fixing member mounting portion mounted on the rear surface of the front panel;
a hook portion protruding from one side of the fixing member mounting portion to extend downward after passing through the first and second openings of the frame assembly; and
an elastic portion provided on the hook portion and elastically supported on the side frame.

8. The refrigerator of claim 7, wherein the elastic portion extends upward from a lower end of the hook portion and is farther from the hook portion as the elastic portion extends upward.

9. The refrigerator of claim 7, wherein the hook portion is disposed eccentric to an outside with respect to a center of the fixing member mounting portion.

10. A refrigerator comprising:
a cabinet that defines a storage space; and
a door configured to open and close at least a portion of the storage space,
wherein the door comprises:
a frame assembly in which an insulator is provided, and
a panel assembly that is mounted on a front surface of the frame assembly and that defines an outer appearance of a front surface of the door,
wherein the panel assembly comprises:
a front panel,
a panel fixing member provided on a rear surface of the front panel, and
a bracket spaced vertically apart from the panel fixing member, the bracket being coupled to the frame assembly,
wherein the panel fixing member passes through the frame assembly and is coupled to the frame assembly inside the frame assembly,
wherein the frame assembly comprises:
a front frame,
a side frame coupled to the front frame, wherein at least one of the front frame or the side frame defines a frame opening, and
an accommodation member that defines a space accommodating the panel fixing member that passes through the frame opening, and
wherein the panel fixing member comprises:
a fixing member mounting portion mounted on the rear surface of the front panel,
a hook portion that protrudes from one side of the fixing member mounting portion and that extends downward after passing through the frame opening, and
an elastic portion provided on the hook portion and elastically supported on the side frame.

11. The refrigerator of claim 10, wherein the elastic portion extends upward from a lower end of the hook portion and is farther from the hook portion as the elastic portion extends upward.

12. The refrigerator of claim 10, wherein the hook portion is disposed eccentric to an outside with respect to a center of the fixing member mounting portion.

13. The refrigerator of claim 10, wherein the side frame comprises:
a frame side surface that defines a side surface of the frame assembly; and
a frame front surface that protrudes from the frame side surface,
wherein the frame opening is defined in the frame front surface, and the accommodation member is mounted on the frame front surface.

14. The refrigerator of claim 13, wherein the front frame defines an opening that is aligned with the frame opening.

15. A refrigerator comprising:
a cabinet that defines a storage space; and
a door configured to open and close at least a portion of the storage space,
wherein the door comprises:
a frame assembly in which an insulator is provided, and a panel assembly that is mounted on a front surface of the frame assembly and that defines an outer appearance of a front surface of the door, wherein the panel assembly comprises:
- a front panel,
- a panel fixing member provided on a rear surface of the front panel, and
- a bracket spaced vertically apart from the panel fixing member, the bracket being coupled to the frame assembly, wherein the panel fixing member passes through the frame assembly and is coupled to the frame assembly inside the frame assembly, wherein the frame assembly comprises:
- a front frame that defines a frame opening, and
- an accommodation member that defines a space accommodating the panel fixing member that passes through the frame opening, wherein the accommodation member comprises:
- a recess comprising a plurality of side surfaces recessed from a front surface of the front frame, and
- an inclined protrusion protruding with at least one of the plurality of side surfaces, and wherein the panel fixing member comprises a hook extending from the rear surface of the front panel and being configured to be restricted with the inclined protrusion by passing through the frame opening.

16. The refrigerator of claim 15, wherein the inclined protrusion is provided in a pair, and the pair of inclined protrusions are closer to each other toward an inside of the recess from the frame opening.

17. The refrigerator of claim 15, wherein the hook comprises:
- a plate attached to the rear surface of the front panel; and
- a plurality of hook members extending from the plate and spaced apart from each other in a horizontal direction, and wherein each of the plurality of hook members comprises:
- an extension portion extending from the plate, and
- a hook portion bent from the extension portion, wherein the hook portions of the plurality of hook members extend away from each other.

18. The refrigerator of claim 16, wherein a top surface of the inclined protrusion is disposed lower than an upper end of the recess.

19. The refrigerator of claim 15, wherein the frame assembly further comprises:
- an upper frame coupled to an upper side of the front frame; and
- a lower frame coupled to a lower side of the front frame, and wherein the bracket comprises:
- an upper bracket coupled to the upper frame, and
- a lower bracket coupled to the lower frame.

* * * * *